United States Patent
Lee et al.

(10) Patent No.: US 7,792,889 B1
(45) Date of Patent: *Sep. 7, 2010

(54) METHOD, SYSTEM, AND PROGRAM FOR CUSTOMER SERVICE AND SUPPORT MANAGEMENT

(75) Inventors: Andy Ming Lee, Chino Hills, CA (US); Hysh-Min Hsu, Diamond Bar, CA (US); Paul Hao, Rowland Heights, CA (US); Shyh-Tyng Edward Sun, Diamond Bar, CA (US); Tracy Tseng, Rancho Cucamonga, CA (US); Carrie Renner Edwards, Costa Mesa, CA (US); Connie Dentz, Corona, CA (US); Vu Tran, West Covina, CA (US); Samuel Jen-Chang Chi, Temple City, CA (US)

(73) Assignee: Alorica Inc, Chino, CA (US)

( * ) Notice: Subject to any disclaimer, the term of this patent is extended or adjusted under 35 U.S.C. 154(b) by 288 days.

This patent is subject to a terminal disclaimer.

(21) Appl. No.: 11/933,088

(22) Filed: Oct. 31, 2007

Related U.S. Application Data

(63) Continuation of application No. 10/416,410, filed on May 12, 2003, now Pat. No. 7,464,092, which is a continuation-in-part of application No. 09/826,121, filed on Apr. 4, 2001, now Pat. No. 7,707,149.

(51) Int. Cl.
*G06F 17/30* (2006.01)

(52) U.S. Cl. .................. 707/999.2; 707/999.1; 707/948
(58) Field of Classification Search .............. 707/999.1, 707/999.2, 948, 949
See application file for complete search history.

(56) References Cited

U.S. PATENT DOCUMENTS

| 6,327,363 | B1 * | 12/2001 | Henderson et al. | 379/265.01 |
| 6,606,744 | B1 * | 8/2003 | Mikurak | 717/174 |
| 2001/0042022 | A1 * | 11/2001 | Kirkpatrick et al. | 705/26 |

* cited by examiner

*Primary Examiner*—Jean M Corrielus
(74) *Attorney, Agent, or Firm*—Law Office of Scott C. Harris, Inc.

(57) ABSTRACT

Managing customer and product information over a network using a multi-functional management tool uses a computer which is programmed for generating a customer database including customer records, wherein each customer record tracks a customer. The computer updates the customer database from information received from the customer to add or modify a specific customer record indicating customer contact and product purchase information about the customer. The computer is used for updating the product database from information received from a client to add or modify a specific product record indicating product and inventory information about the product. The information can include a troubleshooting sequence for the specific product and a specific problem. One option during at least one part of said troubleshooting sequence includes at least one part sale option as an upselling operation.

20 Claims, 52 Drawing Sheets

```
HELIX by ALORICA TM – Microsoft Internet Explorer                           _ ☐ ×
File  Edit  View  Favorites  Tools  History
← Back →  ⊗  ▣  ⌂  │ ◎ Search  ☐ Favorites  ◎ History  │  ☐  ⊜  &
Address  │☐ http://demo.alorica.com/crm/custform.aspcustomer_id=5         ◁  ↱ Go  ║ Links »
```

HbA – Interactor™

TODAY IS: THURSDAY, MARCH 28, 2002

*HELIX*

SEARCH | ADD CUSTOMER | LOG OUT

CURRENT AGENT:
DEMO DEMO

CUSTOMER INFORMATION

CALL HISTORY

RMA INFO

CUSTOMER INFO

| | | | |
|---|---|---|---|
| FIRST NAME | PAUL | LAST NAME | HAO |
| COMPANY | XYZ COMPANY | | |
| ADDRESS 1 | 14726 RAMONA AVE. #300 | | |
| ADDRESS 2 | | | |
| CITY | CHINO | STATE | CALIFORNIA ▼ |
| ZIP | 9170 | COUNTRY | US ▼ |
| DAY PHONE | 9096063600 | EXT | |
| EVE PHONE | 9091223333 | FAX | N/A |
| PAGER | 2139911234 | EMAIL | PAUL@ALORICA.COM |

[MODIFY]

CUSTOMER MODIFY RECORD INFORMATION

| RECORD DATE | AGENT NAME | DESCRIPTION |
|---|---|---|
| 9/5/2001  10:34:36 AM | DEMO DEMO | UPDATE INFO AGAIN |
| 9/4/2001  4:33:26 PM | DEMO DEMO | RECORD MODIFIED |
| 9/1/2001  2:28:47 PM | DEMO DEMO | ADDING PAGER NO. |

TOTAL COUNT: 3

PRODUCT INFORMATION

| SERIAL NO. | MODEL NAME | PURCHASE DATE | |
|---|---|---|---|
| 1E4F2A5E | 000839-09 | 04/01/01 | MODIFY |
| 123466 | 000839-09 | 12/01/01 | MODIFY |
| SAM_TEST | 000839-09 | 09/01/01 | MODIFY |
| SAM_TEST | 002805-00 | 12/01/01 | MODIFY |

TOTAL COUNT: 4
ADD PRODUCT

ALL CONTENTS COPYRIGHT © 1999-2001, ALORICA INC.℠ ALL RIGHTS RESERVED.
LEGAL INFORMATION | PRIVACY STATEMENT

| NEWS | HOW TO | POLICIES | S/N DECODER | |
|---|---|---|---|---|
| MODEM SELECT FAMILY... | MODEL | KEYWORD | DOCUMENT | |

| | | | | |
|---|---|---|---|---|
| • FLOW CHARTS<br>• WINDOWS 9X<br>• WINDOWS NT<br>• WINDOWS 2K<br>• MACINTOSH<br>• LINUX<br>• SOFTWARE<br>• INSTALLING<br>• UNINSTALLING<br>• KNOWN ISSUES | • FLOW CHARTS<br>• WINDOWS 9X<br>• WINDOWS NT<br>• WINDOWS 2K<br>• LINUX<br>• HARDWARE<br>• SOFTWARE<br>• GENERAL | • FLOW CHARTS<br>• WINDOWS 9X<br>• WINDOWS NT<br>• WINDOWS 2K | • FLOW CHARTS<br>• WINDOWS 9X<br>• WINDOWS NT<br>• WINDOWS 2K<br>• LINUX<br>• HARDWARE<br>• SOFTWARE | • FAQS<br>• TA CALL FLOWCHART<br>• GLOSSARY<br>• MANUALS<br>• GENERAL INFORMATION<br>• PARTS INFORMATION<br>• TROUBLESHOOTING WALKTHROUGHS<br>• SPORTSTER SPECIFIC TROUBLESHOOTING<br>• NETWORKING INFORMATION<br>• 3COM NIC CARDS<br>• 3COM INTERNET APPLIANCES<br>• KNOWN ISSUES |

SEARCH TROUBLESHOOTING FOR:

USAGE: SUPPORTS BOOLEAN COMMANDS AS WELL AS '+' AND '_' (TO EXCLUDE). USE '*' FOR WILDCARD FUNCTIONALITY

Fig. 17

HELIX by ALORICA TM – Microsoft Internet Explorer

HbA – Retour™

TODAY IS: THURSDAY, MARCH 28, 2002

HELIX

SEARCH | LOG OUT

CURRENT AGENT: DEMO DEMO

RECEIVING

TESTING

SHIPPING

CUSTOMER INFO

| | | | |
|---|---|---|---|
| FIRST NAME | PAUL | LAST NAME | HAO |
| COMPANY | XYZ COMPANY | | |
| ADDRESS 1 | 14726 RAMONA AVE. #300 | | |
| ADDRESS 2 | | | |
| CITY | CHINO | STATE | CALIFORNIA |
| ZIP | 9170 | COUNTRY | US |
| DAY PHONE | 9096063600 | EXT | |
| EVE PHONE | 9091223333 | FAX | N/A |
| PAGER | 2139911234 | EMAIL | PAUL@ALORICA.COM |

CUSTOMER RMA INFORMATION

RMA NO. RMA9720011

| MODEL | SERIAL NO. | ISSUE DATE | RMA TYPE | RECEIVE DATE | RETURN TO SENDER | SHIP DATE | SHIP TRACKING NO. |
|---|---|---|---|---|---|---|---|
| 005686-03 | E4F2A5E | 9/7/2001 | REPLACEMENT | 9/7/2001 | NO | 9/8/2001 | 44080958760039963.5 |

PRODUCT INFORMATION

| SERIAL NO | MODEL NAME | PURCHASE DATE |
|---|---|---|
| 1E2F2A5E | 000839-09 | 04/01/01 |

ALL CONTENTS COPYRIGHT © 1999-2001, ALORICA INC.℠ ALL RIGHTS RESERVED.
LEGAL INFORMATION | PRIVACY STATEMENT

Fig. 21

RMA RECEIVING
                                                                        ↑
                                                                    RESULTS
                          GENERAL RMA INFORMATION
RMA: R10018005      REPLACEMENT    ISSUE DATE: 10/08/2001 (JACKIE BAUMGAERTEL)
RMA ADDRESS (SHIPPING)                CUSTOMER ADDRESS
CONTACT: DIANNE WOODLY                COMPANY: N/A
NAME:    DIANNE WOODLY                NAME:    DIANNE WOODLY
PHONE:   3348260414                   PHONE:   3348260414
ALT. PHONE:                           EMAIL:   N/A
EMAIL:   N/A                          ADDRESS: 557 TEMPLE ST.
ADDRESS: 557 TEMPLE ST.                        WOODLY ENTERPRISES
         WOODLY ENTERPRISES                    AUBURN, AL 36830
         AUBURN, AL 36830                      US
         US

SPECIAL INSTRUCTIONS: ISSUING RMA
MANAGER INSTRUCTIONS:
ADD RECEIVING RECORD
   SHIPPING CARRIER: UPS GROUND  ▼    RECEIVE AGENT: PETEG
   TRACKING NUMBER: 1X3E57460341719779  SOURCE: NORMAL ▼  RECEIVE DATE: 10/15/2001
      REFERENCE NO:
 NO   RMA    SKU       SERIAL NO   RECEIVE?  RECEIVED SERIAL NO  RECEIVED SKU  GRADE  TYPE
  1  69952  005686-03  228BBBT96K9D   YES      228BBBT96K9D       005686-03     B    PRODUCT ▼

RECEIVING NOTES:

( RECEIVE )    [ CLEAR FORM ]

Fig. 22

| PRODUCT SRCH | CUSTOMER SRCH | REPORT | LOGOUT |

PCFACTORY ADMIN

Sam Ohl
4/2/2002
Access Level:1

Inv P.O. | Inventory | Promotion | Add Product | Shipment | Settings | Agents | Home | Page | Spam | Upgrades PRODUCT INFO | COMPATIBLE MODEL | SUBSTITUTE | PO RECORDS | ORDER HISTORY | QTY HISTORY | DAILY SPECIAL PRODUCTS

| | | | |
|---|---|---|---|
| PRODUCT ID: | 66963 | SMALL IMAGE NAME: | PRODUCTIMAGES/051-00250-000.GIF |
| CATEGORY: | PROJECTION | LARGE IMAGE NAME: | PRODUCTIMAGES/051-00250-000.GIF |
| SUB-CATEGORY: | PROJECTORS  SELECT | PRICE ($): | 3049.95 |
| MANUFACTURER: | OPTOMA | PSN PRICE: | $0.00 |
| | RENAME | MATERIAL NUMBER: | |
| HOME STORE: | PCFACTORY OUTLET | SPIFF: | 50.00 |
| PART NO: | 304-00001-003 | ☑ SHOW ON HOME PAGE. POSITION 0  PRIORITY 0 | |
| WEIGHT (IN LB): | 10 | | |
| SKU: | MTOP30400001003 | ☑ SPECIAL PROMOTION. | |
| SIZE: | | ☑ WILL SHOW ON PUBLIC WEB SITES: | |
| ORDERED QUANTITIES: | 0 | ☑ IF UNAVAILABLE WILL RESTOCK: | |
| QUANTITIES ON HAND: | 0 | ☐ PSEUDO SKU: | |
| LOW QTY ALERT: | 5 | ☐ INVENTORY CONTROL: | |
| QUANTITY ON PURCHASE ORDER: | 0 | ☐ THIS PART IS BOM? | |
| LOCATION CODE: | DROP SHIP FROM OPTOMA | | |
| MODEL TYPE: | EZPRO 718 PORTABLE MULTIMEDIA LCD PROJECTOR | | |
| MARKETING BRIEF: | <STRONG>OPTOMA</STRONG><BR> | | |

Fig. 26

USERNAME: FRANK - DATE 4/2/02

LOGOUT | ORDERS ▼ | MAINTENANCE ▼ | HISTORY ▼ | REPORT ▼ | ACCOUNTING ▼

CUSTOMER: NO CUSTOMER IS SELECTED

VENDOR COMMENTS: N/A

[ UPDATE ] [ PURCHASE ORDER ] [ PACKING SLIP ] [ BLIND PACKING SLIP ]

PO ITEMS

OUR PO: UC03150022                           PO TOTALS: $393.10
VENDOR: THE LASER SOURCE, INC. (EDS)         ORDER DATE: 3/15/02

| ORDER NO | LINE ITEM | OUR PART NUMBER | QTY | U/N | UNIT PRICE | EXT PRICE | FREIGHT | STATUS |
|---|---|---|---|---|---|---|---|---|
| 172957 | 1 | C3914-69001 | 1 | EA | 393.10 | $393.10 | $0.00 | SHIPPED |

PO SHIPPING ADDRESS

| PURCHASE ORDER SHIP TO ADDRESS | PACKING SLIP SHIP TO ADDRESS |
|---|---|
| NAME: EDS INTERNAL | NAME: EDS INTERNAL |
| ADDRESS1: 8227 NORTHWEST BLVD SUITE 190 | ADDRESS1: 8227 NORTHWEST BLVD SUITE 190 |
| ADDRESS2: | ADDRESS2: |
| CITY: INDIANAPOLIS | CITY: INDIANAPOLIS |
| STATE: IN  ZIP: 46278 | STATE: IN  ZIP: 46278 |
| CONTACTS: RANDAL KEOWN | CONTACTS: RANDAL KEOWN |
| TITLE: | TITLE: |
| [ UPDATE SHIPTO ADDRESS ] | [ UPDATE PKSLIP ADDRESS ] |

CUSTOMER INFORMATION

| | | | | |
|---|---|---|---|---|
| CUSTOMER NAME: | | * | AVAILABLE CREDIT: | $ |
| ADDRESS1: | | | URL: | ☒ |
| ADDRESS2: | | ☒ | INSIDE SALES REP: | DHILL ▼ |
| CITY: | | * | OUTSIDE SALES REP: | ▼ |
| STATE: | | * | AE STATUS: | NON AE USER ▼ |
| ZIP: | | * | STATUS: | ▼ |
| PHONE: | | * | CUSTOMER NO: | 1014 |
| FAX: | | | ORDER CANCELLED: | NO ▼ |
| EMAIL: | | ☒ | ITEM BACK ORDERED: | NO ▼ |

ACCOUNTING CONTACT INFO

| | | | |
|---|---|---|---|
| | | ORDER COMPLETED: | NO ▼ |
| CONTACT NAME: | | RFQ QUOTED: | YES ▼ |
| PHONE: | | ORDER ACKNOWLEDGE: | YES ▼ |
| FAX: | | | |
| CONTACT EMAIL: | | | |

Fig. 32A

VENDOR INFORMATION - DEPOT CODE:

| | | | |
|---|---|---|---|
| VENDOR NAME: | | MARKUP VENDOR PARTS: | REGULAR MARKUP ▼ |
| ADDRESS1: | ☒ | DEFAULT PART CONDITION: | USED ▼ |
| ADDRESS2: | | VENDOR STATUS: | ACTIVE ▼ |
| CITY: | | CURRENCY: | DOLLAR ▼ |
| STATE: | | AE STATUS: | NON AE VENDOR ▼ |
| ZIP: | | QUALITY RATING: | A ▼ |
| COUNTRY: | ▼ | DEFAULT WARRANTY: | 90 (DAYS) |
| PHONE: | | PERCENT MARKUP: | 1 (PER PART) |
| FAX: | | DOLLAR MARKUP: | 0 (DOLLAR) |
| EMAIL: | ☒ | REGION ZONES: | PST ▼ |
| CONTACT NAME: | | CUT OFF TIME UPS: | 4:30 |
| PREFERENCES: | ▼ | CUT OFF TIME AIRBORNE: | |
| PAY TERMS: | | CUT OFF TIME FEDEX: | 4:30 |
| EMAIL PO: | NO ▼ | DATE UPDATED: | 3/28/02 12:33:48 PM |
| SHIPPING METHOD: | ▼ | | |
| COMMENTS | | | ▼ |

Fig. 32B

| LOGOUT | ORDERS ▼ | MAINTENANCE ▼ | HISTORY ▼ | REPORT ▼ |

CUSTOMER: NO CUSTOMER IS SELECTED

ORDER SEARCH

SEARCH BY ORDER STATUS
- ● ALL ORDERS & RFQS
- ○ ALL OPEN ORDERS
- ○ ALL PO'S
- ○ OPEN PO
- ○ NON-AE ORDERS ONLY
- ○ AE ORDERS ONLY
- ○ RFQ'S ONLY

ALL ORDERS ▼
- PO-RQD
- RESERVED
- RETURNED
- RFQ
- RFQ ACK
- RFQ CANCELLED
- RFQ DECLINED
- RFQ ITEM ORDERED
- RFQ QUOTED
- RFQ SHIPPED
- RFQ SIP

SEARCH BY ORDER DATE
☐ SEARCH BY DATES

START DATE: APR ▼ 3 ▼ 2002 ▼
END DATE: APR ▼ 3 ▼ 2002 ▼

SEARCH BY CRITERIA
- CUSTOMER
- VENDOR
- PART NUMBER
- CUSTOMER PART NUMBER
- PSN#
- CUSTOMER PO#
- ALORICA PO#
- RMA#
- RTV RMA#
- SALES REPRESENTATIVE
- DI#
- WAYBILL#
- CRA#

COLUMNS TO BE DISPLAYED ON RESULTS SCREEN

| ☑PSN# | ☐INTERNAL #A | ☑PRICE | ☑QUANTITY | ☐EXPECTED SHIP DATE |
|---|---|---|---|---|
| ☑ORDER DATE | ☐INTERNAL #B | ☑WAYBILL # | ☑ALORICA PO | ☐PO DUE DATE |
| ☑MFG PART # | ☑DESCRIPTION | ☑USERNAME | ☐CUST PART NO | ☐DELIVERY DATE |
| ☐PAY METHOD | ☐CRA# | ☐UPCHARGE | ☑STATUS | ☐SHIP DATE |
| ☑CUSTOMER PO | ☑VENDOR COMMENTS | ☐CUSTOMER NAME | ☐DI# | ☐ETA DATE |
| ☐INSIDE REP | ☑OUR COST | ☐VENDOR | ☐UPCHARGE COST | ☐CUSTOMER CONTACT |
| ☐OUTSIDE REP(S) | ☑MANUFACTURER | ☐CONDITION | ☐SHIPPING | ☐ACCEPT/DECLINED |
| ☐CUSTOMER COMMENTS | ☐ALORICA COMMENTS | ☐CARRIER | ☐CARRIER ACCOUNT# | |

DISPLAY RESULTS PAGE AS  TABLE ▼
NUMBER OF ROWS TO BE DISPLAYED PER PAGE  25 ▼

[SUBMIT] [RESET] [VIEW SAVED CARTS]

Fig. 33

OLR - ON LINE REQUISITION
(MULTI-FUNCTIONAL)

LOGOUT | ORDERS ▶ | MAINTENANCE ▶ | HISTORY ▶ | REPORT ▶ | ACCOUNTING ▶

USERNAME: CONNIE DENTZ

CUSTOMER: NO CUSTOMER IS SELECTED

OLR FULFILLMENT

| | IPO | STK | SUB | ID | C/I | VENDOR | PART# | DESCRIPTION | COND | RQD QTY | O/H QTY | SHORT QTY | IPO QT | COST | SUB PART# |
|---|---|---|---|---|---|---|---|---|---|---|---|---|---|---|---|
| ORDER | ☐ | ☐ | ☐ | 50225 | C | ALORICA STOCK | 556 | TEST | | 1 | 0 | 1 | 0 | $0.00 | |
| ORDER | ☐ | ☐ | ☐ | 3310749 | C | ALORICA STOCK | DOA TOWER T1090 | BAD MODEM | | 1 | 0 | 1 | 0 | $0.00 | |

Fig. 34

REPORT PERIOD: 4/1/2002 - 4/3/2002
DETAIL

TOTAL AMOUNT: $1,789.57
TOTAL RECEIVED: $0.00
TOTAL DIFFERENCE: $1,789.57
TOTAL RECORD(S): 9

| RMA REC DATE | ALORICA RMA | RMA REASON CODE | PO# | VENDOR NAME | RTV NO | WAYBILL NO. | VENDOR CR# | EXPECTED CREDIT | AMOUNT RECEIVED | REV DATE | STATUS | |
|---|---|---|---|---|---|---|---|---|---|---|---|---|
| 04/03/2002 | RMA144742567-04/14 | DOA | UC03110071 | | PCF0030228015 | | | $30.00 | $0.00 | | OPEN ▼ | UPDATE |
| 04/01/2002 | RMA153819697-04/16 | WRONG PART SHIPPED | UC03140039 | | 59868 | | | $325.00 | $0.00 | | OPEN ▼ | UPDATE |
| 04/01/2002 | RMA110442020-04/15 | GOOD UNUSED | UC03190065 | | 59785 | | | $432.65 | $0.00 | | OPEN ▼ | UPDATE |
| 04/01/2002 | RMA115914473-03/28 | WRONG PART SHIPPED | UC03050075 | | R5289 | 1ZA867T90340781858 | | $12.00 | $0.00 | | OPEN ▼ | UPDATE |
| 04/03/2002 | RMA094358073-04/08 | GOOD UNUSED | UC02280025 | | 38687 | | | $195.00 | $0.00 | | OPEN ▼ | UPDATE |
| 04/04/2002 | RMA094937527-04/08 | GOOD UNUSED | UC02280025 | | 38688 | | | $92.42 | $0.00 | | OPEN ▼ | UPDATE |
| | | | | SOUTHWEST | | | | | | | | |

FORECAST REPORT

SELECT VENDOR OR SEARCH CRITERIA
SELECT VENDOR ▼ GO

VENDOR NAME:

| ROW | PART NUMBER | TOTALSHIP_90DAYS | AVGSHIP_30DAYS | QTY NEEDEDFOR 30_DAYS | AVG COST |
|---|---|---|---|---|---|
| 1 | 02K7018 | 88 | 29.4 | 29 | $ |
| 2 | 05K8874 | 60 | 20.1 | 20 | $ |
| 3 | 335508-001 | 51 | 17.1 | 17 | $ |
| 4 | 05K7046 | 42 | 14.1 | 14 | $ |
| 5 | 8120-6313 | 40 | 13.2 | 13 | $ |
| 6 | 179161-001 | 18 | 6 | 6 | $ |
| 7 | 307713-001 | 20 | 6.6 | 6 | $ |
| 8 | 314941-001 | 18 | 6 | 6 | $ |
| 9 | 307713-021 | 17 | 5.7 | 5 | $ |
| 10 | 335507-001 | 17 | 5.7 | 5 | $ |
| 11 | 02K1146 | 13 | 4.2 | 4 | $ |
| 12 | 08L3161 | 13 | 4.2 | 4 | $ |
| 13 | 166973 | 14 | 4.8 | 4 | $ |
| 14 | 1215546 | 10 | 3.3 | 3 | $ |
| 15 | 135229-001 | 10 | 3.3 | 3 | $ |
| 16 | 296681-001 | 9 | 3 | 3 | $ |
| 17 | 308011-001 | 9 | 3 | 3 | $ |
| 18 | 313901-001 | 11 | 3.6 | 3 | $ |
| 19 | RG5-087901300CN | 11 | 3.6 | 3 | $ |

METHOD, SYSTEM, AND PROGRAM FOR CUSTOMER SERVICE AND SUPPORT MANAGEMENT

CROSS REFERENCE TO RELATED ART

This is a continuation-in-part of U.S. patent application Ser. No. 09/826,121, filed Apr. 4, 2001, and U.S. patent application Ser. No. 10/112,585, Express Mail No. EU087729223US, filed Mar. 29, 2002, which are hereby incorporated by reference in their entirety.

BACKGROUND OF THE INVENTION

1. Field of the Invention

The present invention relates in general to business management software, and more particularly to a web-based, integrated service and support software suite.

2. Description of the Related Art

Managing product logistics and customer care is often the most difficult aspect of business. Companies have invested huge amounts of money and resources to make sure their products are readily available and that their customers receive the best service. However, customer relations do not end with the sale of the product. Servicing a customer after the purchase of a good is also a major challenge to the manufacturer of that product Responding to e-mail inquiries and field service requests is a labor intensive exercise often requiring huge labor support. The problem is compounded because a customer will often contact the manufacturer after the purchase only if something has gone wrong. Either the product is not performing properly or the customer has problems operating the device. Usually, such situations create a difficult atmosphere where the customer will often be in an impatient mood. Therefore, the type of experience a customer may have in contacting the manufacturer or manufacturer's representative may directly affect the manufacturer's reputation, the loyalty of the customer for future purchases of the manufacturer's product, and/or the future retail value of the product itself.

Furthermore, managing customer service has been a difficult task because multiple parties are involved throughout the customer service process. The manufacturer, supplier, retailer, and back-end (i.e. after purchase) service provider are often completely separate and independent organizations. For example, manufacturers will often outsource the call handling process to a third party call center, independent from the manufacturer. If the customer service center needs to order a replacement product or order warranty/repair work, the customer service center would have to go outside its organization to perform the work. Therefore, the managing of the process has been a difficult task for the manufacturer and its third party vendors.

Systems in the prior art have attempted to create business solutions by computerizing parts of the process. Complex and expensive Enterprise Resource Planning ("ERP") software has been used by large scale manufacturers to control the inventory and supply chain. In addition, various call tracking software have been created to assist operators in correctly taking down information from the customer. In addition, client/customer management software has been created to keep track of contact information and customer purchases. Moreover, an existing warehouse or repair facility software would track the product through the repair process, to identify the location and estimated dates relevant to the product. However, the existing business tools are often not compatible with each other, causing redundancy, integration and implementation problems. Moreover, because each business tool requires a separate software license, for a small or medium size business, the existing tools are often cost prohibitive.

Accordingly, there is a need in the art for an improved business management system that addresses the concerns of the providing back-end services for manufacturers and retailers, their customers, and their third party vendors.

SUMMARY OF THE INVENTION

The preferred embodiments provide a computerized system, method, and program for providing a multi-functional customer and product management tool over a common network, such as the Internet, available to various parties such as the client/manufacturer, repair facility, call center, and the warehouse. To this end, a common customer record for each customer is generated in a database which can be updated to include information such as customer contact and purchase history information. In addition, a common product record for each product is generated in a database which can be updated to include information such as general product and warehouse inventory information. Both the customer and product records are then made available to a user depending on the functionality of the management tool chosen by the user. In addition, the management tool allows the user depending on the chosen functionality of the management tool to update customer and product information. Moreover, the management tool keeps track of all additions and modifications to customer and product information to provide better customer support and error detection. In addition, the preferred embodiments of the management tool provide sales automation, contact management, a back-end electronic commerce and procurement solutions to process and control all aspects of the purchase and shipping process. Lastly, the preferred embodiments of the management tool are able to act as a decision support system by providing reports to assist managers in making executive decisions.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide a further explanation of the invention as claimed.

BRIEF DESCRIPTION OF HE DRAWINGS

The accompanying drawings, which are included to provide a further understanding of the invention and are incorporated in and constitute a part of this specification, illustrate embodiments of the invention and, together with the description, serve to explain the principles of the invention.

FIGS. 13 to 39 illustrate examples of HTML pages that are implemented as part of the graphical user interface.

DETAILED DESCRIPTION OF THE PREFERRED EMBODIMENTS

In the following description, reference is made to the accompanying drawings which form a part hereof and which illustrate the preferred embodiment of the present invention. It is understood that other embodiments may be utilized and structural and operational changes may be made without departing from the scope of the present invention.

Figure 1:
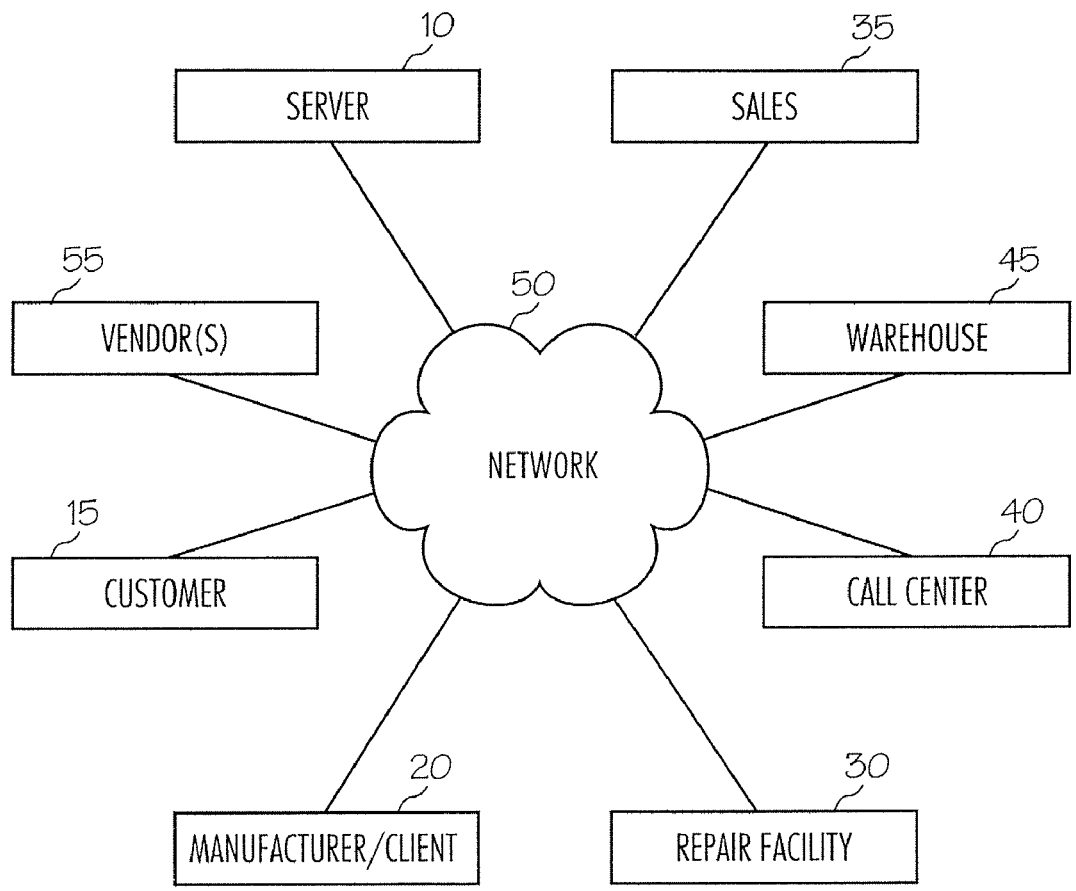
FIG. 1 illustrates a network computing environment in which preferred embodiments are implemented.

FIG. 1 is a schematic overview diagram of the network computing environment in which the preferred embodiments are implemented. In preferred embodiments, a server 10 is linked to a customer computer 15, a manufacturer/client computer 20, repair facility computer 30, a sales representative computer 35, a call center computer 40, a warehouse computer 45, and a single or multitude of vendors computers 55 (collectively "user computers") using a network 50, such as the Internet. The sales representative computer 35 may be incorporated into the call center computer 40. The network 50 may be comprised of any network system known in the art including TCP/IP based networks (e.g., an Intranet, the Internet), LAN, Ethernet, WAN, Wireless Application Protocol (WAP), etc. Alternatively, there may be separate and different networks between the components. Further, there can be numerous customer, manufacturer/client, repair facilities, sales representatives, call center, vendors, and warehouse computers; however a single computer 15, 20, 30, 35, 40, 45 and 55 for each category of user is used for illustration purposes.

Figure 2:
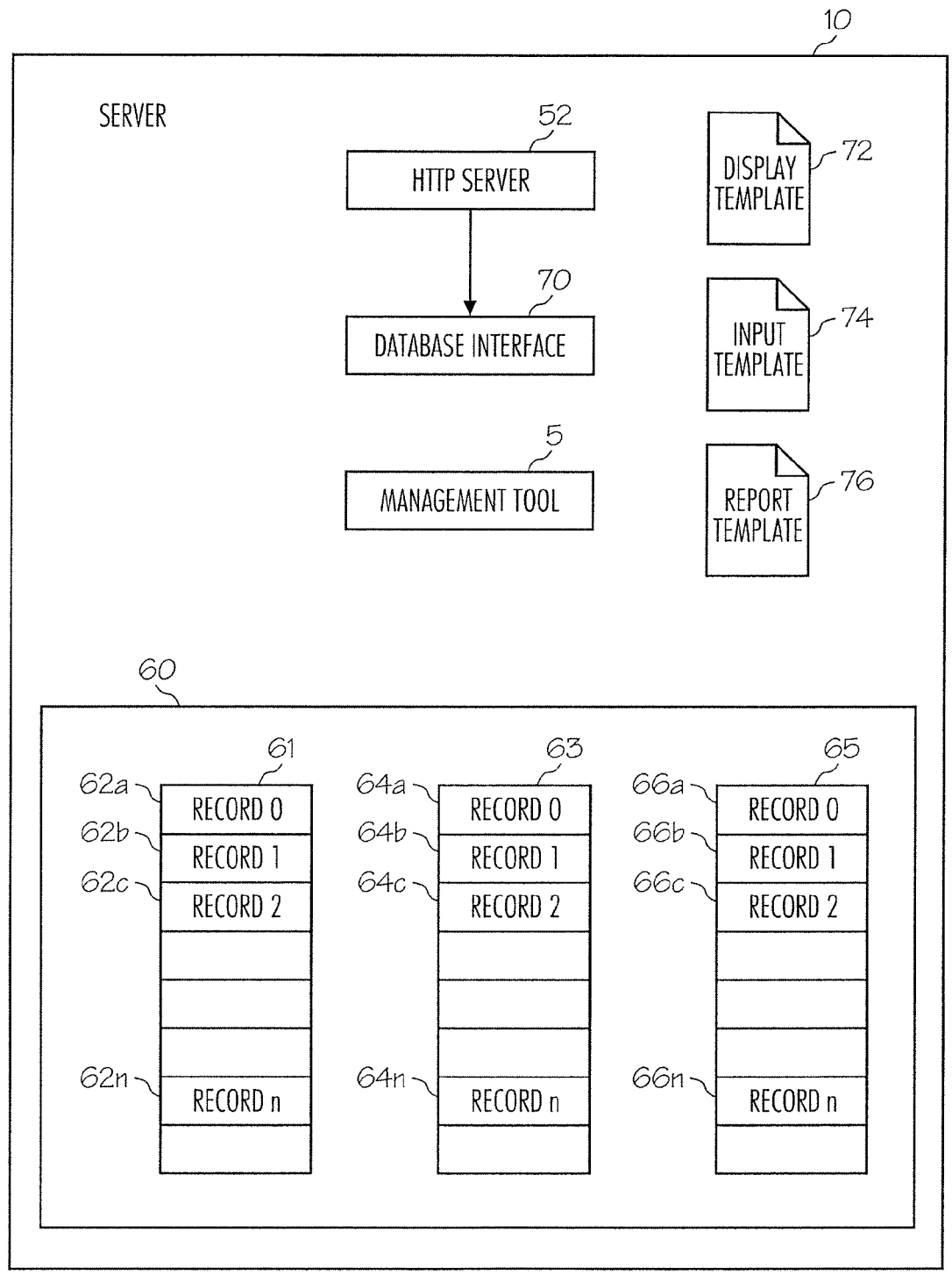
FIG. 2 illustrates a computing environment of a server in accordance with preferred embodiments of the present invention.

FIG. 2 illustrates software components in the server 10 in which preferred embodiments are implemented, including a Customer and Product Management Tool 5, a Hypertext Transfer Protocol (HTTP) server 52, database 60, database interface 70 and templates 72, 74, and 76. The HTTP server 52 responds to requests from the user computers 15, 20, 30, 35, 40, 45 and 55 using HTTP client programs, such as web browser programs known in the art. Upon accessing the server 52 through the network 50 using a unique network address, such as an IP address, the management tool 5 will give specific access to the various modules in the management tool 5, depending on the secured identification provided by the user computers 15, 20, 30, 35, 40, 45 and 55. The management tool 5 works in conjunction with the database interface 70 to retrieve and store data in database 60 to coordinate the various customer and product management processes. The management tool 5 and its specific modules will be discussed in more detail below with respect to FIG. 4.

The database 60 provides the customer, manufacturer/client, repair facility, sales representative, call center, vendor(s) and the warehouse with a central location to store and retrieve current, accurate information for varying parts of the client/product management process. The database 60 comprises a database program known in the art, such as a relational database program. In the preferred embodiments, the database 60 includes, for example, three database tables 61, 63, and 65. Database table 61 includes records 62a, b, ... n, which are used in the preferred embodiment as customer records 62a, b, ... n to store information about the customer. Similarly, database table 63 includes records 64a, b, ... n, which are used in the preferred embodiment as user records 64a, b, ... n to store information about the various users of the client/product management software, and finally, database table 65 includes records 66a, b, ... n, which are used in the preferred embodiment as product records 66a, b, ... n to store information about the various products.

The database interface 70 may comprise a Common Gateway Interface (CGI) program, a Java servlet, or other web page implementation known in the art to present the information in database 60 in a presentable format (e.g. HTML page, etc.). In preferred embodiments, the database interface 70 uses a secured login/password verification for identifying the individual customer 15, manufacturer/client 20, repair facility 30, sales representative 35, call center 40, warehouse 45 and vendor 55 computers contacting the HTTP server 52. The individual user's login/password is compared with the login/password stored in the user record table 63 to verify the identity of the user. The unique identification will allow the database interface 70 to identify which parts of the customer or product records 62a, b, ... n or 66a, b, ... n are accessible by the requesting party and will appropriately give read/write capabilities to the customer or product records 62a, b, ... n or 66a, b, ... n.

For example, the secured login id for a call support representative ("CSR") will give the access to the customer information records, field service administration records, etc., but not to the inventory management records. In addition, the accessed user records 64a, b, ... n will have associated information pertinent to the user. Additional details of the particular records available to each party will be discussed below in conjunction with the specific modules that are part of the preferred embodiment.

The server 10 further stores a display template 72, an input template 74, and a report template 76 which are preferably implemented in a document in which dynamic content may be generated (i.e. HTML, Extended Markup Language (XML) Document, etc.). Differing variations of the display template 72, input template 74 and report template 76 exist for the users, depending on the information to be displayed or inputted, but a single display template 72, input template 74, and report template 76 are used for illustration purposes in FIG. 2.

The display template 72 is used to provide the user computers 15, 20, 30, 35, 40, 45 and 55 with customer and/or product information from the database tables 61 and 63. The database interface 70 generates data into the display template 72 from one or more of the records 62a, b, . . . n and/or 66a, b, . . . n in the database 60. The input template 74 includes fields in which the user computers 15, 20, 30, 35, 40, 45 and 55 may enter information on the customer/management process and used to update one or more records 62a, b, . . . n and/or 66a, b, . . . n in the database 60. Lastly, the report template 76 is used to generate various reports based on the information stored in one or more of the records 62a, b, . . . n and/or 66a, b, . . . n.

For example, from the input template 74, the user enters an order number or other information and submits a request for records pertaining to the information entered. This action prompts a command script, an executable program that calls on stored procedures, such as dynamic link libraries (DLL). These separate procedures are specific to the type and content of information that can be generated from the database 60. The selected procedure then, using a structured query language (SQL) engages the database 60 to extract the requested and relevant information, resulting in the queried result. The library of stored procedures of the present invention allows for greater speed and access to information stored in the database 60.

The database 60, display template 72, input template 74, and report template 76 are preferably stored in a non-volatile storage system, such as one or more hard disk drives, used by the server 10 for storage. The server 10 may load data from the storage system into volatile memory (not shown) when processing.

The server 10 or the user computers 15, 20, 30, 35, 40, 45 and 55 may comprise any type of computer device known in the art, including server, personal computer, mainframe, workstation, hand held device, etc. Moreover, the server 10 may comprise one or more separate computer systems to run the different program components 52, 60, and 70.

Figure 3:
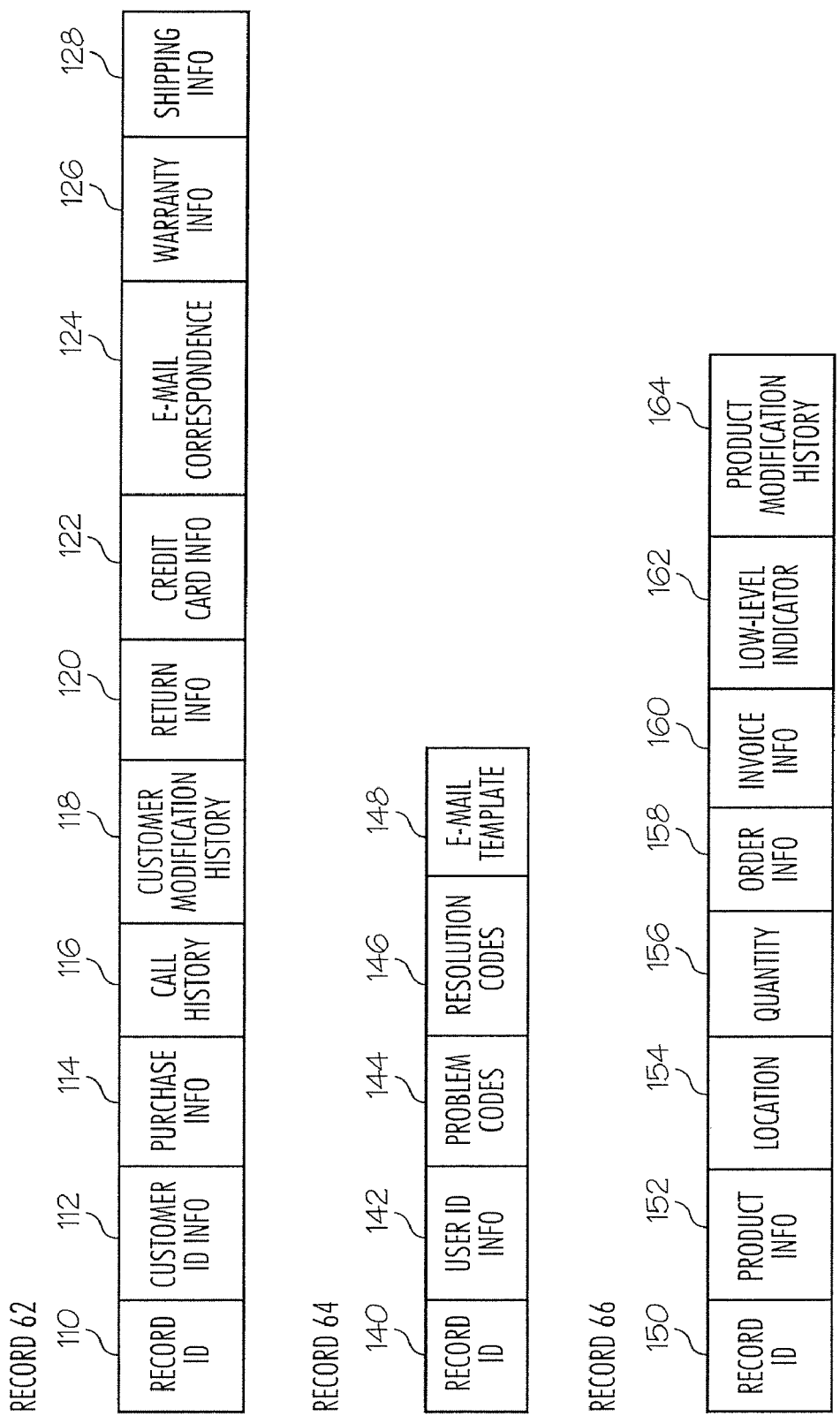
FIG. 3 illustrates files in records in accordance with preferred embodiments of the present invention.

FIG. 3 provides an illustrative implementation of the fields in the customer records 62a, b, . . . n, which include:

Record ID 110: Provides a unique identifier generated by the database interface 70 for each customer.

Customer ID Information 112: Comprises one or more sub-fields indicating the name, customer id #, address, telephone, and other contact information of the user.

Purchase Info 114: Comprises one or more sub-fields providing purchasing history about the customer including the serial #s, model names, parts requests, and dates of all products purchased by the customer.

Call History 116: Comprises one or more sub-fields providing contact history of customer contact including all calls, e-mails or letters from the customer.

Customer Modification History 118: Comprises one or more sub-fields indicating any change to the customer record including modifier's name, date, etc.

Return Information 120: Comprises one or more sub-fields indicating any products being returned, return merchandise account #s ("RMA") (the number assigned to track the returned merchandise), problem codes, and various dates (e.g. RMA issue date, shipped date, received date, etc.).

Credit Card Information 122: Comprises one or more sub-fields indicating the customer's card name, card number, expiration date, billing address, etc.

E-mail correspondence 124: Provides a log of all e-mail received and sent to the customer.

Warranty Information 126: Comprises one or more sub-fields recording field service information including any extended warranty services purchased, warranty service expiration dates, etc.

Shipping Information 128: Comprises one or more sub-fields recording the shipping information selected by the customer after the purchase of a product including the tracking information on the delivery of the product to the customer including method of shipment, carrier, date of shipment and estimated time of arrival ("ETA").

FIG. 3 also provides an implementation of the fields in the user records 64a, b, . . . n of the preferred embodiments, which include:

Record ID 140: Provides a unique identifier generated by the database interface 70 for each user.

User ID Information 142: Stores a unique username and password that identifies the user, and allows the user to login and access specific customer and/or product information.

Problem Codes 144: Provides codes specific to the user to identify problems/issues expected to be encountered by the user.

Resolution Codes 146: Provides codes specific to the user to identify solutions/conclusions expected to be derived by the user.

E-mail Templates 148: Provides basic templates to respond to e-mail based on problem codes.

FIG. 3 also provides an implementation of the fields in the product records 66a, b, . . . n of the preferred embodiments, which include:

Record ID 150: Provides a unique identifier generated by the database interface 70 for each product.

Product Information 152: Comprises one or more sub-fields indicating the product name, product id #, description, etc.

Location 154: Indicates the location of products currently available at the warehouse, supplier, and/or the store.

Quantity 156: Indicates the number of products currently available at the warehouse, supplier, and/or the store.

Order Information 158: One or more sub-fields set by the database interface 70 indicating the pull status (i.e. status of the products being pulled from the warehouse to the store or to be sent to the customer) and order status (i.e. status of the products being ordered from supplier).

Invoice Information 160: Comprises one or more sub-fields indicating the price, shipping fee, coupon information, etc. associated with the products.

Low-Level Indicator 162: Provides the preset number of products left in inventory before the notice of low-level is sent.

Product Modification History 164: Comprises one or more sub-fields indicating any change to the product record including modifier's name, date, etc.

Those skilled in the art will appreciate that FIG. 3 is a preferred embodiment of the record 62 a, b, . . . n, 64 a, b, . . . n, and 66 a, b, . . . n, but not as the only implementation. The records 62, 64, and 66 can be structured in many alternative formats to accomplish the present invention. For example, the separate Location 154 and Quantity 156 fields may not be needed and instead a single field may be used to indicate both the location and quantity. Another example is the problem codes 144 resolution codes 146, and e-mail templates 148 in the user record 64 do not need to be associated with directly with the user record 64, but instead stored on the server 10 apart from the database 60. Thus, the database tables 61, 63, and 65 can be structured in many alternative formats to accomplish the present invention.

Figure 4:
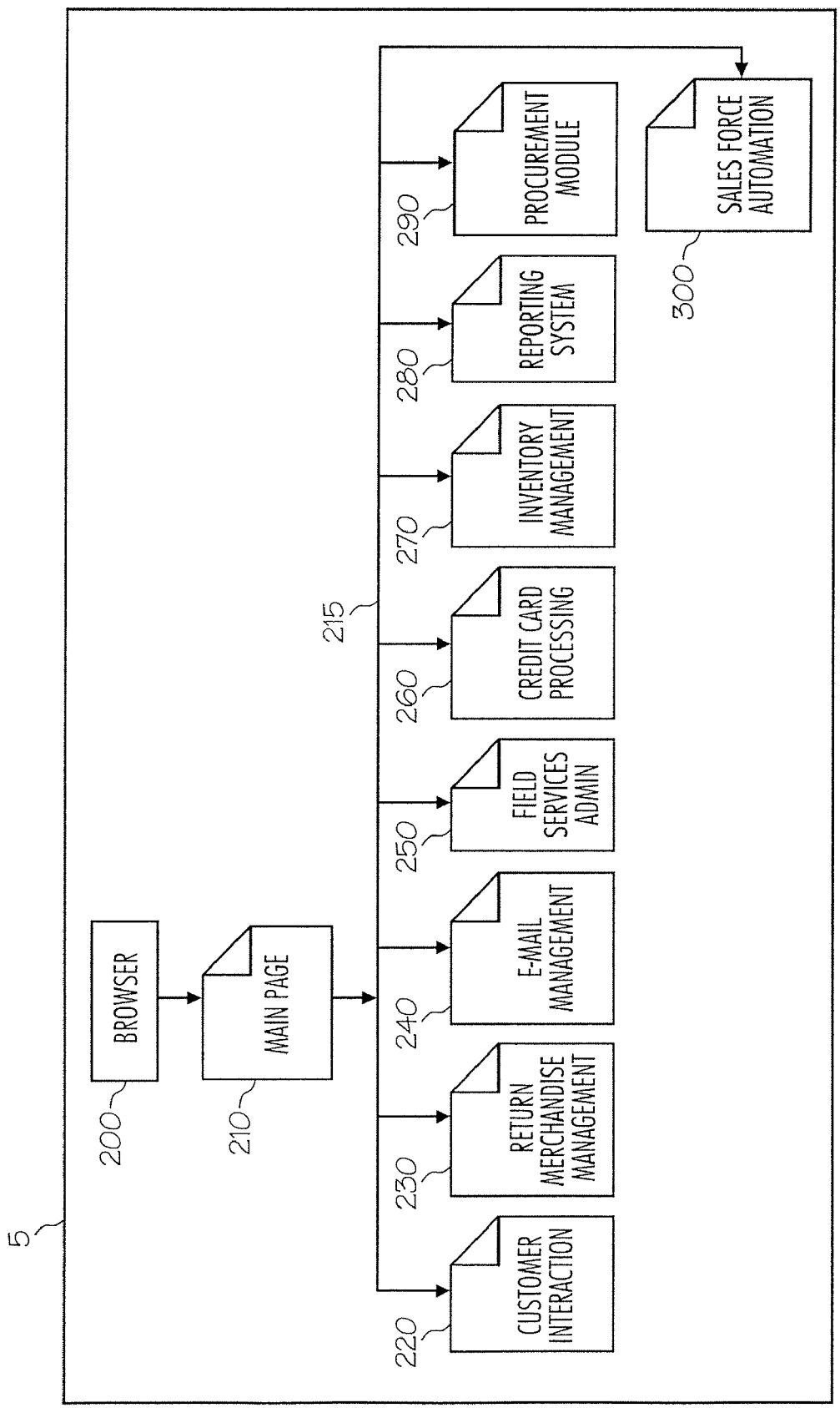
FIG. 4 illustrates the components of the management tool implemented to perform the present invention.

The management tool 5 of the present invention is an integrated customer and product management solution performing various tasks through different modules in the management tool 5. FIG. 4 gives an overview of the management tool 5 as it integrates the various modules 220, 230, 240, 250, 260, 270, 280, 290 and 300 through linked directories of pages that may be navigated using an Internet browser, e.g., Microsoft Internet Explorer, Netscape Communicator, etc.

FIG. 4 illustrates the components of the management tool 5, including a browser program 200, such as a web based browser or other viewing program known in the art, a main page 210 that provides an index to the other modules, including hyperlinks 215 to the actual modules 220, 230, 240, 250, 260, 270, 280, 290 and 300. The terms hypertext link and hyperlinks are used interchangeably herein to refer to an element in an electronic document that links to another place in the same document or to an entirely different document. Typically, a user clicks on the hyperlink to follow the link. Modules included in the management tool 5 are a Customer Interaction Module 220, a Return Merchandise Management module 230, an E-mail Management module 240, a Field Services Administration Module 250, a Credit Card Processing Module 260, an Inventory Management Module 270, a Reporting System module 280, a Procurement module 290, and a Sales Force Automation module 300. In the described implementations, the main page 210 provides hyperlinks 215 to one or more of the modules 220, 230, 240, 250, 260, 270, 280, 290 and 300, each comprised of multiple linked text plan pages which provide pertinent features and information relevant to the module using the common data stored in database 60. The modules will be discussed in greater detail with respect to FIGS. 5-12.

FIGS. 5A-5D, 6A-6D, 7, 8A, 8B, 9, 10E, 10F, 11 and 12 illustrate the program logic embedded in the management tool 5, HTTP server 52, and database interface 70 to implement the customer and product management processes of the preferred embodiments. In addition, FIGS. 13-39 will be discussed alongside the program logic to illustrate examples of HTML page implementations of various pages within the modules 220, 230, 240, 250, 260, 270, 280, 290, and 300 accessible through browser 200.

Figure 5A:
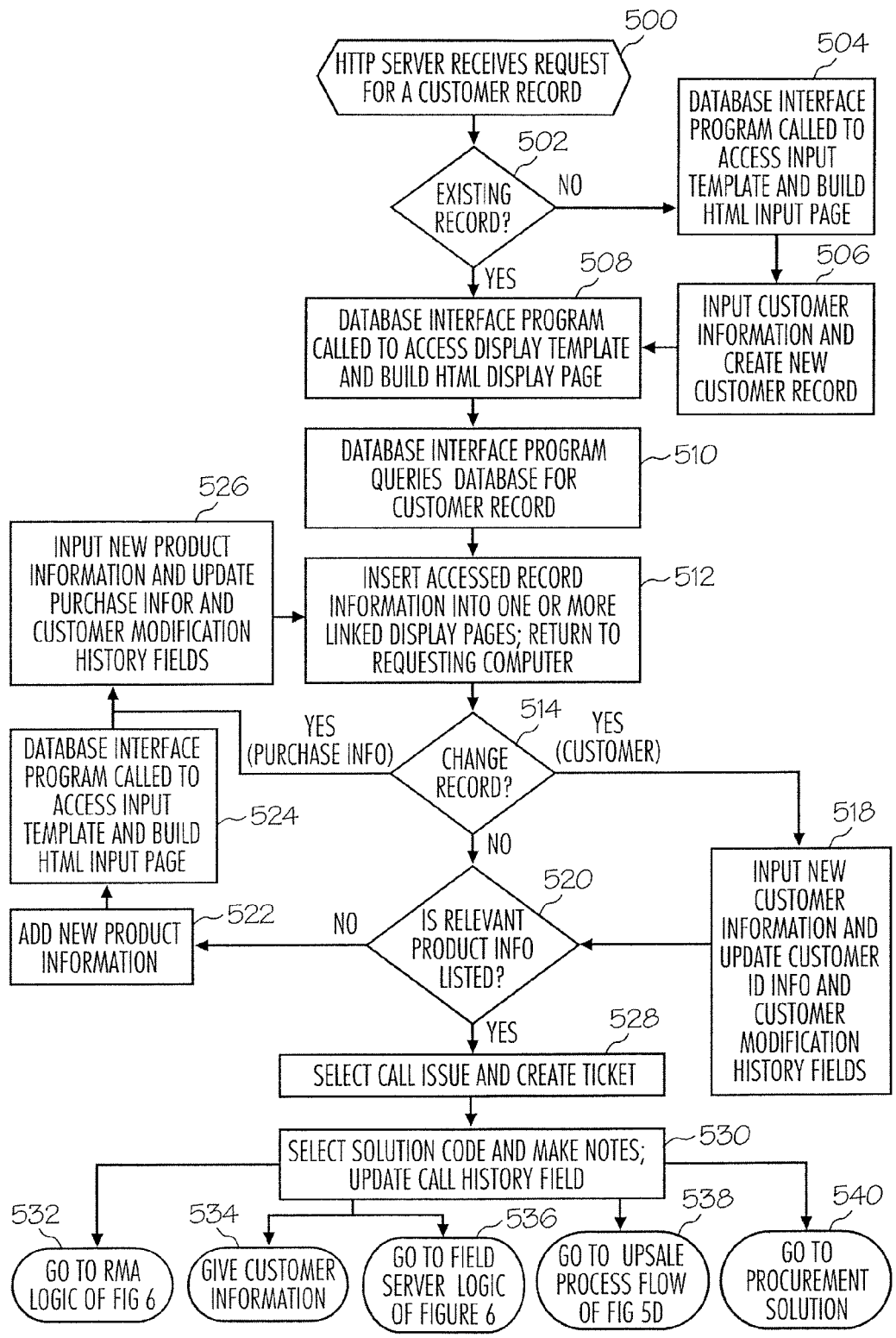
FIGS. 5A to 5D illustrate a program flow implemented in the server to provide customer and product information for the Customer Interaction Module.

FIG. 5A illustrates the program logic to provide customer record 62a, b, . . . n and product record 66a, b, . . . n information for the Customer Interaction module 220. Typically, the Customer Interaction module 220 begins with a phone call from the customer to the call center. However, the initial contact from the customer to the call center can also occur over the Internet in the form of live chat. The Customer Interaction module 220 allows the customer service representative (CSR) to maintain and log customer records for customers that call in for technical support, or customer service, such as purchase or information requests, e.g. status on a particular order. A CSR, who has already logged into the customer interaction module 220 via a secured identification and password, will handle the call and attempt to access the customer's information via the secured network 50. For customers in contact with the call center using live chat, the use of the'Internet for communication allows a CSR to simultaneously forward relevant HTML pages to the customer to expedite requests and provide real-time access for information.

At step 500, the HTTP server 52 receives a request from the call center computer 40 for information on a customer record 62a, b, . . . n. At step 502, a determination is made by the database interface 70 on whether the customer record exists. The database interface 70 can search for the customer record 62a, b, . . . n using the customer name, phone number, serial number, RMA number, or part request number looking at Customer ID Information 112, Purchase Information 114, and Return Information 120 Fields of the customer records 62a, b, . . . n. If no existing customer record is found, the customer interaction module 220 will give the option to add a new customer record.

To create a new customer record 62a, b, . . . n, the database interface 70 (at step 504) accesses the input template 74 and builds an HTML web page. At step 506, the built HTML input page is then sent to the call center computer 40, where the CSR can enter customer information such as name, address, phone number, e-mail, etc. The HTTP server 52 then receives the HTML input page with the customer information entered by the CSR. In response, the HTTP server 52 requests the database interface 70 to create a new customer record 62a, b, . . . n, and fill in the customer id information field 112 of the new record with the information inputted by the CSR, as well as keep track of the creation of the record 62 a, b, . . . n in the customer modification history field 118. The customer modification history field 118 will keep track of user name, date, description of changes, and any additional comments related to any modification in the customer record 62a, b, . . . n.

Whether a new record 62 a, b, . . . n is created or an existing customer record 62a, b, . . . n is found, the database interface 70 (at step 508) accesses the display template 72 and builds an HTML web page. The database interface program 70 queries (at step 510) the database table 61 for the requested or newly created record 62a, b, . . . or n and then inserts (at step 512) the returned information into the display template. The database interface 70 will then build one or more linked HTML web pages based on a display template 72 which will list a menu of information available to the CSR such as customer information, purchase history, customer service history, warranty and extended service agreement information, return information, part request information, credit card information, etc. Thus, the generated display pages can include information from such fields as Customer ID Information 112, Purchase Information 114, Call History 116, Customer Modification History 118, Return Information 120, Credit Card Information 122, E-mail Correspondence 124, Warranty Information 126, and Shipping Information 128.

Once the relevant customer record 62a, b, . . . n displayed, where an example of the customer record is shown in FIG. 13, the CSR at step 514 can make modifications to the customer information if the contact information needs to be changed. To update a customer record 62a, b, . . . n, at step 518, the CSR can just change and enter the new customer information such as name, address, phone number, e-mail, etc. In response, the HTTP server 52 requests the database interface 70 to update the customer id information field 112 with the new information and record the change in the customer modification history field 118 of the specific customer record 62a, b, . . . n.

Figure 14:
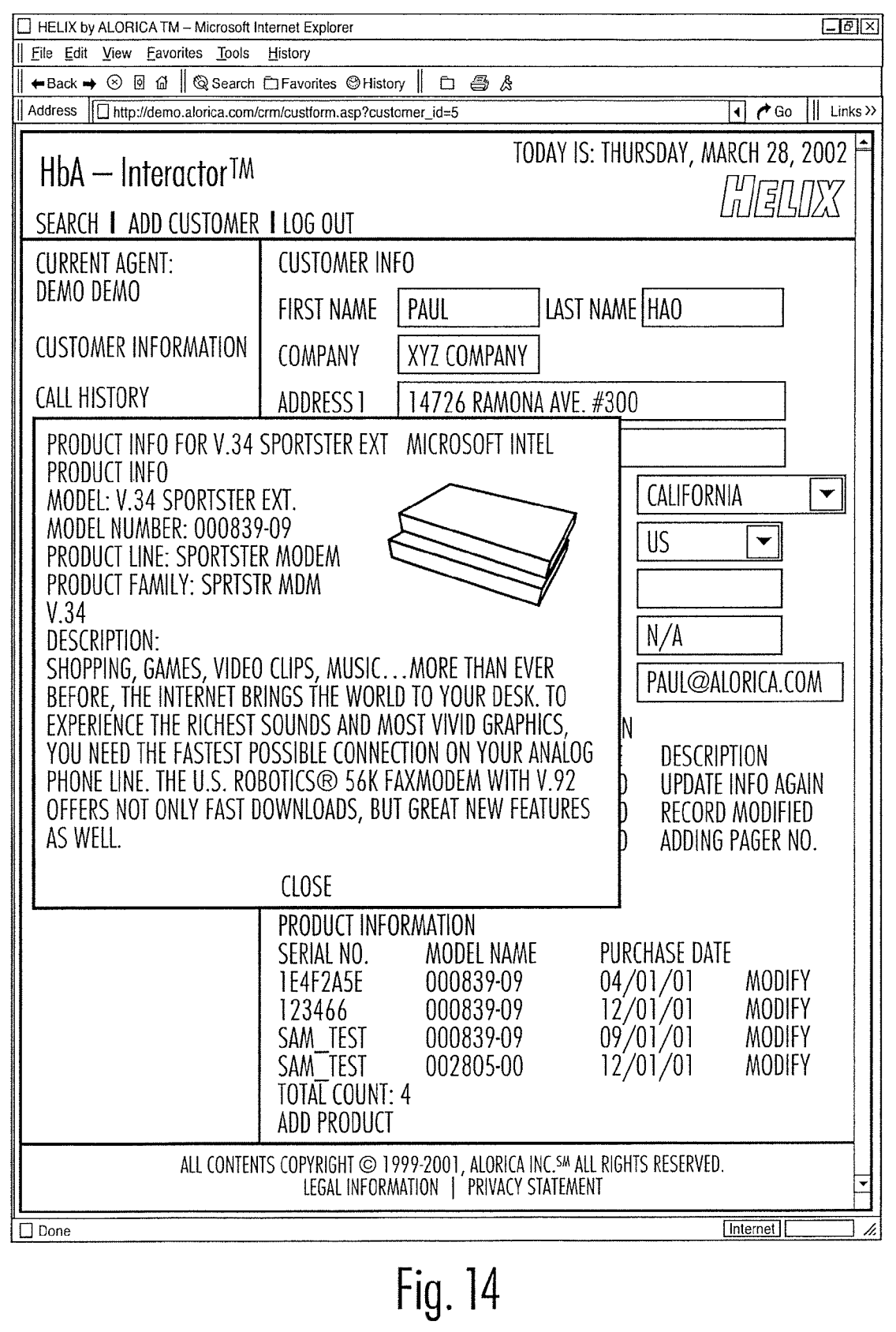
Figure 15:
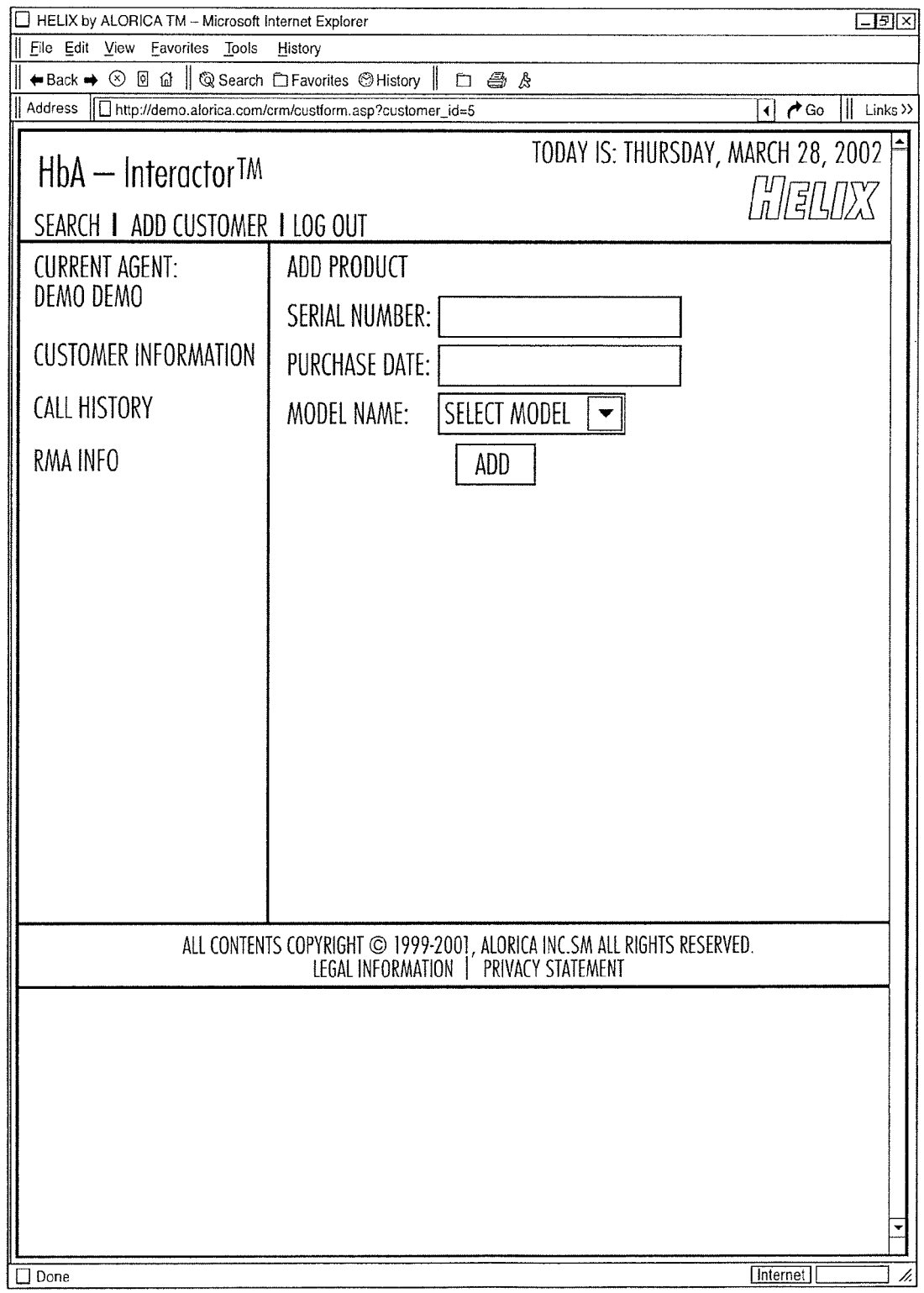

Similarly, at step 514, the CSR can also change the product information, where the purchase information 114 and the customer modification history 118 fields will be updated at step 526. At step 520, if relevant product information, as shown in FIG. 14, which the customer is calling about is not listed, the CSR can add a new product under the customer's record, as shown in FIG. 15.

To add new product information, the database interface 70 (at step 524) accesses the input template 74 and builds an HTML, web page. At step 526, the built HTML input page is then sent to the call center computer 40, where the CSR can enter the product information such as product name, model number, serial number, purchase date, vendor (if procured via Procurement module 290), etc. The HTTP server 52 then receives the HTML input page with the purchase information entered by the CSR. In response, the HTTP server 52 requests the database interface 70 to update the purchase information 114 and the customer modification history 118 fields, and the updated customer record 62$a$, $b$, ... $n$ will be redisplayed in one or more linked display pages at step 512.

Figure 16:
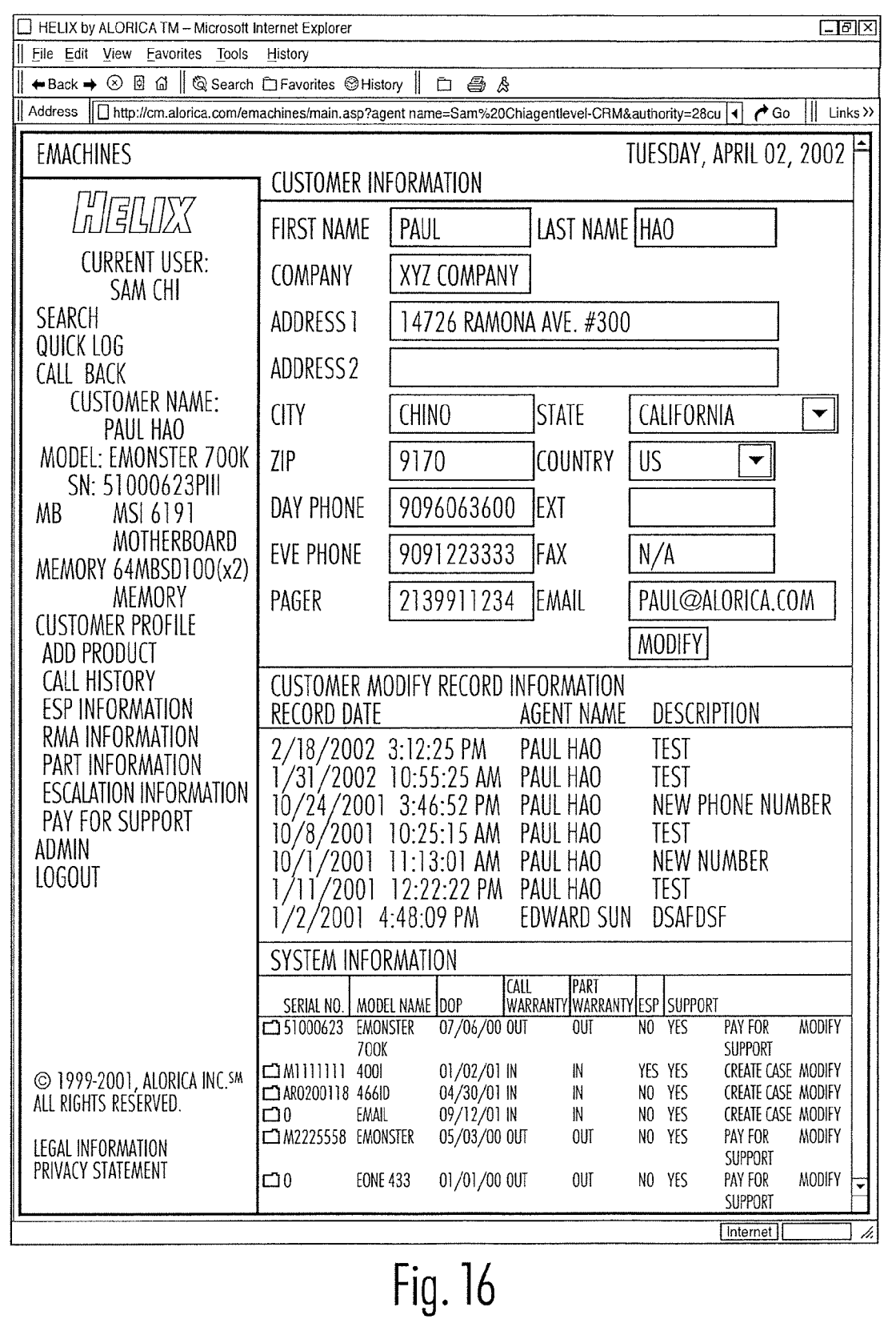

If the relevant product information is listed as seen in FIG. 16, the CSR can then select the create ticket page since each customer interaction has to be tracked before it is terminated. FIG. 16 is also shows an example of the "Create Ticket Page." At step 528, the CSR can select a call issue or problem code from the list of problem codes likely to be encountered by the CSR from the list stored in Problem Codes 144 field associated with the user, and create a ticket.

In the preferred embodiments, the CSR, at step 530, then fills out a note field explaining the reason for the call and the resolution for the call, as well as selecting a resolution code from the list stored in the Resolution Codes 146 field associated with the user. The codes are completely customizable and can include "Resolved Inquiry," "Processed Sale," "Issued RMA," "No Action," "Reported Complaint," for customer service/returns issues or product/part codes directly such as "Modem," "HDD," "Motherboard", etc. Depending on the solution, the CSR can then enter the Return Merchandise Management 230 (at step 532), the Field Services Administration 250 (at step 536), Procurement (at step 540) modules, or simply give the customer information (at step 534—see FIG. 6). Alternatively, the CSR can begin an "upsale" process at step 538, as described in FIG. 5D below, to perform further customer and sales services.

Figure 5B:
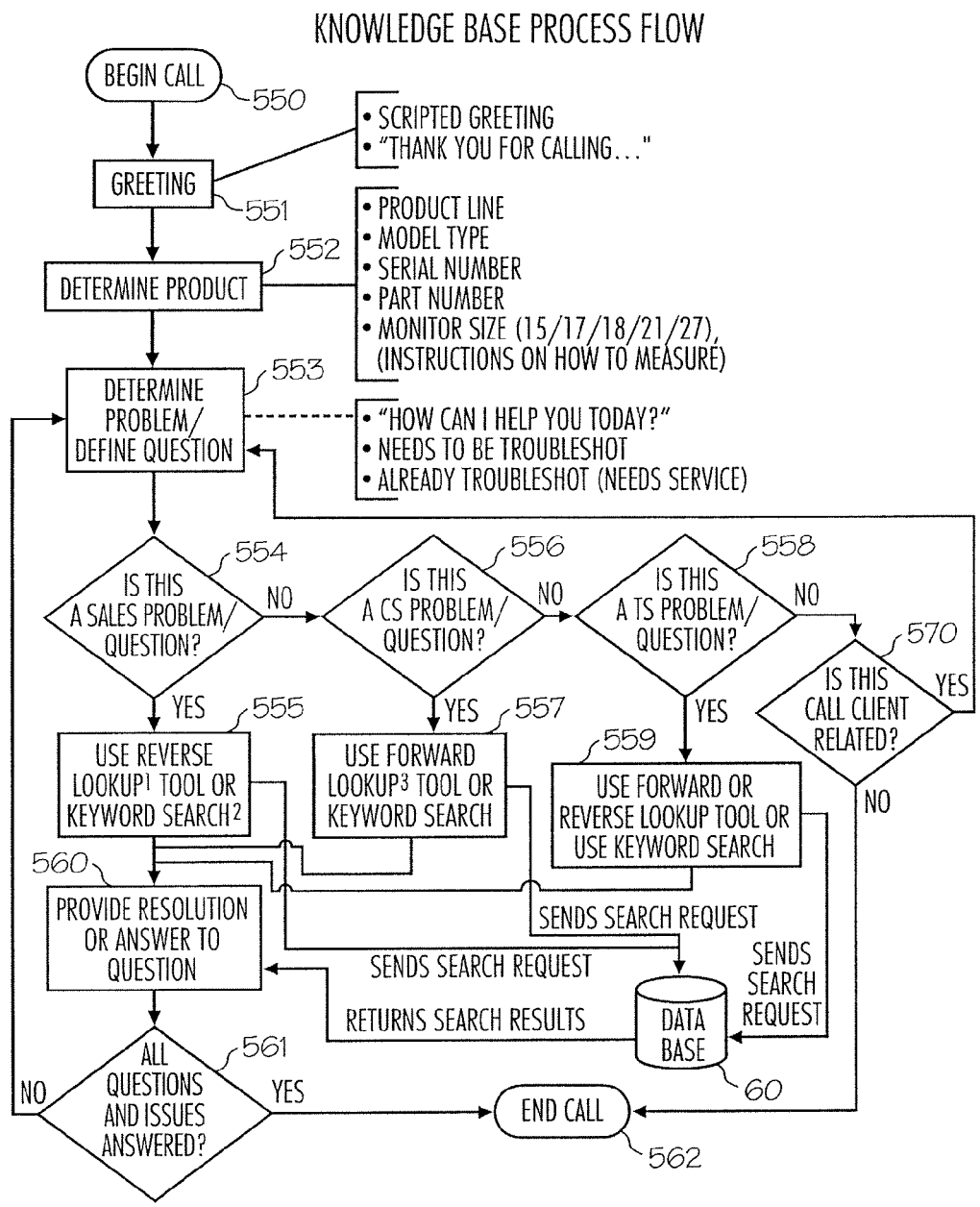

FIG. 5B illustrates the knowledge base implemented in the management tool 5, HTTP server 52, and database interface 70 to administer customer interaction through the module 220. For example, a telephone call from a customer to the client's call center is made (step 550), which elicits a greeting from a CSR (step 551). The CSR, in step 552, determines the product or part the customer's call is regarding. In step 553, the CSR determines the customer's problem or defines the customer's question. At step 554, the CSR determines whether the customer's call concerns a sales problem or question. If so, the CSR is able to search the database 60, as shown in FIG. 17, for pertinent customer and product information using Reverse Lookup or Keyword search methods at step 555. If the customer's call concerns customer service (CS) (step 556), the CSR would be able to search the database 60 for relevant customer information using Forward Lookup or Keyword search methods at step 557. Should the call relate to technical support (TS) (step 558), the CSR would be able to search the database 60 for applicable customer and product information using Forward or Reverse Lookup and/or Keyword search methods at step 559. The searches conducted by the CSR in steps 555, 557, and 559 begin with queries made using the database interface 70 and management tool 5 and are further demonstrated by step 510 in FIG. 5A.

Figure 18:
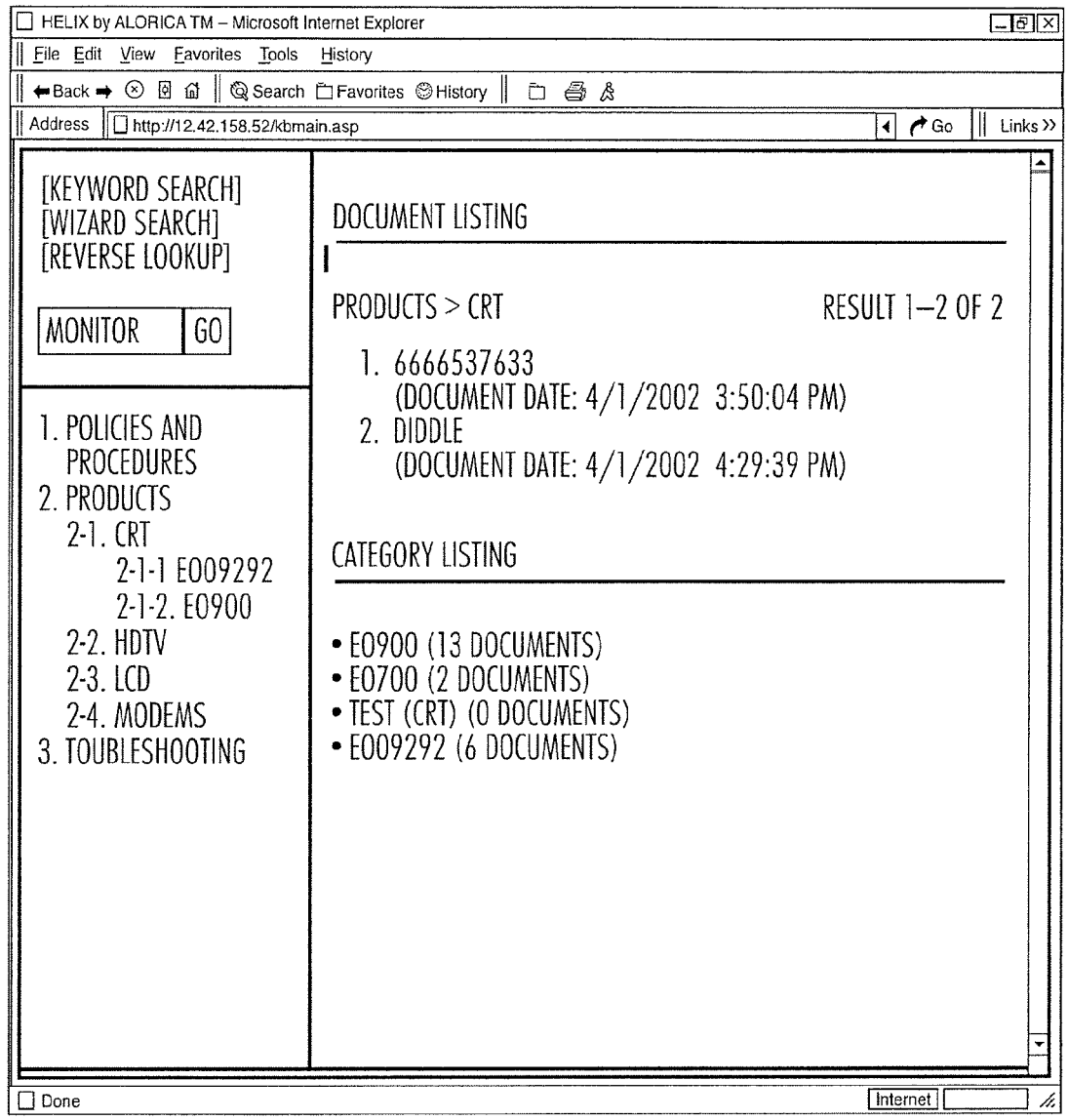

If and when the searches are requested and made by the CSR, the search results are extracted from the records in database 60, as shown in FIG. 18, and should provide a resolution or question to the customer's problem or question (step 560). If all of the issues and questions presented by the customer are answered by the CSR (at step 561), then the call is ended (step 562). If the customer still has further problems or questions, then the process is restarted at step 553. Finally, if the customer's call does not concern sales, CS, or TS but is related to the client (at step 570), then the process returns to step 553. If the call does not relate to the client, then the call is ended (step 562).

Figure 5C:
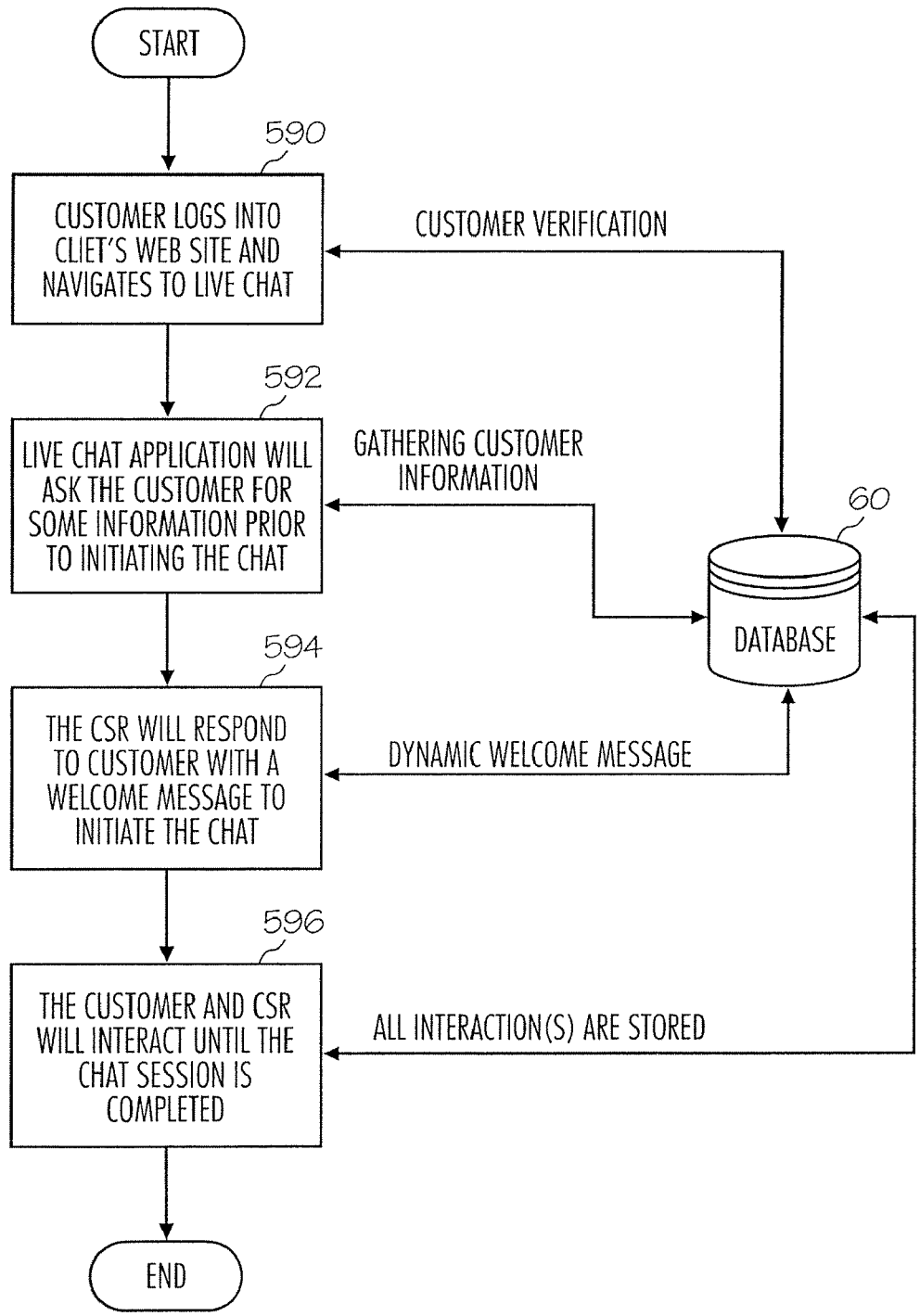
Figure 19:
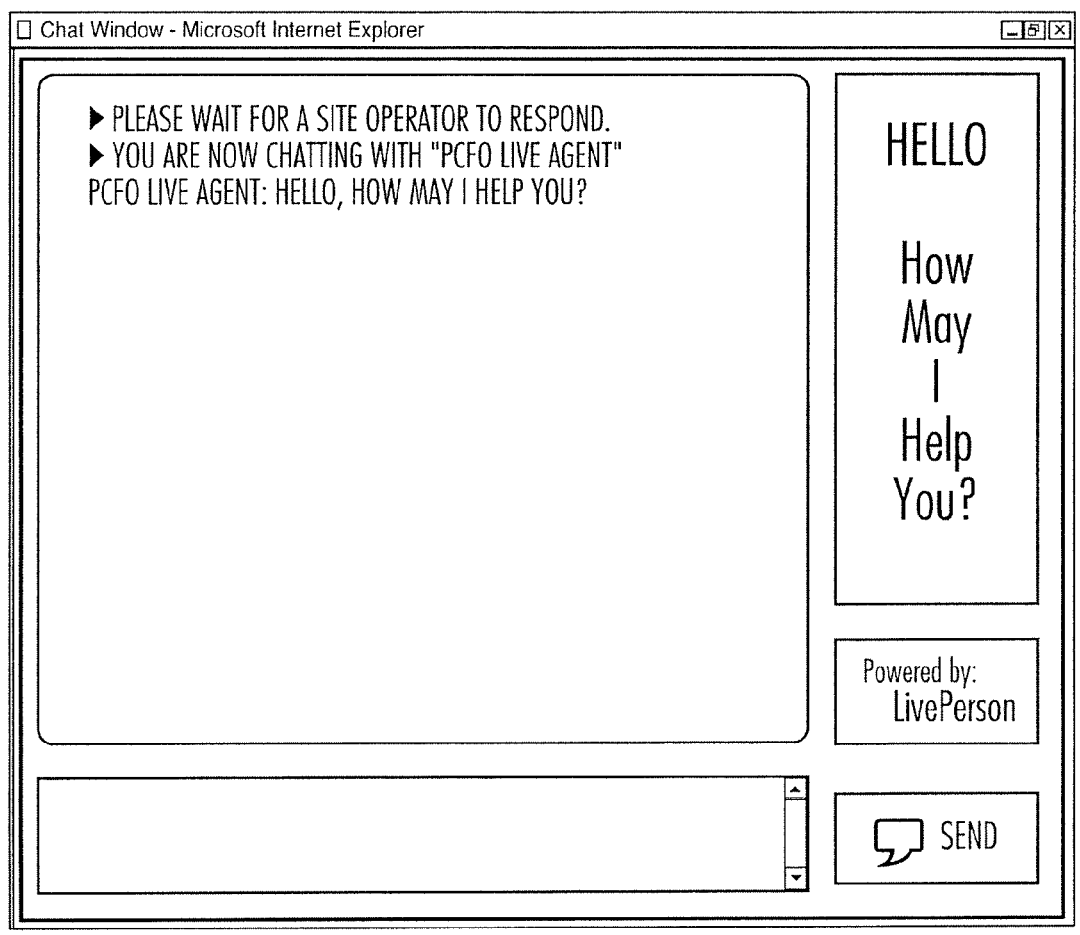

FIG. 5C illustrates the example of the program logic implemented in the management tool 5, HTTP server 52, and database interface 70 to administer customer interaction via live chat through the Customer Interaction module 220. At step 590, the customer, logs into the client's website through the network 50 using the customer computer 15. Using an Internet browser such as Microsoft Internet Explorer or Netscape Communicator, the customer navigates to the Live Chat. At this stage, the customer's login information is verified with the customer records 62$a$, $b$, ... $n$ stored in the database 60. The Live Chat features of the Customer Interaction module 220 will request for information from the customer prior to initiating the chat (step 592). This information is then used to further update the customer records in the database 60 if necessary. In step 594, a CSR will respond to the customer with a welcome message to initiate the chat as shown in FIG. 19. A dynamic welcome message that may be dependent on the customer's profile (i.e., relating to product reference by customer), which is created from the customer records 62$a$, $b$, ... $n$ in the database 60, is used in step 594 by the CSR. The customer and the CSR will then interact, as show in FIG. 5A, until the chat session is completed (step 596). During this session, all interactions are stored in the customer's records by the CSR in the database 60 through the database interface 70 and management tool 5.

Figure 5D:
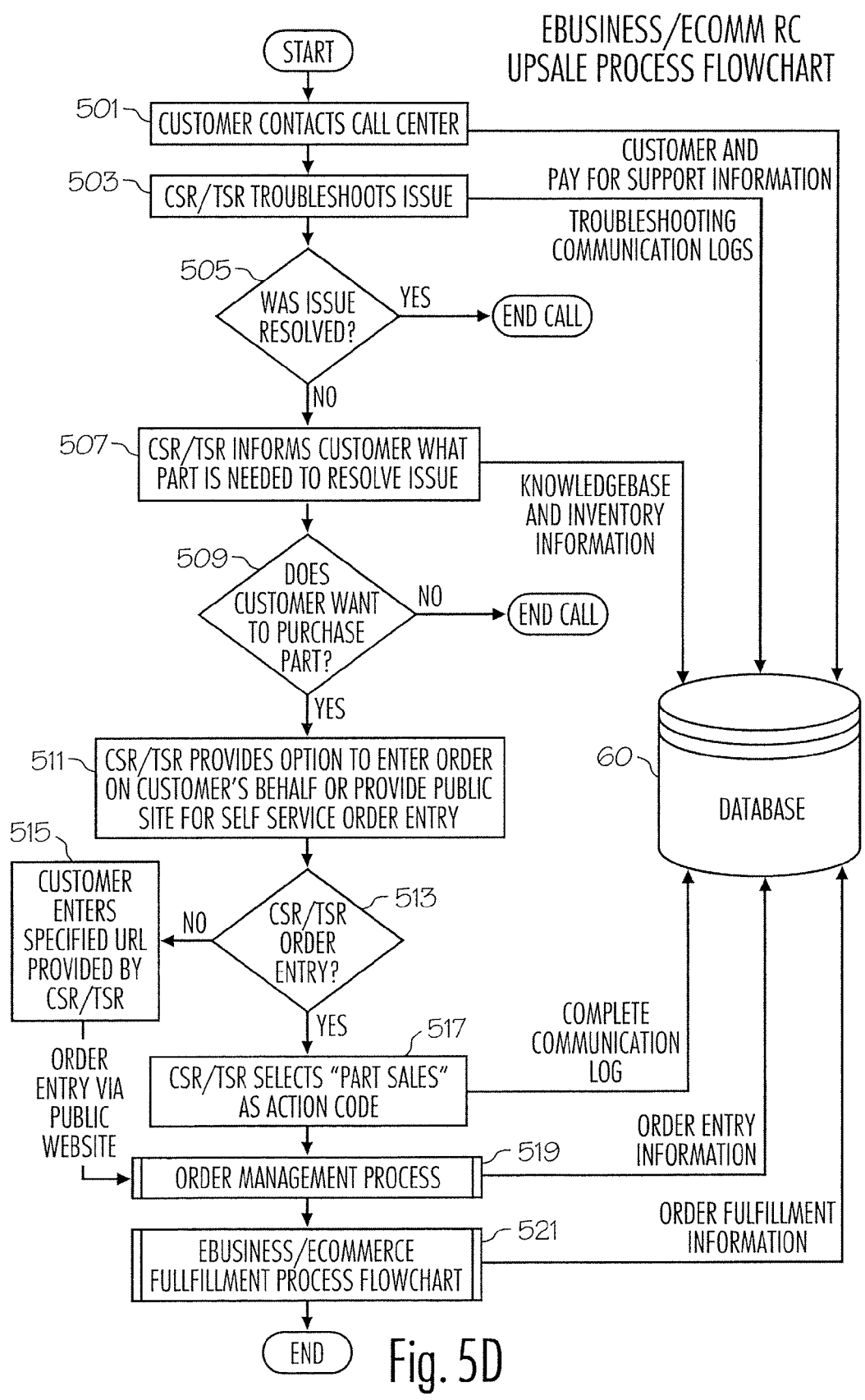

FIG. 5D illustrates the program logic implemented in the Customer Interaction module 220 to provide sales and sales related services. The initial step, 501, is where the customer contacts the call center seeking support from a CSR. Here, customer, contact, and other relevant information are recorded in the database 60. At step 540 in FIG. 5A, the CSR can elect to continue customer interaction with the upsale process, which would begin in this case at step 503. At step 503, the CSR (or possibly a Technical Support Representative—TSR) troubleshoots the customer's particular issues. The communications concerning this step are also logged into the relevant customer and/or product records of the database 60. If the customer's issues were resolved in step 505, then the call is ended; otherwise, the CSR informs the customer as to what part is required to resolve the problem or issue at step 507. The CSR or TSR is able to inform the customer with this information by being provided information concerning the product and issues through the knowledge base process as described in FIG. 5B. If the customer ultimately does not wish to purchase the recommended part in step 509, then the call is ended; otherwise, the CSR or TSR provides purchasing options at step 511.

At the customer's option, the CSR in step 513 can enter an order for the customer or direct the customer to self-service ordering (see e-commerce solutions in FIG. 9 below, for example). Should the customer select self-service (step 515), the customer may enter a specified URL provided or suggested by the CSR to order via the Internet or other network (see Procurement module 290 in FIG. 10 below, for example) and the process continues at step 519. This ordering process and information may be recorded in the database 60 in order to update, for example, customer and/or product records and sales reports. If the customer elects the CSR to provide ordering services, then the CSR selects "part sales" as an action code in proceeding with the customer's requests and updates the customer record with respect to all communications concerning this action (step 517). The order management process subsequently begins at step 519 and order fulfillment is accomplished in step 521 (see FIG. 8B).

A CSR has then the ability to access the Credit Card Processing module 260 to complete any upsale process for products or extended warranty service. If a customer wishes to purchase a product or an extended warranty plan or encounter a pay for support situation, the Credit Card Processing module 260 can access the database record 62a, b, . . . or n, to retrieve the credit card information stored in Credit Card Information field 122. The Credit Card Processing module 260 can charge or charge-back the credit card for the amount authorized by the customer. In addition, the Credit Card Processing module 260 incorporates a universal translation bridge to be able to process the credit card through any of the major credit card services on the network 50. Moreover, the Credit Card Processing module 260 can provide a convenient payment process with any of the other modules in the management tool 5.

Figure 6A:
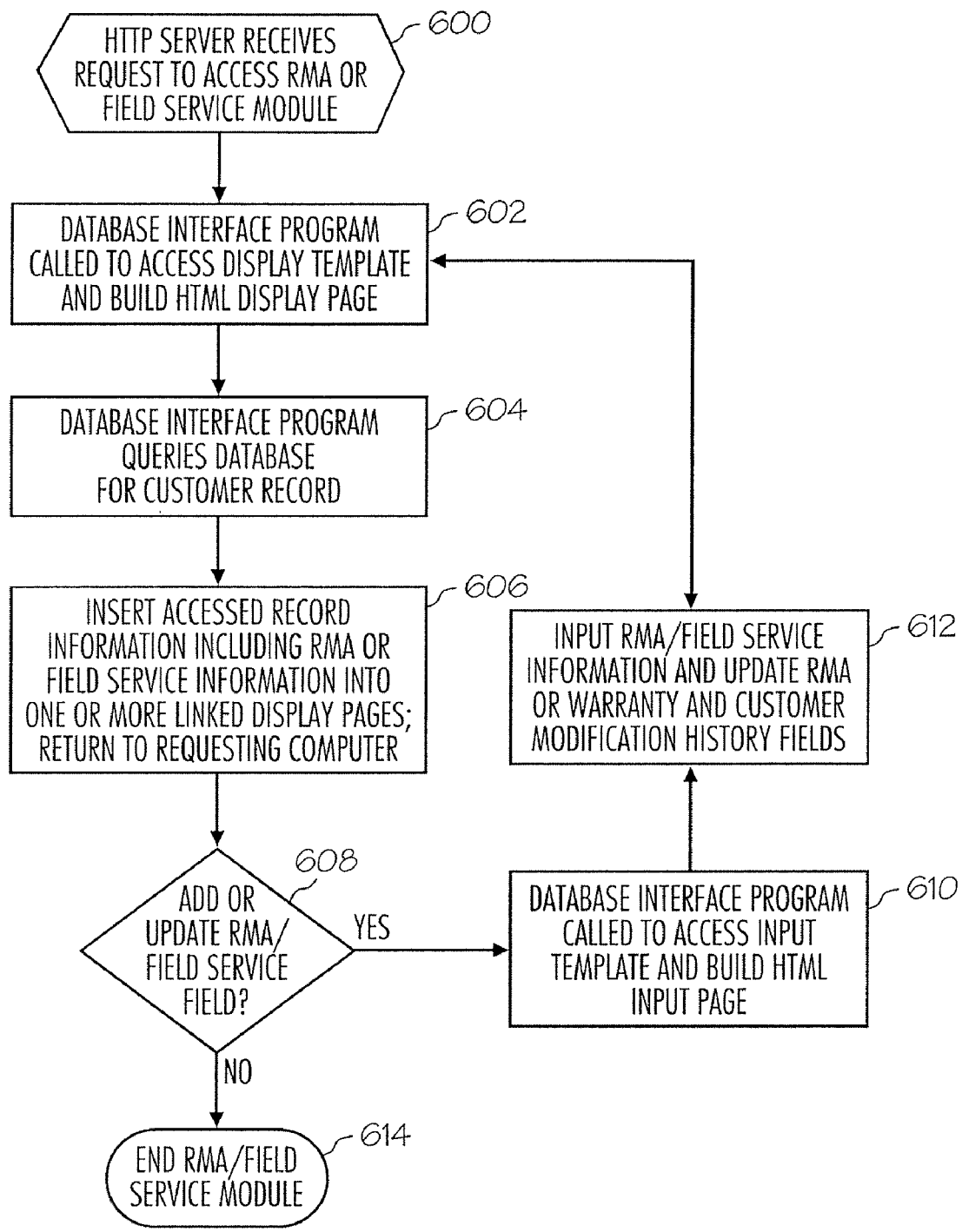
FIGS. 6A to 6D illustrate the program flow implemented in the server to administer the Return Merchandise Management and the Field Services Administration modules in accordance with preferred embodiments of the present invention.
Figure 20:
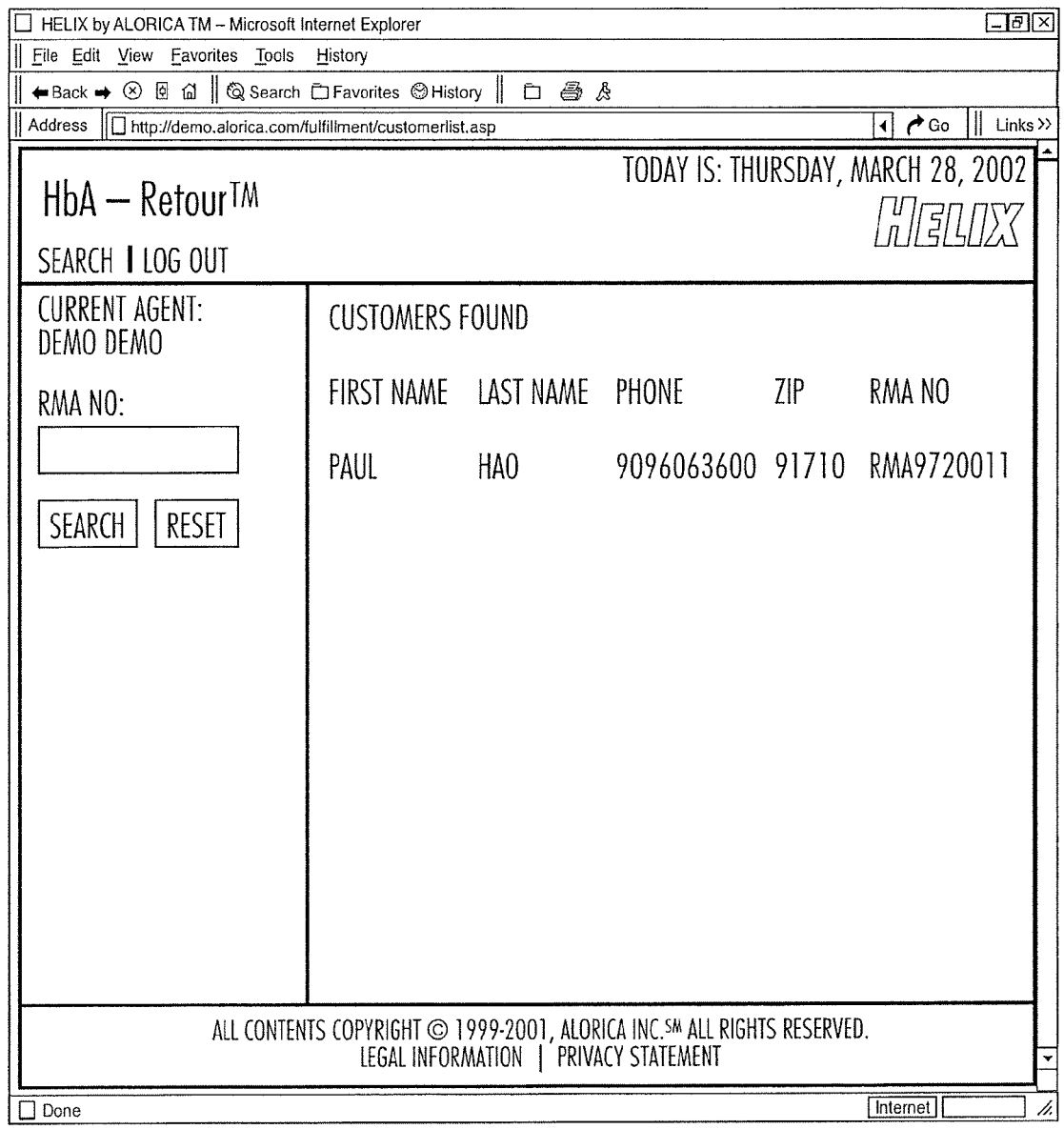

The Customer Interaction module 220 also allows the user to accumulate and assemble customer, service and product information encountered by the CSR or other users to provide informative and customized reports concerning the relevant information according to the clients' requirements. As discussed below with respect to the Reporting System module 280, benefits such as the constitution of "Frequently Asked Questions" (FAQ's), measurement of research and development improvements can be derived from this form of knowledge management FIG. 6A illustrates the program logic implemented in the HTTP server 52 and database interface 70 to administer the Return Merchandise Management 230 and the Field Services Administration 250 modules. The modules 230 and 250 can be accessed by the CSR from the customer interaction module 220 for informational purposes or to issue an RMA by selecting the RMA information page. In addition, the repair facility 30 can access the modules 230 or 250 to update the repair process and/or check on the warranty status. As in the logic of FIG. 5A, the repair facility 30 can search for the specific product or customer information by searching the database for the RMA or customer record 62 a, b, . . . n as illustrated in FIG. 20.

At step 600, the HTTP server 52 receives a request from the call center 20, repair facility 30, sales 35, or warehouse 45 computers to access the Return Merchandise Management 230 or Field Services Administration 250 modules. In response, the HTTP server 52 requests (at step 602) the database interface 70 to access the display template 72 and build (at step 604) one or more HTML display pages by querying the return information 120 or warranty information 126 fields for the specified customer record 62a, b, . . . n. At step 606, the built HTML display pages are then sent to the requesting computer, where the user can view and edit the RMA and/or field service information associated with the customer record 62a, b, . . . n.

Once a customer's information along with the RMA or Field Service information are displayed (as seen in FIG. 21), additions or modifications can be made to the return information 120 or warranty information 126 fields of the customer record 62a, b, . . . n. A CSR will access the Return Merchandise Management module 230 in order to issue a RMA number to facilitate a return of a defective product. Similarly, a CSR will access the Field Services Administration module 250 in order to administer field services information as well as administer extended field service and service plan specifics, such as the effective date for honoring reasons, warranty type or service plan, term and price.

A repair facility will typically only access the Return Merchandise Management module 230 to update the status of each returned product as it travels through all the operational stages of the repair lifecycle in the repair center. However, the repair personnel can also query each product's RMA information and/or field service information for informational purposes.

At step 608, the user can chose to add or update the return information 120 or warranty information 126 fields. The database interface 70 (at step 610) accesses the input template 74 and builds an HTML web page. At step 612, the built HTML input page is then sent to the call center 40 or repair facility 30 computers, where the CSR can issue an RMA by selecting the "Issue RMA" code or repair personnel can update the status of a returned product by selecting the product and adding additional information such as receiving information, repair stage information, quality control discrepancy results, inspection results, etc. as seen in FIG. 21. The HTTP server 52 then receives the HTML input page with the information added by the CSR or repair personnel.

In response, the HTTP server 52 requests the database interface 70 to update the return information 120 or warranty information 126 fields as well as the customer modification history 118 field. The updated customer record 62a, b, . . . or n will be then redisplayed in one or more linked display pages at step 602.

Another unique aspect of the Return Merchandise Management module 230 is the ability to implement a cost effective bar code solution for the repair facility. By using commercial bar code font to code the RMA number, the repair facility 30 can simply print a bar code label from the Return Merchandise Management module 230 and place it on the returned product. Thus, rather than having to search for the returned product each time the repair personnel needs to update the status of the returned product, the repair personnel can simply scan the bar code. Since a repair personnel is identified by a unique user id, many of the update processes can be stored in the resolution codes 146 of the user record 64 a, b, . . . or n, and automatically used to update the return information field 120 for the returned product. For example, the receiving clerk at the repair facility by scanning in the bar code will automatically register the received status, received date, and receiving clerk information in the return information 120 and customer modification history 118 fields of the customer record 62a, b, . . . or n. The automatic updating of status of return and/or repaired merchandise also allows for real-time process status tracking by a CSR or a customer to anticipate credit or product fulfillment.

Figure 6B:
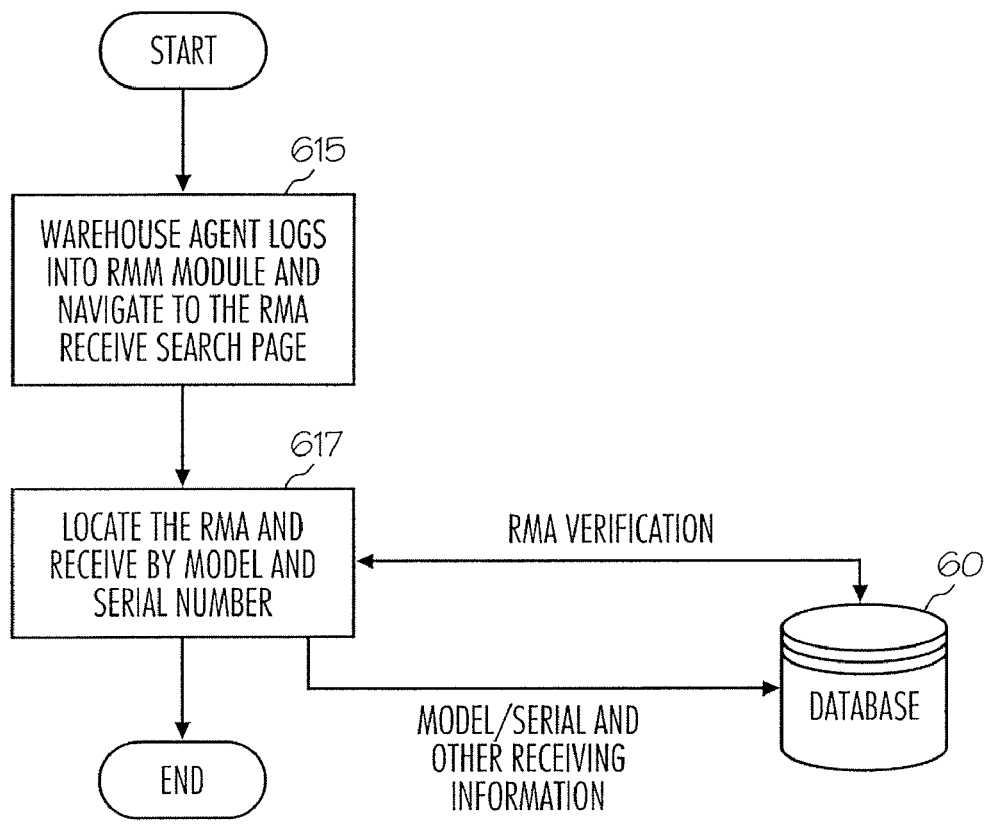

FIG. 6B illustrates an example of the program logic implemented in the HTTP server 52 and database interface 70 to administer the receiving process for an RMA in the Return Merchandise Management module 230. For example, a receiving clerk at a repair facility or warehouse logs into the Return Merchandise Management module 230 and navigates using a network browser as described above to the RMA receive and search page (step 615), an example of which is shown in FIG. 22. At step 617, the clerk locates the RMA by using the model and/or serial number of the product. At this stage the RMA is verified within the database 60 and customer and product records within the database 60 are updated with respect to receiving and product information such as model/serial number.

Figure 6C:
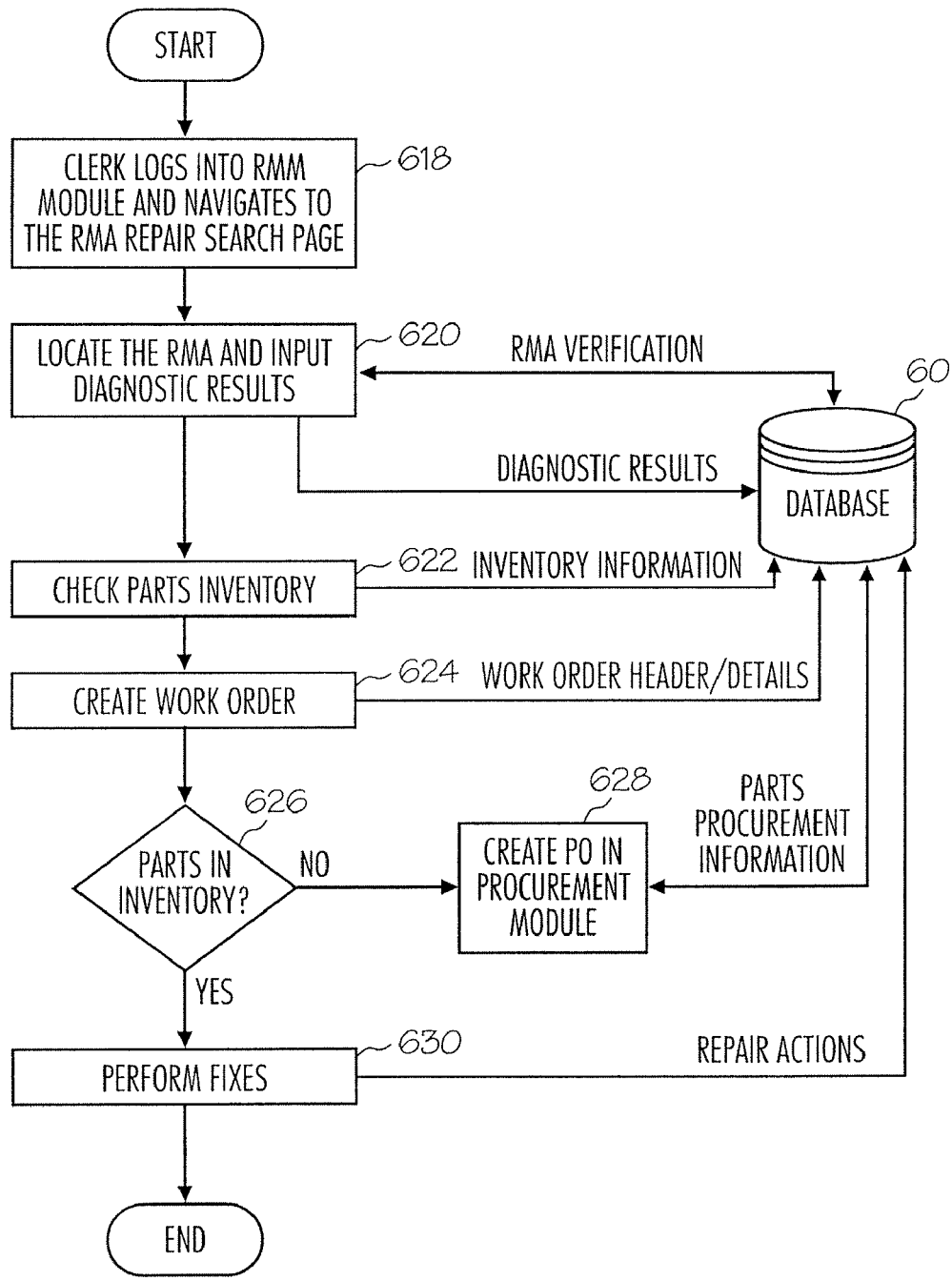

FIG. 6C illustrates an example of the program logic implemented in the HTTP server 52 and database interface 70 to administer the repair process for an RMA in the Return Merchandise Management module 230. Similar to step 615 in FIG. 6C, the receiving clerk at a repair facility logs into the module 230 from a repair facility computer 30 (step 618). At step 620, the clerk locates the RMA and inputs diagnostic results concerning the returned product. At this point the RMA is verified with and the diagnostic results are entered into the relevant records of database 60. Inventory is then checked for parts required for possible repairs (step 622) by logging into and searching within the Inventory Management module 270, which extracts parts information from the database 60. In step 624, a work order is created, the details of which are entered into the records database 60. If it is determined that the necessary parts are inventoried (at step 626), then the repairs are made (step 630). If the parts are not available, the clerk may then log into the Procurement module 290 to purchase such parts (step 628) (see below). Repair details as well as procurement information are subsequently and automatically entered into the records database 60.

Figure 6D:
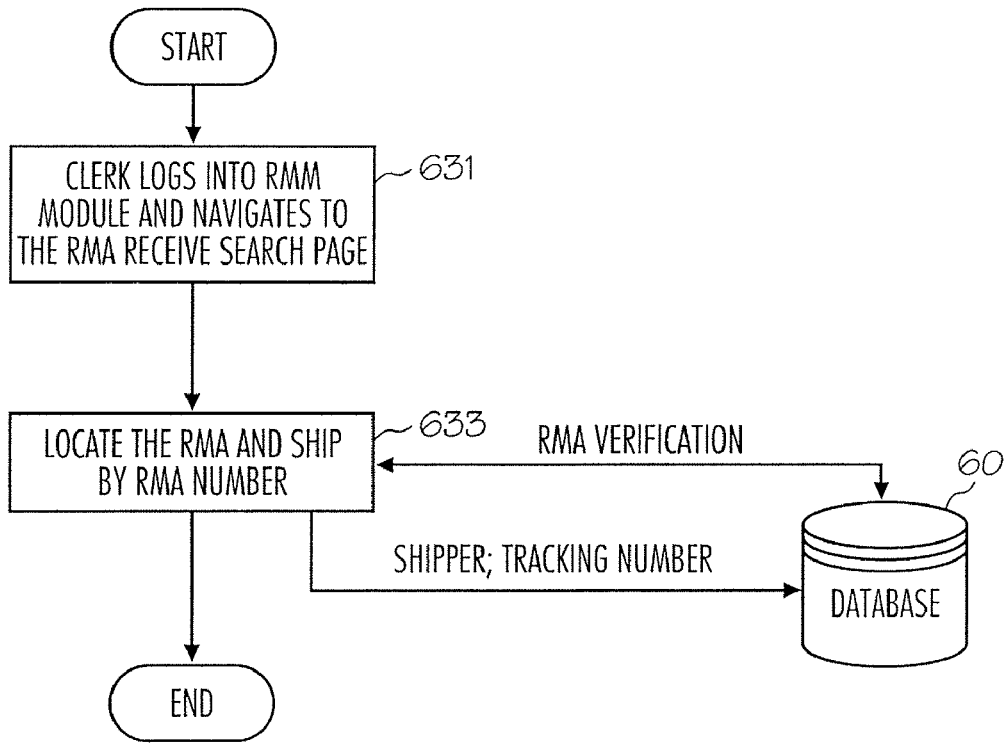
Figure 23:
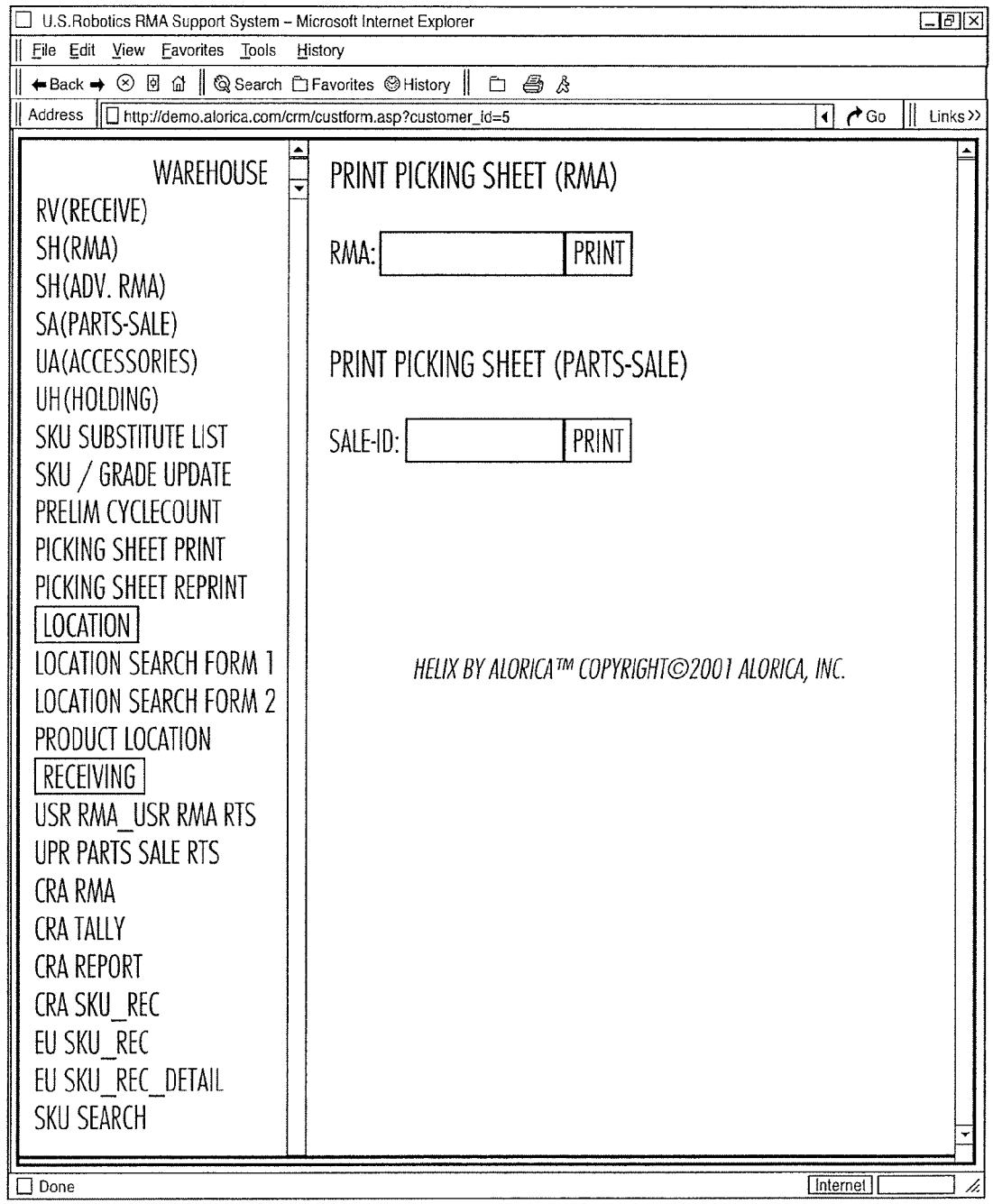

FIG. 6D illustrates an example of the program logic implemented in the HTTP server 52 and database interface 70 to administer the shipping process for an RMA in the Return Merchandise Management module 230. Again, similar to step 615 in FIG. 6C, a shipping clerk in the repair facility, in using a repair facility computer 30 logs into the Return Merchandise Management module 230 to locate the RMA (step 631). The clerk, at step 633, locates the RMA and ships according to the RMA number, as shown in FIG. 23. The RMA is verified in and shipping and tracking information is entered into the records database 60.

Due to the network 50 based nature of the preferred embodiment of the present invention, the Field Services Administration module 250 allows for pertinent data to be accessible in real-time for customers requiring on-site personal care. Field Services Administration personnel can log into the module 250 via personal portable computers connected to the network 50 at the customers' sites or via the customers' computers 15 through secure login as described above. As a result of the immediate real-time ability to update customer, service, and product records in the database 60, parts can be ordered via the Inventory Management module 270 or the Procurement module 290.

Figure 7:
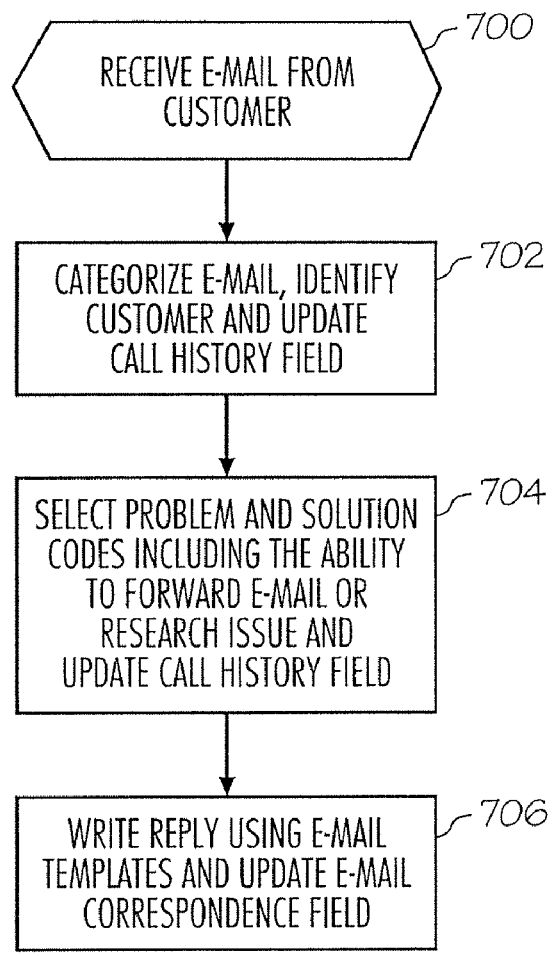
FIG. 7 illustrates a program flow implemented in the server to administer the E-mail module to categorize and respond to e-mails from customers in accordance with preferred embodiments of the present invention.

FIG. 7 illustrates the program logic implemented in the HTTP server 52, database interface 70, and the E-mail Management module 240 to categorize and respond to e-mails from a customer 15. At step 700, e-mail is received from the customer 15. The E-mail Management module 240 interfaces with an e-mail client program, such as Microsoft Outlook, and conducts a review of the e-mail's API code. The E-mail Management module 240 looks for key words in the e-mail's API code to initially categorize the e-mails and send them to the appropriate CSR in charge of responding to that particular type of inquiry.

For example, a field service question will go to a field service representative. The identity of the customer will be ascertained by the CSR and the call history field 116 will be updated as in the logic of FIG. 5A.

At step 704, the CSR can make a confirmation of the nature of the e-mail and select from the list of problem codes and solution codes likely to be encountered by the CSR from the list stored in Problem Codes 144 and Resolution Codes 146 field associated with the user, including the ability to forward the e-mail or research the issues raised by the e-mail. The call history field 116 will then be updated to record the selections of the CSR. The CSR, at step 706, then fills out an e-mail response from the e-mail templates stored in the e-mail templates field 148 associated with the user record 64a, b, . . . or n.

Figure 24:
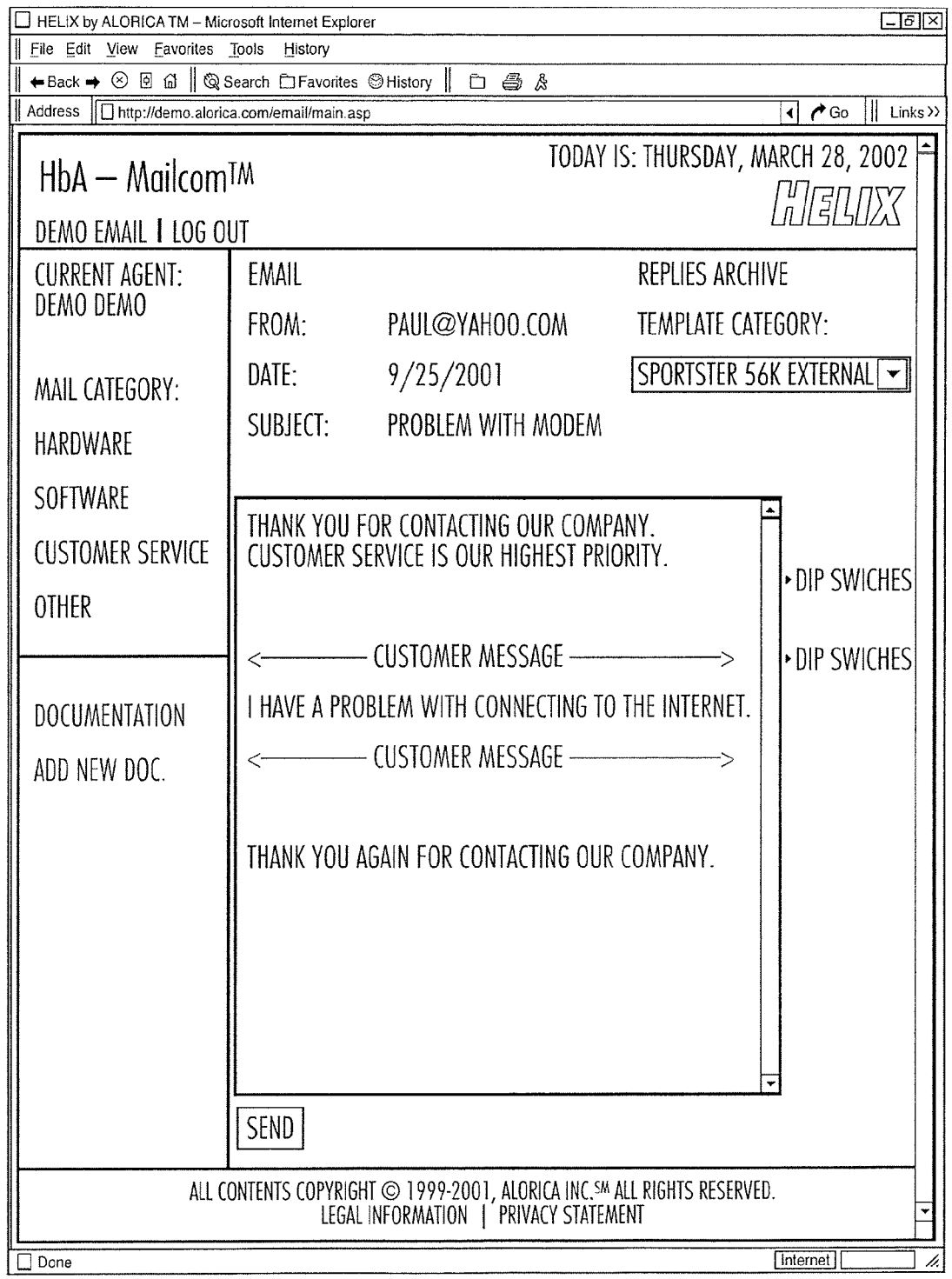
Figure 25:
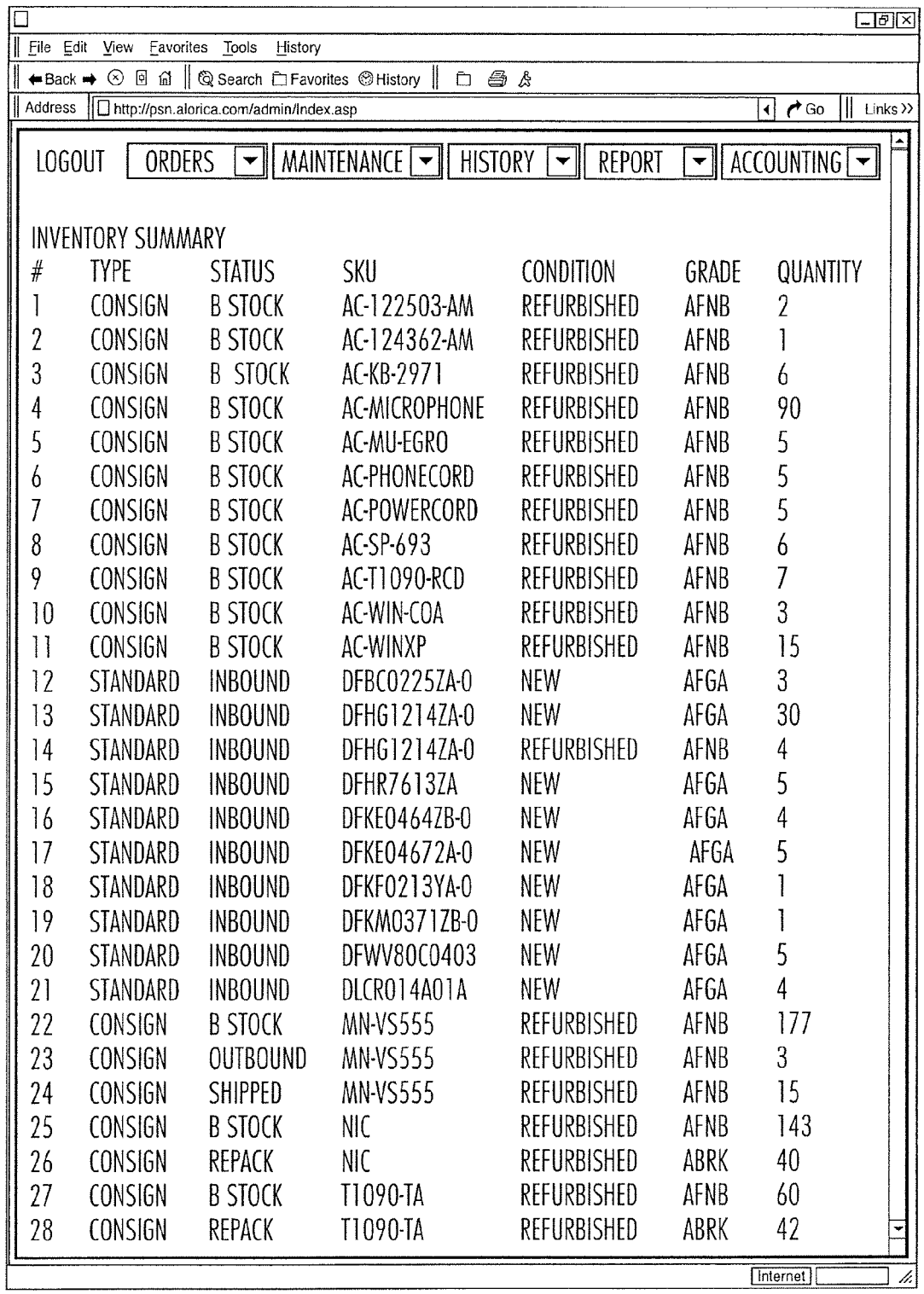
Figure 29:
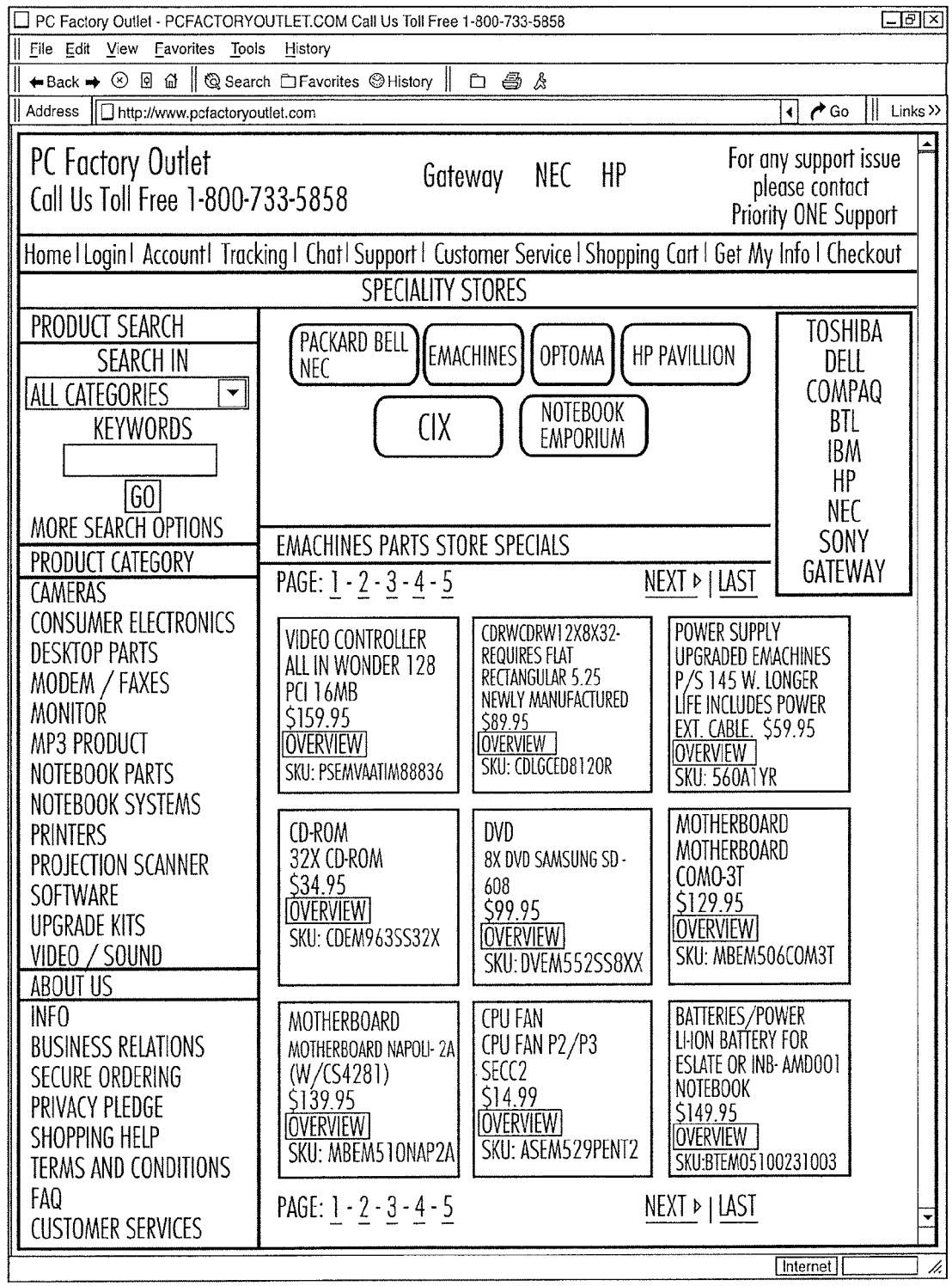

Since the reply window, in the preferred embodiments as seen in FIG. 24, is already populated with a standard opening and closing message, by picking the appropriate e-mail template, the CSR can reply quickly to the e-mail by either sending out an e-mail message back to the customer, forward the e-mail to the manufacturer/client 20 for second-level support, send it to a research queue for further investigation by a senior representative, or remove it. The response will then be recorded by updating the e-mail correspondence field 124. In alternative embodiments, the E-mail Management module 240 can also allow the email representative to create a new template and assign it a particular category for issues that have not occurred, but that may occur at a later time.

Figure 8A:
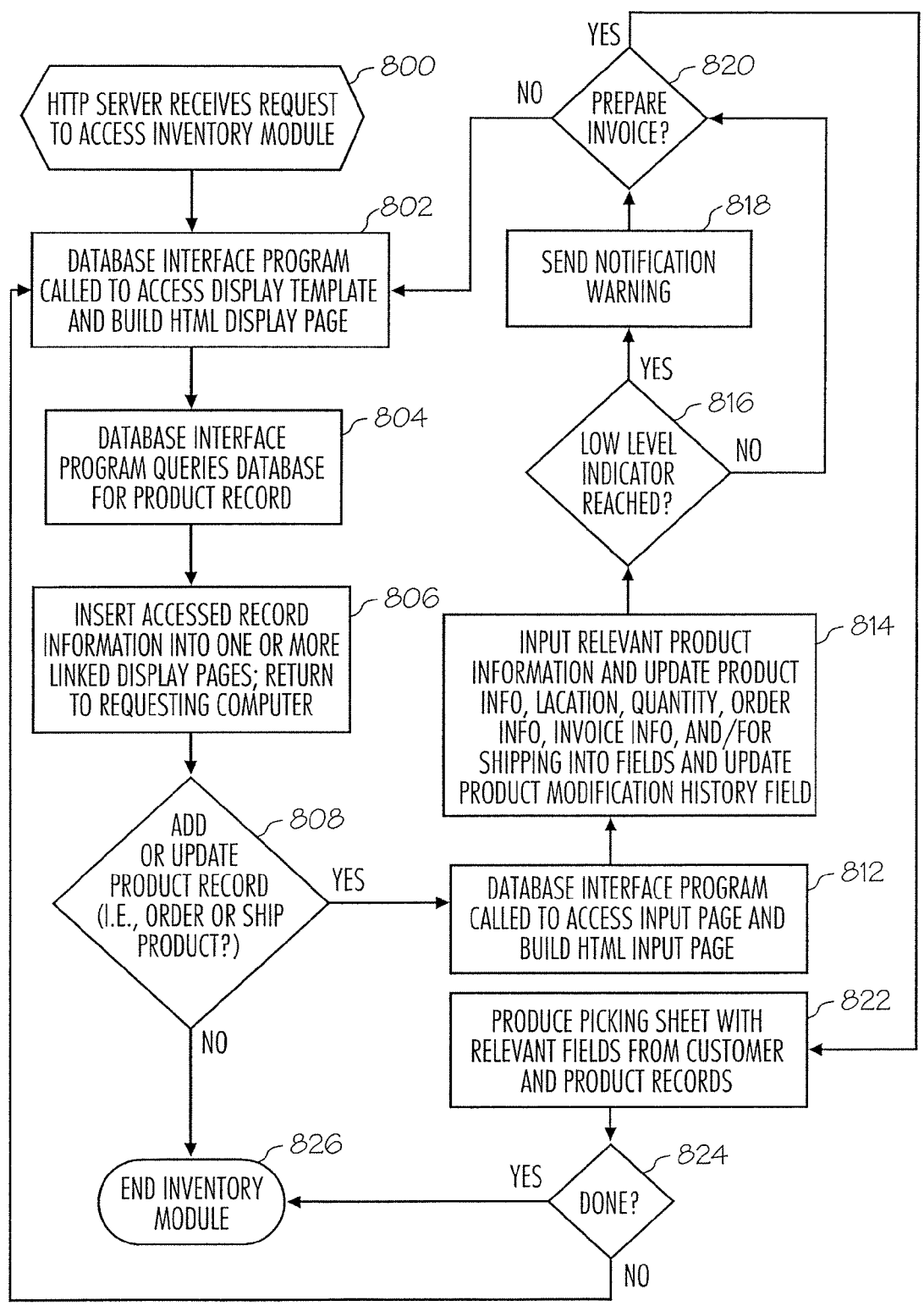
FIGS. 8A and 8B illustrates a program flow implemented in the server to administer the Inventory Management module in accordance with preferred embodiments of the present invention.

FIG. 8A illustrates the program logic implemented in the HTTP server 52 and the database interface 70 to administer the Inventory Management module 270 according to the preferred embodiments. The Inventory Management module 270 is designed to administer the inventory in a warehouse from purchasing, carrying, picking, packing, and shipping of products. The module 270 provides real-time inventory levels, and enables product managers to manage product specs, quantities, promotions, and categorization.

A product manager, who has already logged into the Inventory Management module 270 via a secured identification and password, can manage the inventory via the secured network 50. The module 270 typically begins at step 800, where the HTTP server 52 receives a request from the manufacturer/client 20 or warehouse 45 computers for information on a product record 66a, b, . . . or n.

The database interface 70 can search for a product record 66a, b, . . . or n using the product name, category, its specs, web-store representation, quantity on hand or by querying the database for a compatible model or substitute. An example can be seen in FIG. 25. The database interface 70 will search the Product Information 152, Location 154, and Quantity 156 fields of the product records 66a, b, . . . n. At step 802, the database interface 70 accesses the display template 72 and builds an HTML web page.

The database interface program 70 queries (at step 804) the database table 65 for the requested product record 66a, b, . . . or n and then inserts (at step 806) the returned information into the display template. The database interface 70 will then build one or more linked HTML web pages based on a display template 72. As seen in FIG. 26, this search will bring up the product information GUI ("Graphical User Interface") that is designed to display all detailed specs pertaining to this product including quantities on hand in the warehouse, inventory records, categorization, product specs, compatible model, substitute product, product modification history, etc.

Thus, the generated display pages can include information from such fields as Product Information 152, Location 154, Quantity 156, Order Information 158, Invoice Information 160, Low-level Indicator 162, and Product Modification History 164 fields. Depending on the information desired, the inventory module 270 can display the information in many forms on different pages.

Once the relevant product record 66a, b, . . . or n is displayed, then at step 808 the inventory manager can make modifications to the product information if the product information needs to be changed, or to input information about a new product. To update or create a new product record 66a, b, . . . or n, the database interface 70 (at step 812) accesses the input template 74 and builds an HTML web page.

The user can then just change or input new product information, such as quantities on hand, product description, location, order information, etc. The product manager can also determine product specs, marketing information, and pictures that can be shown on a web-store displaying the product. The product manager can also categorize the product by webstore, category, sub-category, and set promotion standards.

Thereafter, the product manager can select for compatible models and substitutes via the "Compatible Model" and "Substitute" Tabs by selecting compatible/substitution models and clicking the "Add" button. The product manager can also check for open inventory purchase orders via the "Inventory Records" Tab as well as set a low-level economic reorder point notification at a preferred level.

In addition, the warehouse 45 can also click on the "Inventory" Tab to check and adjust real-time inventory levels by product SKU, where the page specifies each SKU's warehouse location and quantity on hand. Any time a product is shipped out, the inventory levels are decreased by one. The module 270 also provides for the product manager to store and upload the products' Bill of Materials (BOM) and any marketing descriptions. As a result, customer service and sales representatives, among others, have real-time access to available inventory and product descriptions.

In response, the HTTP server 52 (at step 814) requests the database interface 70 as shown in FIG. 27 to update one or more of following fields: the product id information 152, location 154, quantity 156, order information 158, invoice information 160, low-level indicator 162, and as well as record the change in the product modification history field 164 of the specific product record 66a, b, . . . or n. The updated product record 66a, b, . . . n will be eventually redisplayed in one or more linked display pages at step 802 after a several other logic inquiries (to be discussed below).

At step 816, any time there is any adjustment in the quantity field 156, a comparison is Made with regards to the quantity field 156 and the low-level indicator field 162. If the quantity of products on hand reaches the number set for the low-level indicator, a notification (at step 818) is sent to the product manager or warehouse personnel. The notification can initiate the reorder process, where a user would access the inventory module 270 and enter a purchase order for the product, including the vendor, unit cost, SKU, and desired quantity. The purchase order will be recorded in both the Order Information 158 and Product Modification History 164 fields as in the logic explained above with regards to modifying a product record 66a, b, . . . or n.

Figure 28:
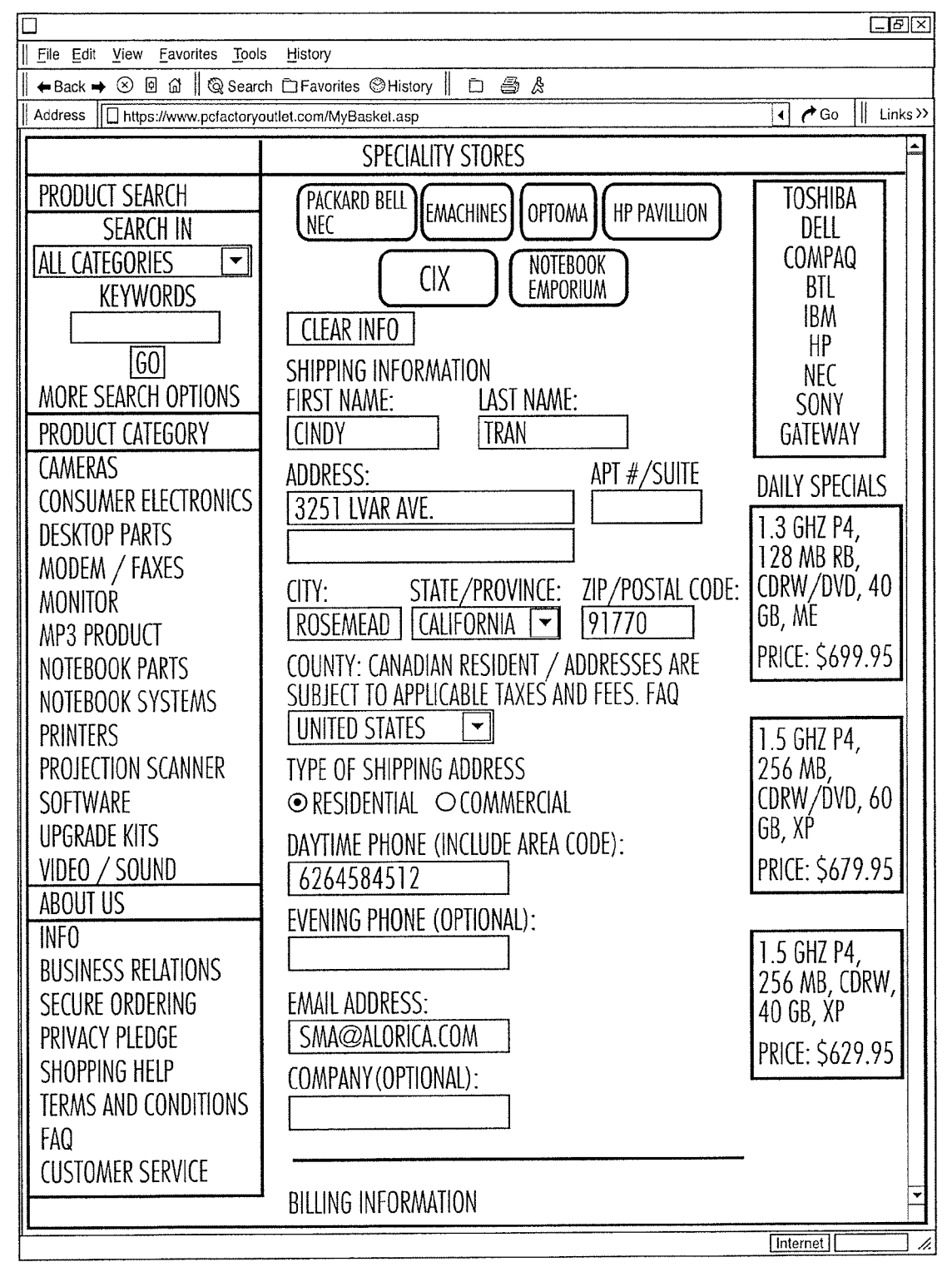

At step 820, an invoice option is available to register the sale of the product if there was an adjustment to the quantity field 156. Via the "Invoice" page, as shown in FIG. 28, the warehouse personnel can enter or look up the customer's invoice information, e.g. shipping address, credit card information, shipping method, credit card authorization numbers, and pre-authorization dates. The information is populated from the customer's original input from the customer interaction module 220 and interlinked with the Credit Card Processing module 260 to charge the purchase ticket. The Invoice page also displays the status of the order. Once an invoice is generated, the shipping personnel can generate a Picking Sheet to determine what products should be shipped along with a copy of the packing sheet for the customer.

Moreover, in preferred embodiments, the Inventory Module 270 is integrated with third party shipping software, such as Airborne Express, UPS, etc. to monitor the progress of the product shipment from the Inventory Module 270 directly. Once the user is completed with the Inventory Module 270, the user can exit the module at step 826.

Figure 8B:
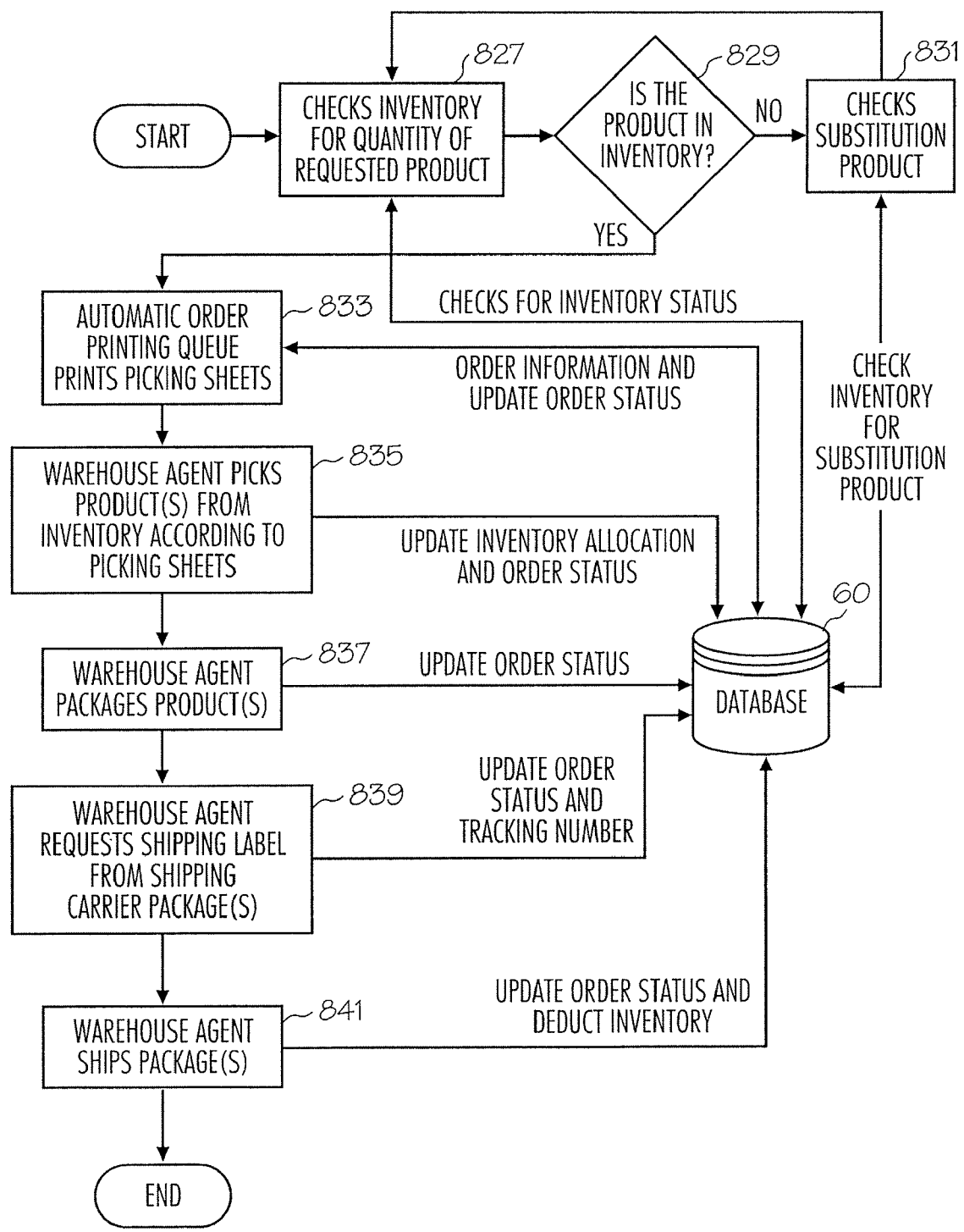

FIG. 8B illustrates the program logic implemented in the HTTP server 52 and the database interface 70 to administer order fulfillment, which can be coordinated through the Inventory Management module 270 as well as the Customer Interaction 220, Field Services 250, Procurement 290 and Sales Force Automation 300 modules. At step 827, inventory is checked for quantity of the ordered or requested product. If the product is not in inventory at step 829, inventory is checked for substitute products at step 831 and the process returns to step 827. At this stage the warehouse agent can notify the CSR and/or the customer for approval in procuring the substitute product. Inventory status and warehouse records concerning the desired product and possible substitutions are accessed from the database 60 using the database interface 70. If the requested product and suitable substitutions are not in inventory, then the warehouse agent can notify the requesting party and proceed to restock, for example through the Inventory Management module 270.

If the product is determined to be in inventory at step 829, then an automatic order printing queue is generated at step 833 and picking sheets are printed. Also, customer, product and order information are updated in the database 60. At step 835, a warehouse clerk or agent retrieves the ordered product according to the picking sheets and updates inventory allocation and order status. The agent then packages the product in step 837, updates the order status and requests shipping label from a selected shipping carrier (step 839). The order status is again updated with carrier information and the shipping tracking number. At step 841, the agent then ships the package, updates order status, and deducts inventory. The purpose in updating product, inventory and order status at each step is to provide CSR's, inventory management personnel, and customers real-time information concerning the order lifecycle.

A key aspect of the Inventory Management module 270 is that it can be linked to a front-end GUI to act as a shopping cart for e-commerce purposes. Each purchase by a customer computer 15 can automatically interact with the Inventory Management module 270, initiating the shipping and invoicing processes. To account for each sale, the Inventory Management module 270 updates the location 154, quantity 156, and invoice information 160 fields of the database record 66a, b, . . . or n. In addition, to provide for better integration of the inventory module 270 with an e-commerce shopping cart, much of the graphics for the front-end GUI can be stored with the relevant database record 66a, b, . . . or n, along with its descriptions, promotions, etc. In addition, the Inventory Management module 270 can be interlinked with the Credit Card Processing module 260. Thereby, the Inventory Management 270 and Credit Card Processing 260 modules can work together to seamlessly provide an e-commerce solution over the network 50.

Figure 9:
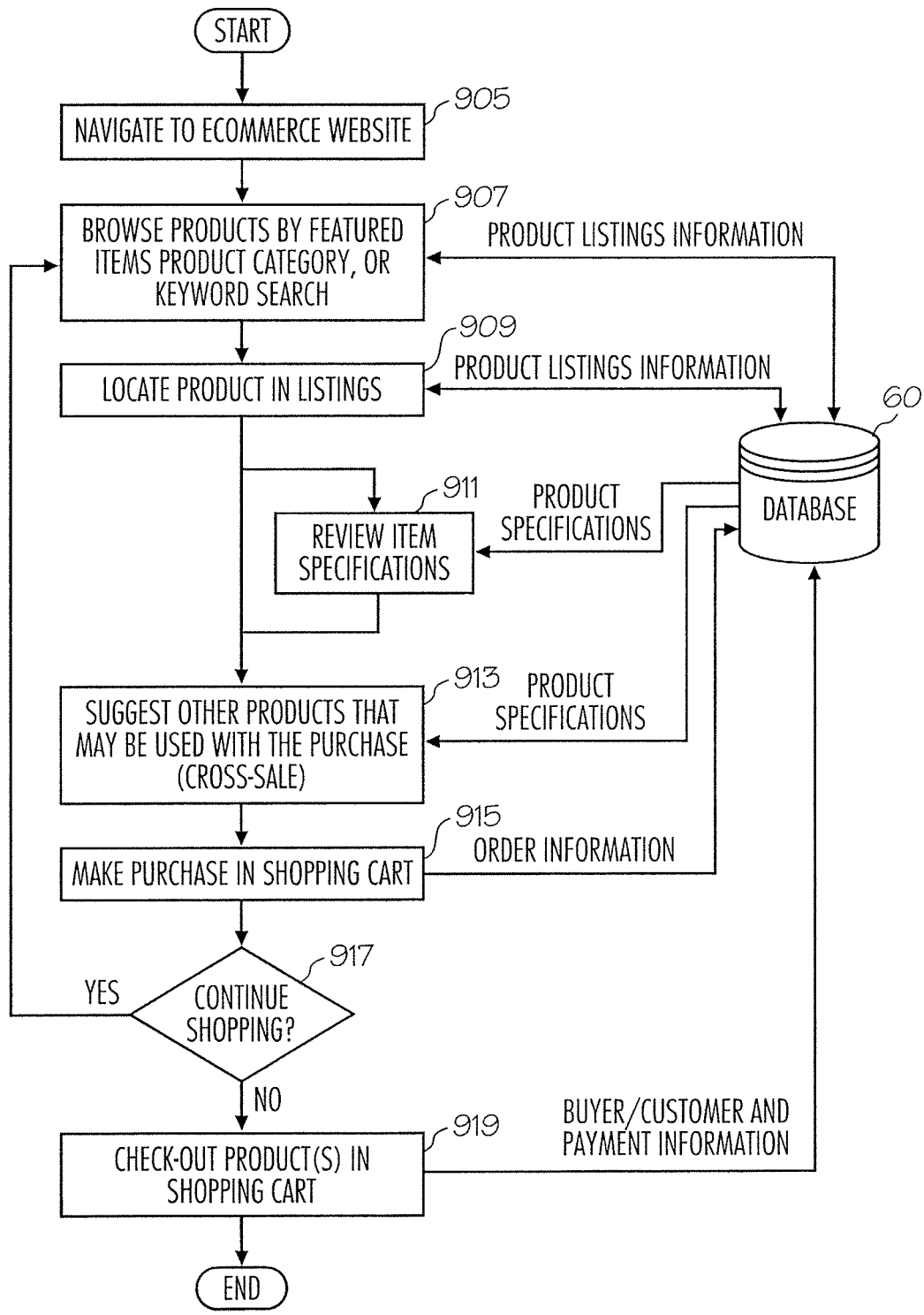
FIG. 9 illustrates a program flow implemented in the server to administer the electronic commerce operations in accordance with preferred embodiments of the present invention.
Figure 30:
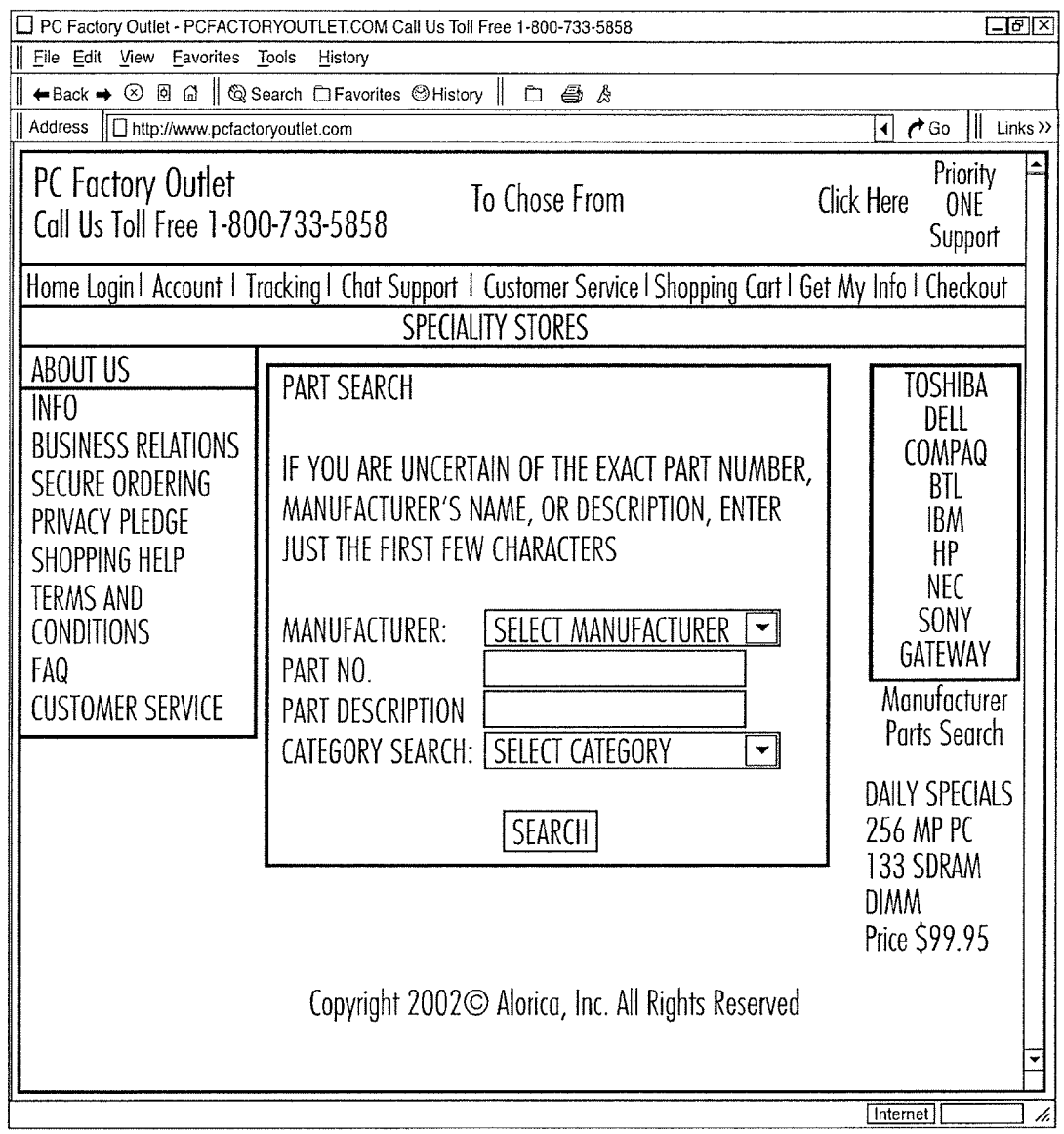
Figure 31:
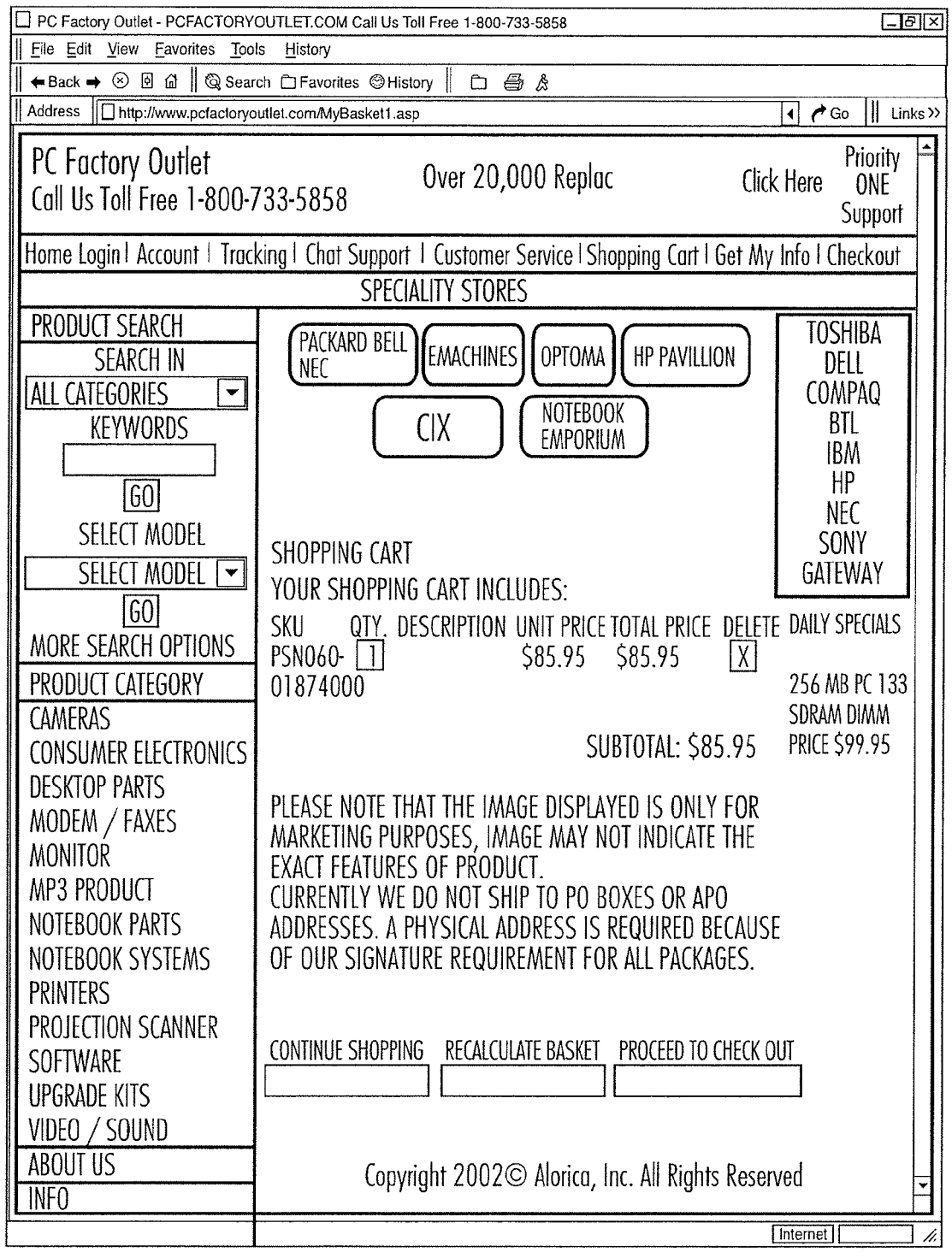

FIG. 9 illustrates the program logic implemented in the HTTP server 52 to administer e-commerce solutions according to the preferred embodiments. Using the network 50, a customer 15, CSR 40, sales representative 35, or warehouse personnel 45 can navigate using an Internet browser, e.g., Microsoft Internet Explorer, Netscape Communicator, etc., to a point-of-sale web-portal, shown for example in FIG. 29 to purchase products (step 905). There, the user is able to browse products by category(ies) or keyword search (step 907), an example of which is shown in FIG. 30. The web-portal allows access to the database 60 though the database interface 70 in order to obtain product listing information. At step 909, the server 52 locates desired product listings extracted from the database 60. Information to be reviewed by the user can also include product specifications (step 911) as well as suggested, recommended and associated items to the located product (step 913). This information is also stored in and extracted from the database 60. The user then selects to purchase the items in the shopping cart at step 915, as illustrated by the HTML page in FIG. 31. At step 917, the user is given the option of continuing shopping for other products, which restarts the process at step 907. At checkout (step 919), purchaser and payment information is entered into the database 60, which can further update customer and product records stored in the database 60.

This e-commerce solution offers customers the ability to search, order, and pay for products without resorting to assistance from a CSR. The e-commerce solution also allows CSR's, acting as sales representatives, to purchase products not warehoused or available through the Procurement module 290 (see below). All transactional history occurring with this e-commerce solution would also be entered into the relevant records in the database 60.

Figure 10A:
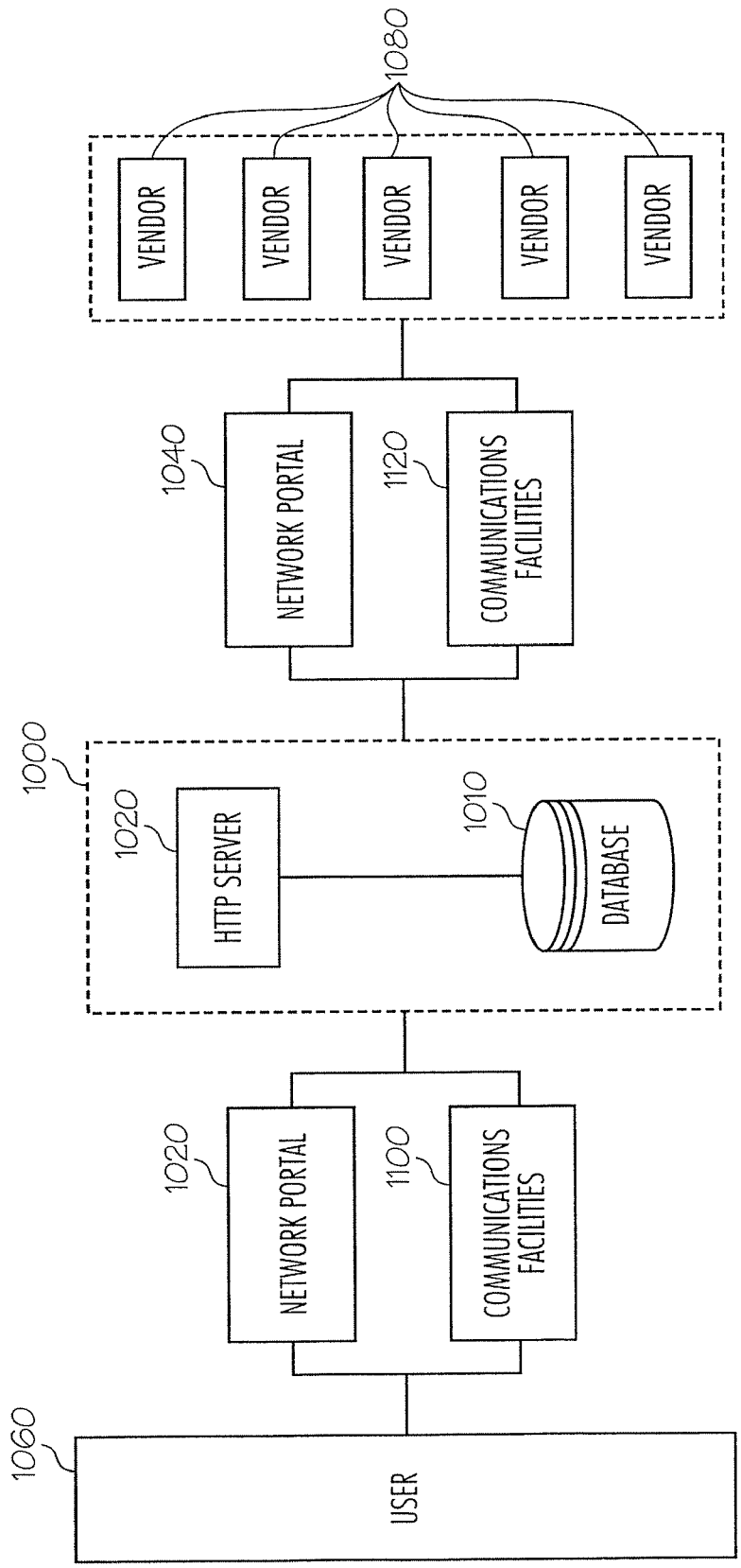
FIGS. 10A to 10G illustrate a network computing environment and program flow and logic in which the Procurement module is implemented in accordance with preferred embodiments of the present invention.

Alternatively, the customer and/or user can access the Procurement module 290, which may be operated and managed by a third party, to obtain products that are not warehoused or available through the Inventory Module 270. FIG. 10A is a schematic overview diagram of the Procurement module 290 in which the preferred embodiments are implemented. The Procurement module 290 can be accessed as a stand alone program and can mirror the advantages of e-commerce solutions available via the network 50. A customer can be issued a secure login ID in order to access the Procurement module 290 through his customer computer 15. The customer may be required to complete a profile form, such as that shown in FIG. 32A, in order to obtain a login ID. The customer could then accordingly be assessed a "seat" fee that can be issued once, per transaction, or in combination with a transaction fee in order to access and/or transact via the Procurement module 290.

In preferred embodiments, a server 1000 is linked to the user 1060 and pre-selected vendors 1080 using a network system known in the art including TCP/IP based networks (e.g., an Intranet, the Internet), LAN, Ethernet, WAN, WAP, etc. Alternatively, there may be separate and different networks between the components. The user 1060, which can be a customer, a CSR, a repair facility or product manager, would have secure access to the Procurement module 290, which allows the user 1060 to access, search and procure desired products from pre-selected vendors 1080 and their inventories through the network 50, as shown in FIG. 1, or any network system known in the art including TCP/IP based networks (e.g., an Intranet, the Internet), LAN, Ethernet, WAN, WAP, etc. Similar to the Inventory Control Module 270, the inventories supplied by the vendors 1080 are pre-verified and updated in a database 1010 following every transaction. Vendors are required to complete profile forms, such as that shown in FIG. 32B. The Procurement module 290 would allow vendor selection and management, request for quote (RFQ) processing, online request (OLR) processing, automated order processing, and return merchandise management.

In the preferred embodiments, there is included a network portal 1020 and 1040, a Hypertext Transfer Protocol (HTTP) server 1000, and a database 1010. The HTTP server 1000 responds to requests from the user 1060 and vendors 1080 via the network portals 1020 and 1040, respectively, using HTTP client programs, such as web browser programs known in the art. Upon accessing the server 1000 through the network portal 1020 using a unique network address, such as an IP address, the user 1060 will have specific access to the various databases stored in the main database 1010, depending on the secured identification provided. The user 1060 can retrieve and store data in database 1010 to coordinate the product and vendor selection management processes. Vendors 1080 access the server 1000 through the network portal 1040 similar to the users 1060 in order to retrieve and store data in database 1010 to coordinate product and inventory management processes.

The database 1010 provides the user 1060 with a central location to search and purchase products from vendors 1080 who are provided by the database 1010 a central location to store and retrieve current and accurate information for individual products as well as whole inventories. Vendors 1080 agree with users 1060 to negotiated criteria concerning products and inventories, for example criteria with respect to availability, price, purchases, returns, and shipping. The database 1010 comprises a database program known in the art, such as a relational database program. In the preferred embodiments, the database 1010 can include, for example, database tables for user records, vendor records, products, and vendor inventories.

The network portals 1020 and 1040 may comprise a Common Gateway Interface (CGI) program, a Java servlet, or other web page implementation known in the art to present the information in database 1010 in a presentable format (e.g. HTML page, etc.). In preferred embodiments, the network portal features a secured login/password verification for identifying the user 1060 contacting the HTTP server 1000. Similar to the database interface 70 described above, the individual user's login/password can be compared with the login/password stored in the user record table to verify the identity of the user and would determine which parts of the customer, vendor, or product records are accessible by the requesting party and will appropriately give read/write capabilities to those records. In the situation where the user 1060 is a customer, the issuance and payment of a seat fee can be assessed, made and verified as well. In addition, vendors 1080 login into the database 1010 of the Procurement module 290 to access and update inventories and product records.

The server 1000 stores templates for display, input, and reports which are preferably implemented in a document in which dynamic content may be generated (i.e. HTML, Extended Markup Language (XML) Document, etc.). Differing variations of the templates exist for the users, depending on the information to be displayed or inputted.

The server 1000 may comprise any type of computer device known in the art, including server, personal computer, mainframe, workstation, hand held device, etc. Moreover, the server 1000 may comprise one or more separate computer systems to run the different program components 1000, 1010, 1020 and 1040.

The network portals 1020 and 1040 may be navigated using an Internet browser, e.g., Microsoft Internet Explorer, Netscape Communicator, or other viewing program known in the art. The network portals 1020 and 1040 process and allow the users and vendors access to product/inventory databases, including hyperlinks to these databases.

Figure 10B:
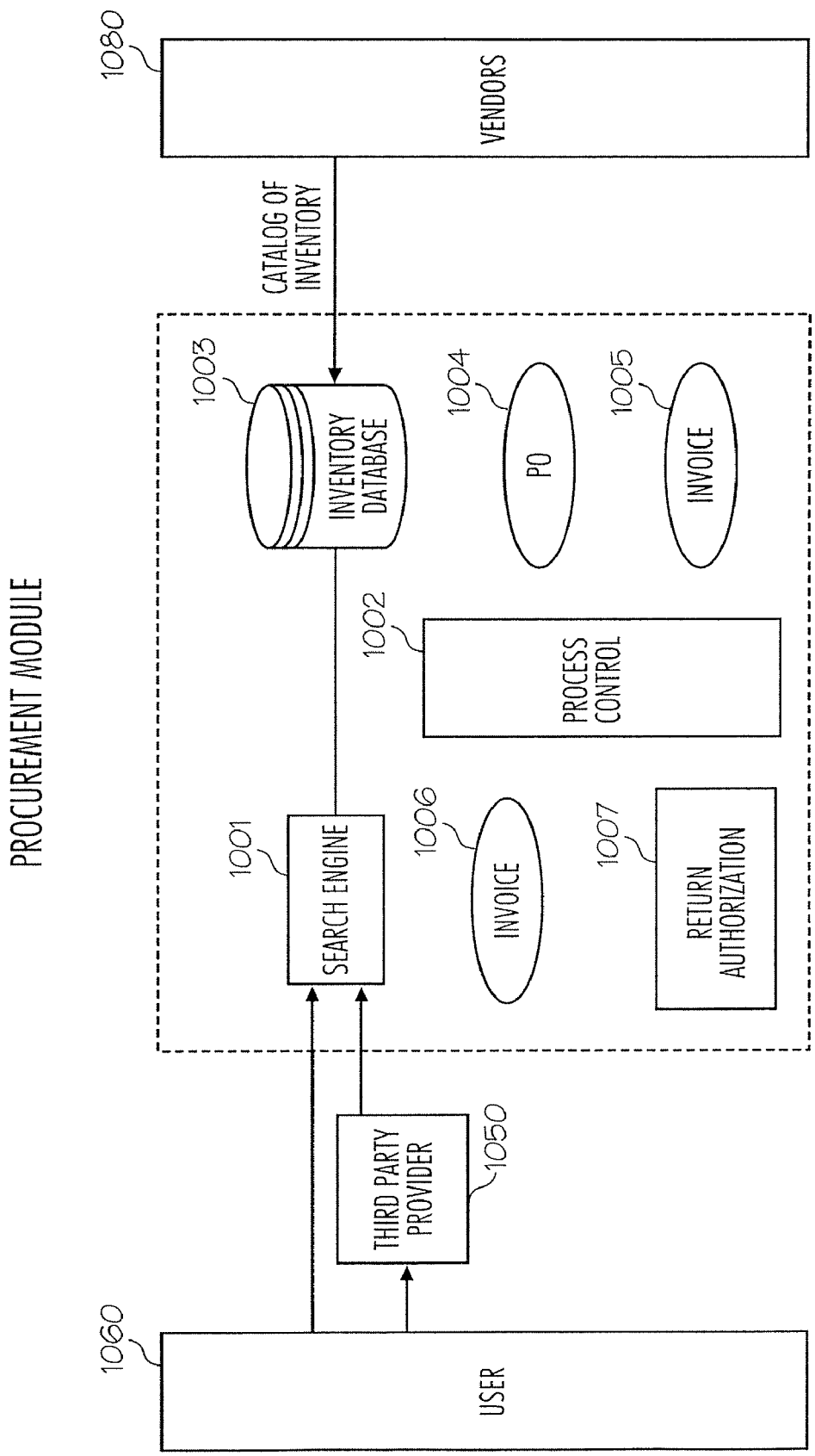

FIG. 10B illustrate a more detailed network environment with respect to the server 1000 and database 1010 of the procurement module 290. As described above, the user 1060 accesses the server 1000 via the network portal 1020 (not shown) or via a third party provider 1050 which operates and manages the procurement module 290. Once secure access has been obtained, the user 1060, utilizing the search engine 1001, is able to search and select the desired part or product in a particular inventory database 1003, which may be part of a multitude of parts inventory databases within the main procurement module database 1010. This search and selection process is disclosed in further detail below. The inventory database is updated with a catalog of inventory from the vendor 1080. The process control portion 1002 of the server 1000 automates the selection and subsequent purchase and return processes. Upon selection, a purchase order (PO) 1004 is generated and submitted to the vendor 1080 via the network portal 1040 and communication facilities 1120 (not shown). Upon receiving the PO 1004, the vendor 1080 ships the product and creates a paper or electronic invoice 1005 reflecting the purchased part or product. This invoice 1005 can either be billed directly to the user 1060 or to the third party provider 1050. For either option, the Procurement module 290 can also generate or print an additional invoice 1006 reflecting a retail price (price in invoice 1005 plus associated fees) and can forward it to the customer. The vendor purchase order process is described in further detail below in FIGS. 10C and 10E.

In cases involving returns, a return authorization 1007 can also be conducted by the Procurement module 290. The user 1060 or third party provider 1050 can submit a return authorization form via the server 1000. The process control portion 1002 can direct the return authorization 1007 to the vendor 1080 for completion. The Return-to-Vendor process is described in further detail below in FIG. 10F.

Figure 10C:
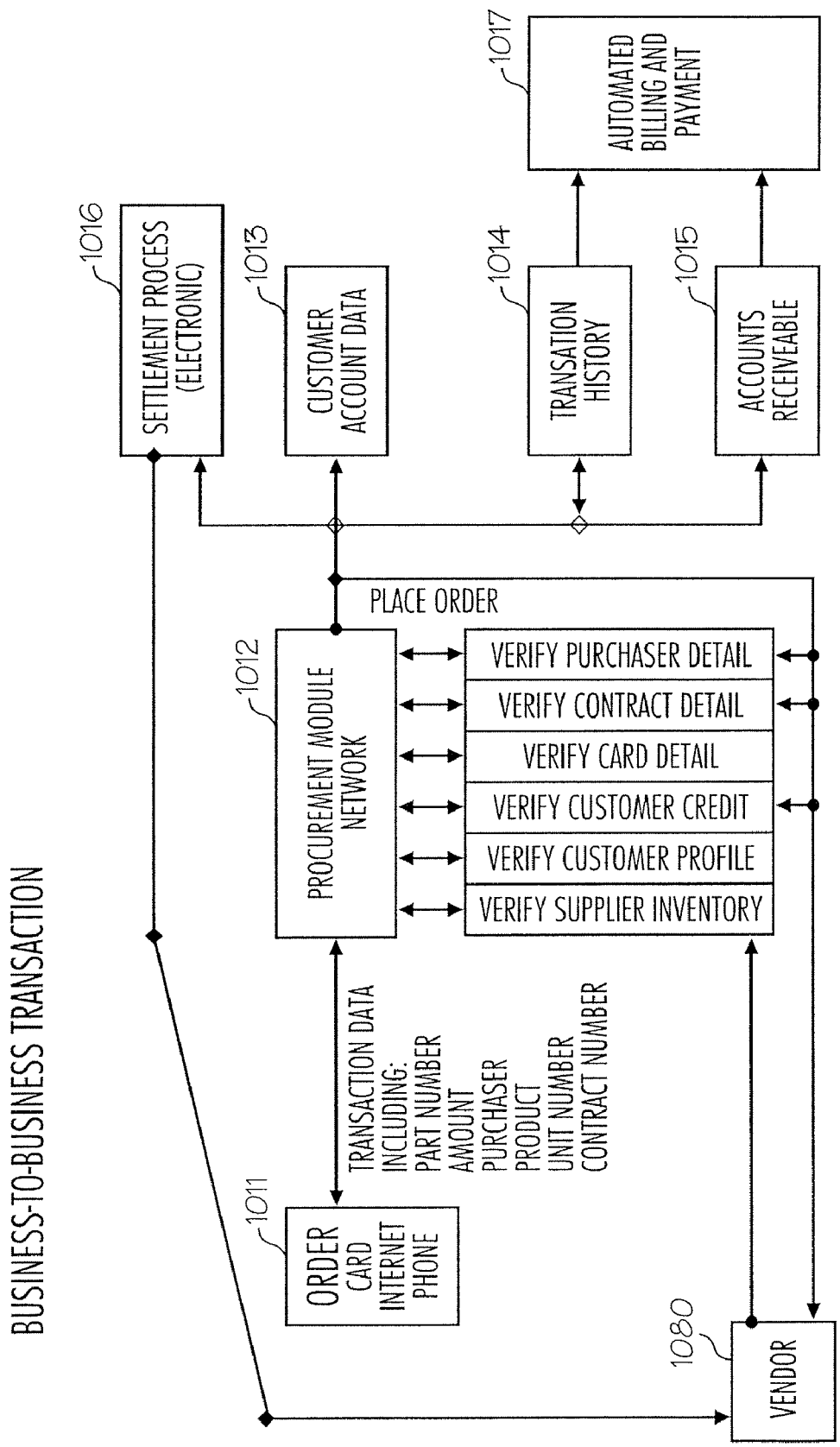

FIG. 10C illustrates a detailed flow diagram depicting a business-to-business transaction using the Procurement module 290. After the search and selection processes are completed, an order 1011 is placed for the part or product selected by the user. The transaction data of the order 1011 generally includes the part number, the amount, the purchaser (third party provider, user, and/or eventual customer), the product unit number, and the contract number. The procurement module network 1012, which consists of the server 1000 and database 1010, can perform, for example, the following tasks while updating the associated individual databases within the main database 1010 that are associated and correspond with each task: verify purchaser detail; verify contract detail; verify credit card (or other purchasing method) detail; verify customer credit; verify customer profile; and verify supplier inventory. The information generated from such tasks can then be used to complete the invoices 1005 and 1006. Also, upon placing the order 1011, customer account 1013, transaction history 1014, and accounts receivables 1015 data can be inputted in to the individual database records in the database 1010 and/or the database 60. Once the order 1011 is submitted to the vendor 1080, the inventory database 1003 as well as other vendor-specific databases and records such as customer profile, field service, and product profile databases can be updated. The order 1011 is then transferred to electronic settlement process 1016 in order to debit the transaction. Automated billing and payment such as invoicing, as described above, occur upon order and purchase verifications.

Figure 10D:
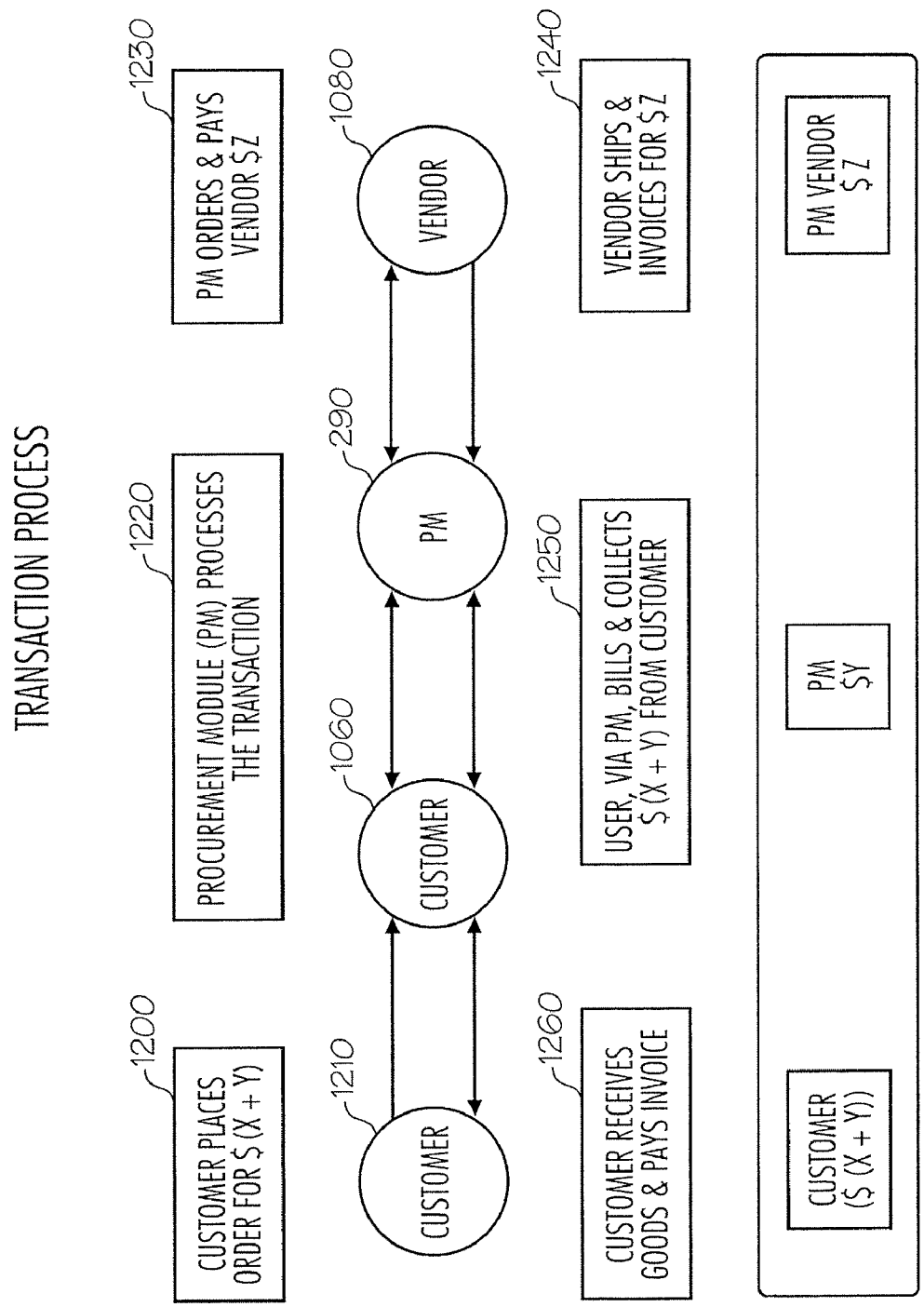

FIG. 10D illustrates a flow diagram demonstrating an example of a transaction via the Procurement module 290. The transaction process begins with the step 1200 where a customer 1210 places an order in the amount of $ (X+Y) with a CSR for a part that is not inventoried or warehoused, where X is, for example, a retail price, and Y is, for example, a mark-up, seat, transaction, and/or upload fee(s). The CSR, as the user 1060, accesses the Procurement module 290 to search, select and order the desired part from the vendor 1080. The Procurement module 290 processes the transaction at step 1220. At step 1230, the fully automated procurement module orders and pays the vendor 1080 $ Z for the selected part, where the amount Z is, for example, the wholesale amount. At step 1240, the vendor 1080 ships the product and invoices for $ Z to the user 1060 or the customer 1210 via the Procurement module 290. The user 1060, via Procurement module 290, bills and collects $ (X+Y) from the customer 1210. The customer 1210 receives the desired part and pays the invoice. With the use of the Procurement module 290, the user 1060 acquires in fee(s) $ Y from the transaction. The vendor purchase order process is described in further detail in FIG. 10E.

Figure 10E:
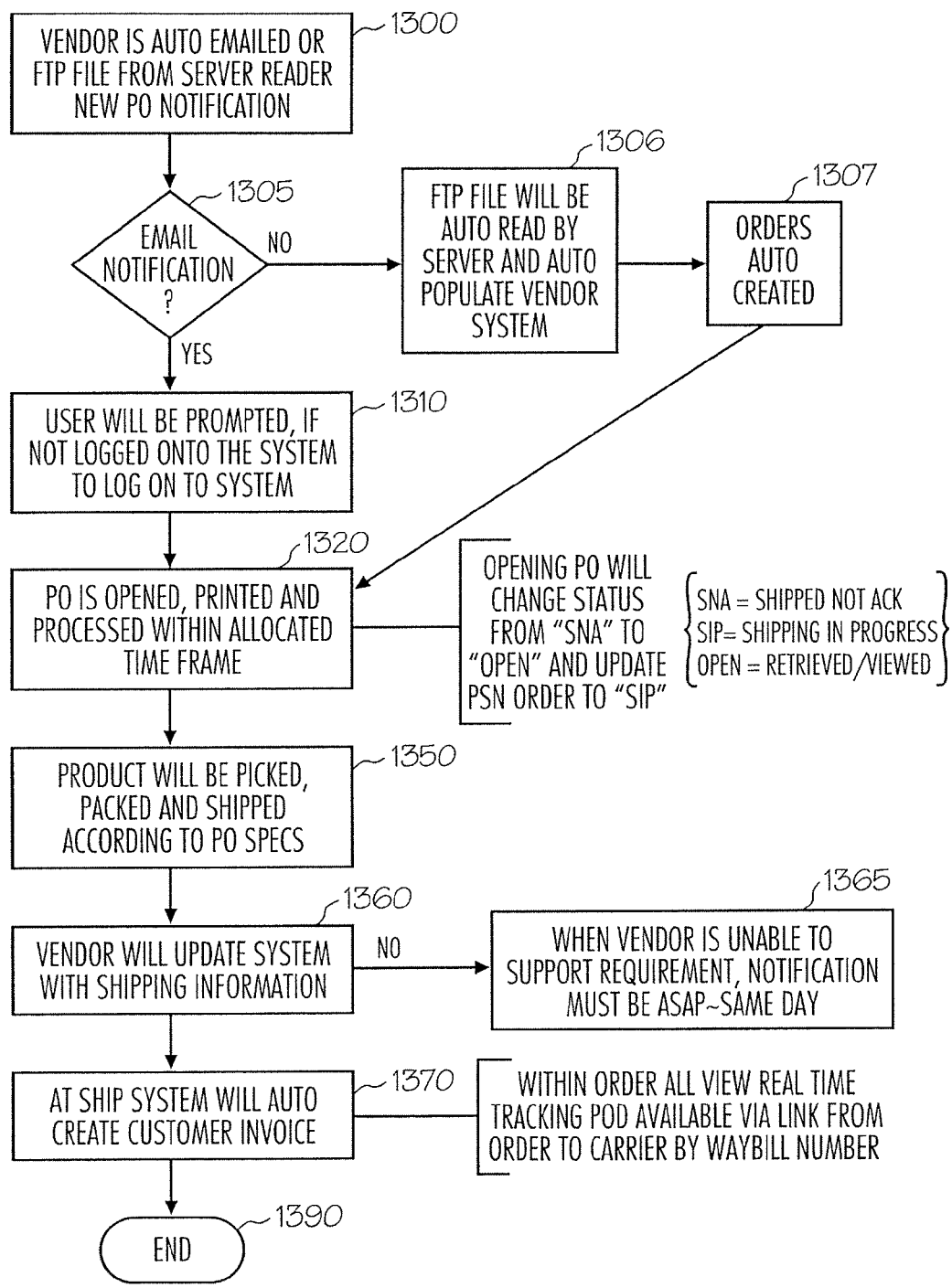
Figure 10F:
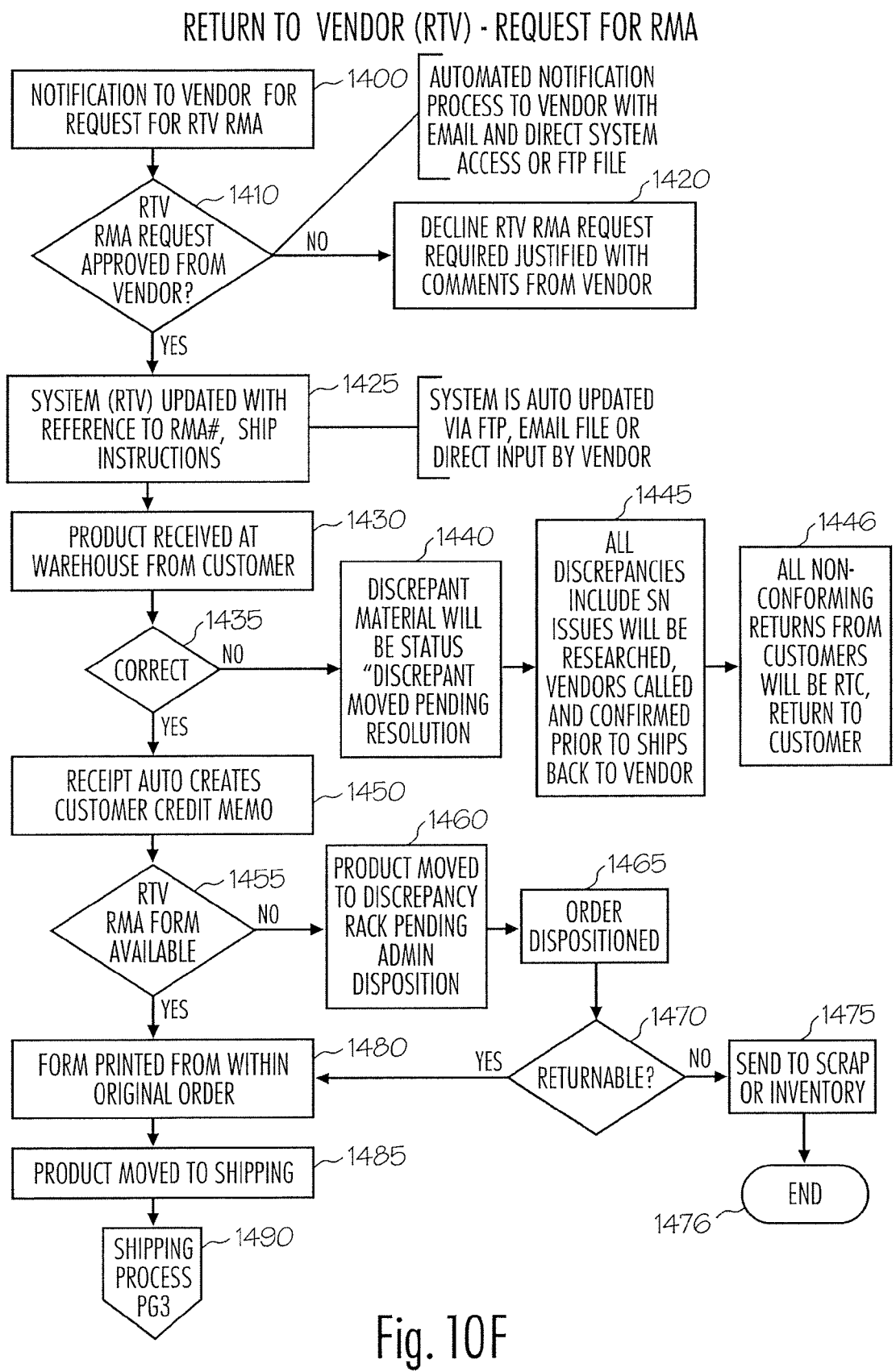
Figure 10G:
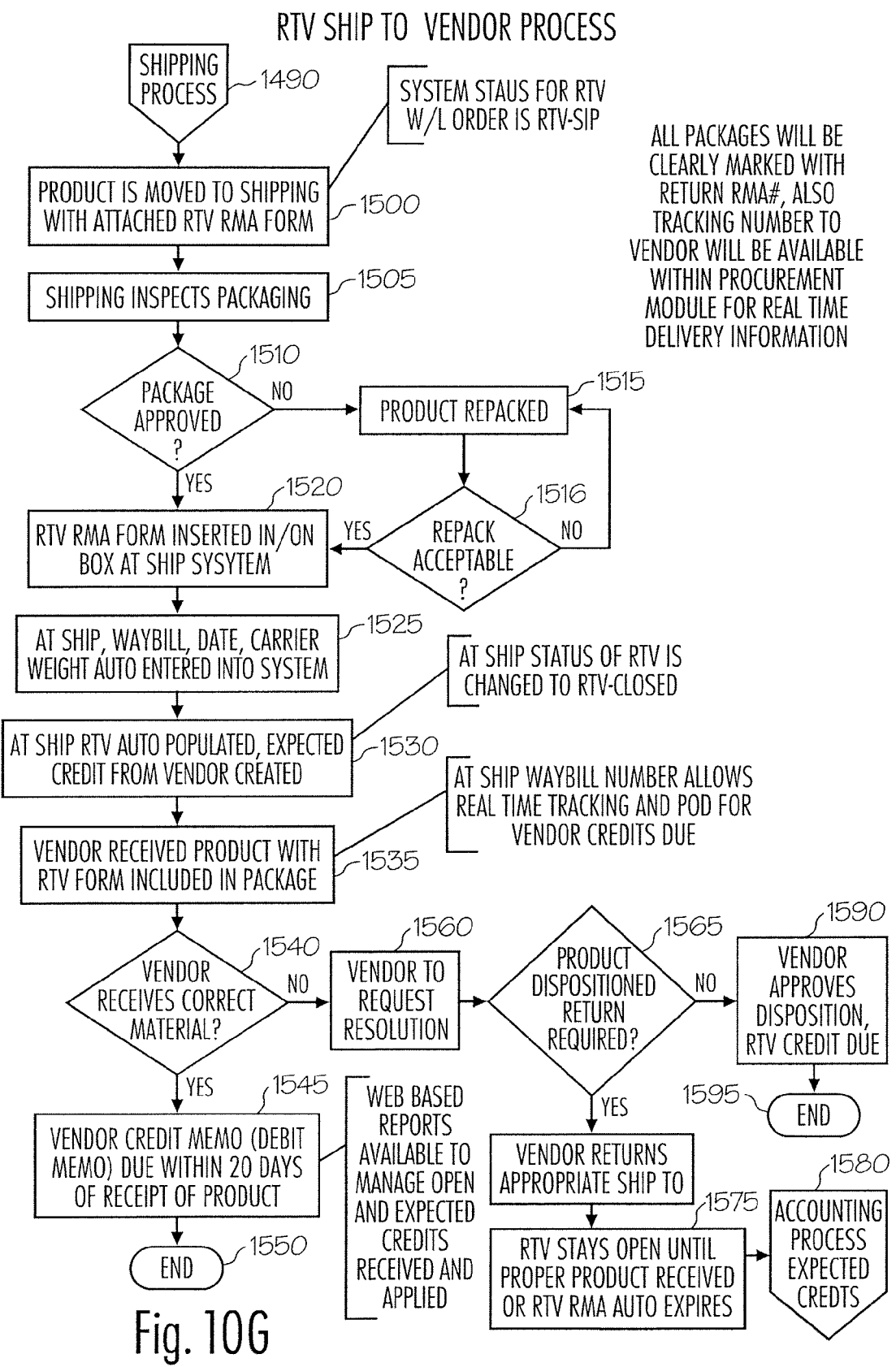

FIGS. 10E, 10F and 10G illustrate the program logic embedded in the network portal 1020 and the HTTP server 1000 to implement particular customer and product management processes of the preferred embodiments.

Upon accessing the Procurement module 290, the user 1060 would be directed to an HTML page where the user can begin his search by selecting and inputting a part number, a part manufacturer, a part description, or a part category. FIG. 33 illustrates a search web page formatted for a user 1060 where the user is generally a CSR or third party provider 1050 and not a customer. The Procurement module 290 would then generate a list of relevant parts resulting from the search. A hyperlink may exist with each part listed that links to details regarding the part or parts. Details concerning the part may include, but is not limited to, part numbers, descriptions, quantity in stock held by the vendor, field service, condition, price, manufacturer, etc. A field may also be available to select the quantity required. Subsequently, after the search of a part or parts is completed, the Procurement module 290 acts as a front-end GUI to act as a shopping cart for e-commerce purposes. If the product desired is not within any inventories from any vendors, the Procurement module 290 can administer an RFQ, to which the customer can accept or decline. The quotation and ordering processes would be administered automatically should the customer accept the RFQ. In addition, customer and/or user 1060 can process multiple and multifunctional OLR's (see FIG. 34 for example) and ordering while utilizing the Procurement module 290 with detailed inventories being displayed to the user 1060 and/or customer.

FIG. 10E illustrates the program logic implemented in the HTTP server 1000 and network portals 1020 and 1040 to administer a Vendor Purchase Order (PO). At step 1300, the HTTP server 1000 receives an order for a part or parts and an e-mail containing a new PO notification is automatically sent and received by the particular vendor 1080 via an e-mail client program, such as Microsoft Outlook. Alternatively, a File Transfer Protocol (FTP) file can automatically be sent to the Vendor from the server 1000. If the PO notification is in e-mail form, the process continues to step 1310. If the PO notification is in FTP file form, the file will be processed to populate the vendor's 1080 internal network or system (step 1306). The order is then automatically created at step 1307 and continues to step 1320 (see below). If the user 1060 is not logged into the Procurement module 290, the login verification field will be prompted as shown at step 1310. After the login is verified and secured, the HTTP server 1000 opens, prints and processes (at step 1320) the PO to access a display page. At this time, the server 1000 automatically can update the status of the PO in the Procurement module 290, for example, from "shipping not acknowledged" (SNA) to "shipping in progress" (SIP).

The product would then be selected, packed, and shipped according to the specifications set forth in the PO, after which the Procurement module 290 is automatically updated (at steps 1350 and 1360) with the appropriate shipping information. If the vendor 1080 does not have the ordered part in its inventory or cannot support or fulfill the PO for any reason, the user 1060 or third party provider 1050 will be notified that same day as shown in step 1365 and the vendor update will be seen by the customer and/or user. From the vendor search screen (for example, an HTML page generated by the Procurement module 290), all open PO's will be listed in order to update waybill, ship date, serial number, and freight cost (when applicable). In step 1370, the Procurement module 290 will automatically create a customer invoice at time of shipping. At this point, the order status as well as other relevant information can be viewed in real-time. Also, payment on delivery (POD) can be tracked and viewed in real-time via a link from the order to the carrier by waybill number. Upon reaching step 1390, the order is complete.

FIG. 10F illustrates the program logic implemented in the server 1000 and network portals 1020 and 1040 to administer a Return-to-Vendor (RTV) and Request for RMA Process. As in a Vendor PO, a notification is sent to the vendor 1080 for an RTV RMA (at step 1400). The vendor 1080 then approves the request and issues an RMA number and can either forward it to the user or decline to issue an RMA number according to negotiated criteria of the initial order (at steps 1410, 1420). If an RMA number is issued, the customer and product records within the database 1010 of the Procurement module 290 are updated (step 1425) and the customer is notified of the address to which the product is to be returned. Once the user 1060, vendor 1080 or third party provider 1050 receives the product or part and confirms applicable information concerning the product or part, a customer credit memo can be automatically created, as shown at steps 1430, 1435, and 1450. In the case where the product is directly returned to the vendor 1080, then process is directed to FIG. 10G. If there is a discrepancy regarding the product or part at step 1435, then the product status will be changed to reflect the discrepancy (step 1440). At this point all discrepancies will be investigated and confirmed by the user 1060 or third party provider 1050 prior to moving the product (step 1445). At step 1446, all non-conforming products will be labeled Return-To-Customer and returned.

At step 1455, an RTV RMA form is determined to be available. Should there be a discrepancy at this stage concerning the RTV detail, then the product status will be changed to reflect the discrepancy and will be pending an administrative disposition (step 1460, 1465). At step 1470, the product is determined whether to be returnable. If the product is not returnable, it is sent to scrap or inventory (step 1475) and the RTV RMA process is completed (step 1476). If the product is returnable, or if there was no further discrepancy at step 1460, the process returns to where the RTV RMA form was printed within the original order (step 1480) and the Procurement module 290 is updated with RTV detail. The product is then moved to shipping (step 1485) and the shipping process begins (step 1490, see FIG. 10G).

FIG. 10G illustrates the program logic implemented in the server 1000 and network portals 1020 and 1040 to administer a RTV Ship to Vendor Process. The shipping process begins at step 1490. At step 1500, the product to be returned is moved to shipping with the RTV RMA form attached. The status of the product in the Procurement module 290 is RTV-SIP. In step 1505, the packaging of the product is inspected and approved at step 1510. If the packaging is not approved at step 1510, then the product is repacked at 1515 and determined to be acceptable (step 1516). The product does not proceed to step 1520, where the RTV RMA form is inserted in or onto the packaging, until the packing is deemed acceptable. At the point of actual shipping (step 1525), the waybill number, date, carrier and product weight are automatically entered into the module 290 for further updates to the records in database 1010. Also, the RTV status is closed, expected credit from vendor is created, and the vendor 1080 is automatically populated with the update (step 1530) (see FIG. 35A).

The vendor 1080 receives the product and the RTV form at step 1535. During shipping, the waybill number and/or the shipping tracking number is entered into the module 290, which allows for real-time tracking and to determine when POD for vendor credits becomes due. If the vendor 1080 receives the correct product (step 1540), then the vendor 1080, at step 1545, issues a credit memo, generally due within 20 days of receipt of the returned product, and the process is completed (step 1550). If the vendor 1080 does not receive the correct product, then a resolution is requested at step 1560 and product disposition is determined at step 1565. If the product disposition requires a return of the product, then the vendor 1080 returns the product (step 1570), the RTV status remains open in the module 290 until the product is received by the user 1060 or the RTV RMA automatically expires (step 1575), and an accounting is performed (step 1580). If the product does not require a return, the vendor 1080 approves the disposition and issues credit (step 1590), thus completing the process (step 1595). With respect to credit memos, the Procurement module 290 provides for web-based reports that are available for viewing in order to manage open and expected credits received and applied, as shown by the example in FIGS. 35A and 35B. Finally, all packages would be clearly marked with return labels that include all RMA details.

Within the Procurement module 290, the communications facilities 1100 and 1120 in FIG. 10A allow users 1060 and vendors 1080 to communicate with each other and provide further access to inventories and issue emergency notifications such as support inabilities and product updates and recalls. The communications facilities 1100 and 1120 and the network portals 1020 and 1040 also permit users 1060 and vendors 1080 to generate and manage forecasts (see example in FIG. 36), financial and product reports as well as tracking the status of orders, inventories, and individual products. The Procurement module 290 can interact with the Inventory Management module 270 to initiate and coordinate the shipping and invoicing processes. To account for each transaction, the Procurement module 290 can update the location 154, quantity 156, and invoice information 160 fields of the database record 66a, b, . . . or n. In addition to being linked to the Inventory Management module 270, the Procurement module 290 can be interlinked with the Credit Card Processing module 260 as well. For example, a purchase through the Procurement module 290 generates a transaction within the Inventory Management 270 and Credit Card Processing 260 modules for a part or product. In addition, invoicing with links to order detail can be viewed on-line by the customer and/or user. The stand-alone features and capabilities of the Procurement module 290 also allow for customized reports to be generated by the customer, user, third party provider, and vendor with respect to the various types of information stored in the database 1010.

Figure 11:
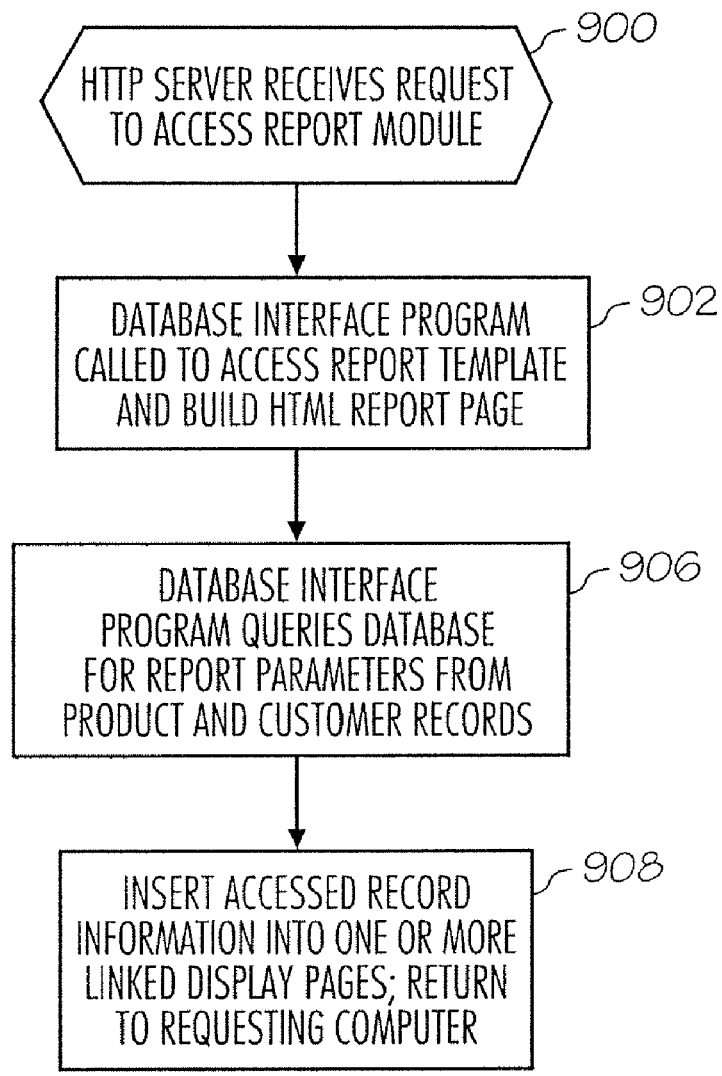
FIG. 11 illustrates a program flow implemented in the server to administer the Reporting System module in accordance with preferred embodiments of the present invention.

FIG. 11 illustrates the program logic implemented in the HTTP server 52 and database interface 70 to administer the Reporting System module 280 according to the preferred embodiments. The report module 280 can be accessed by the manufacturer/client 20 to report in real-time to bring the most mission critical operating and sales figures to executive managers. The reporting module 280 is thus able to aid as a decision support system to assist management in making executive decisions that might make the business more efficient and effective (e.g. changing the vendor on a product that receives a high percentage of RMAs, or changing seasonal strategies based on sales figures or customer interaction drivers).

The type of report generated can be varied utilizing the report templates 76. Typically the process of generating a report starts at step 900 where the HTTP server 52 receives a request from the manufacturer/client computer 20 to access the Reporting System module 280 from a user who has already logged into the reporting module 280 using a secured identification and password via the secured network 50. In response, the HTTP server 52 requests (at step 902) the database interface 70 to access the report template 76 and build one or more HTML report pages.

The database interface program 70 queries (at step 906) the database tables 61 and/or 65 for the predefined report parameters and then inserts (at step 908) the returned information into the report template. The database interface 70 will then build one or more linked HTML web pages (at step 908)

based on a report template 76 furnishing report information to the user such as Sales Report by Date Range, RMA report by product, Inventory Report by SKU, Parts Request by Date, Average e-mail request ratio by month, Geographical Sales Report, etc. Thus, the generated report pages can include information from such fields as Customer ID Information 112, Purchase Information 114, Return Information 120, E-mail Correspondence 124, Warranty Information 126, Shipping Information 128, Product information 152, Location 154, Quantity 156, Order Information 158, and Invoice Information 160.

Figure 12:
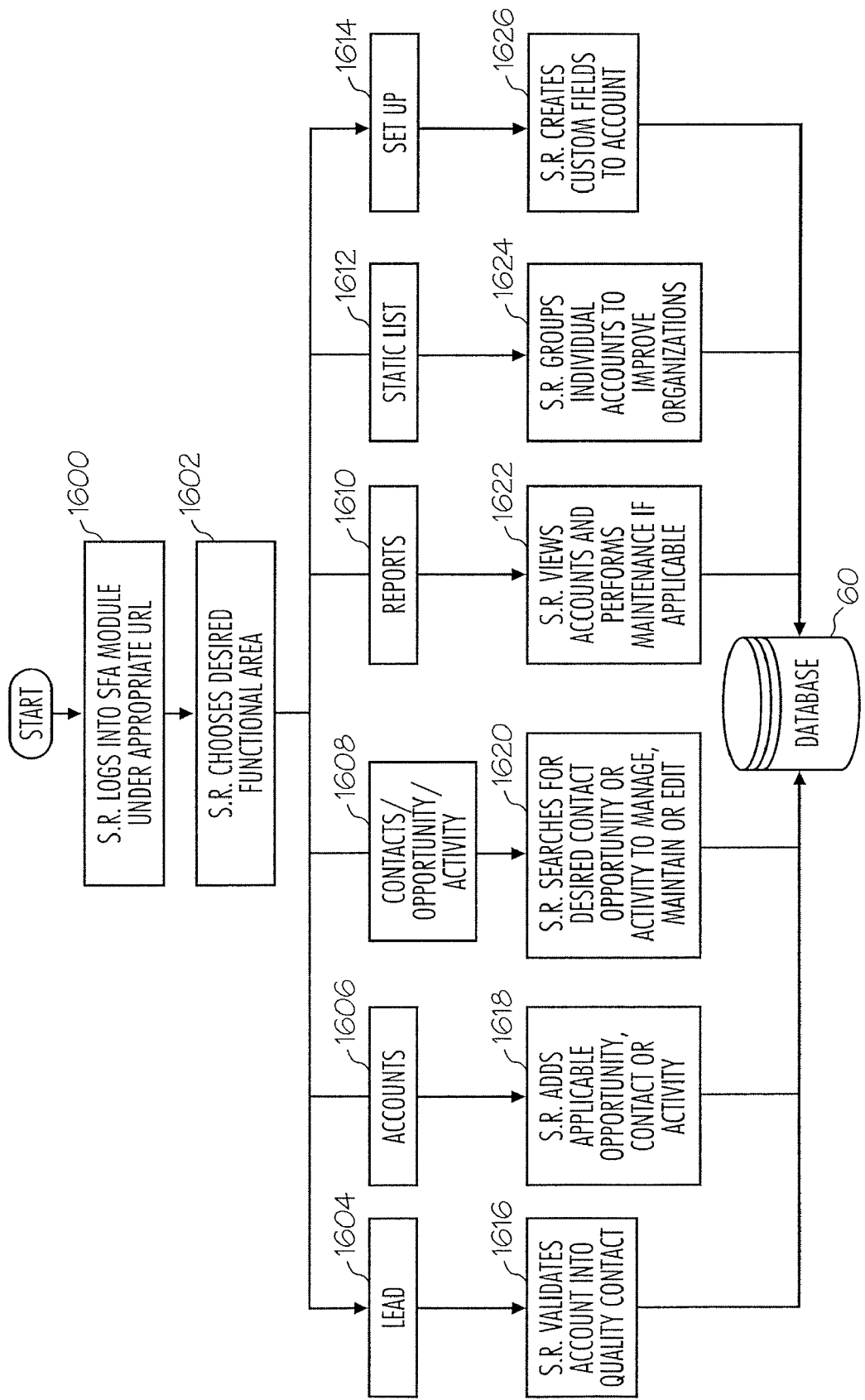
FIG. 12 illustrates a program flow implemented in the server to administer the Sales Force Automation module in accordance with preferred embodiments of the present invention.

FIG. 12 illustrates the program logic implemented in the HTTP server 52 and database interface 70 to administer the Sales Force Automation module 300 according to the preferred embodiments. This module 300 allows sales representatives, after appropriate login, access to customer, product and vendor records in the database 60 as well as other functional areas through sales computers 35. The sales computers 35 can be at a fixed location such as at the client site or be portable and able to connect to the network 50 at any location including customer sites. The Sales Force Automation module 300 provides for sales representatives the ability to manage customer and vendor accounts and to communicate with inventory managers, customers, CSR's, and management via email, telephone, and live chat. The module 300 can also provide for the viewing of daily, weekly and monthly schedules of individual SR's in order to monitor and report on sales force activity.

Figure 37:
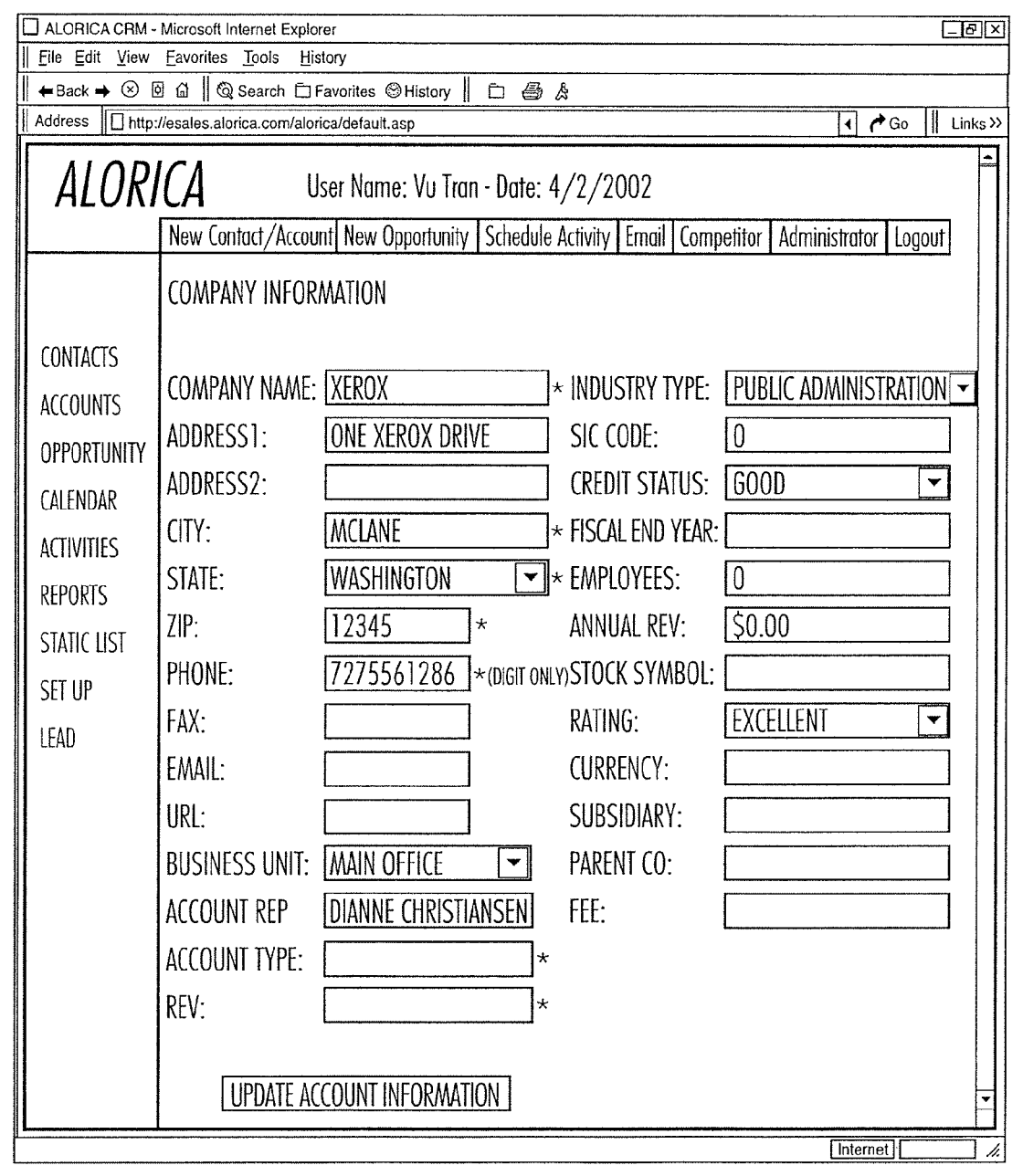
Figure 38:
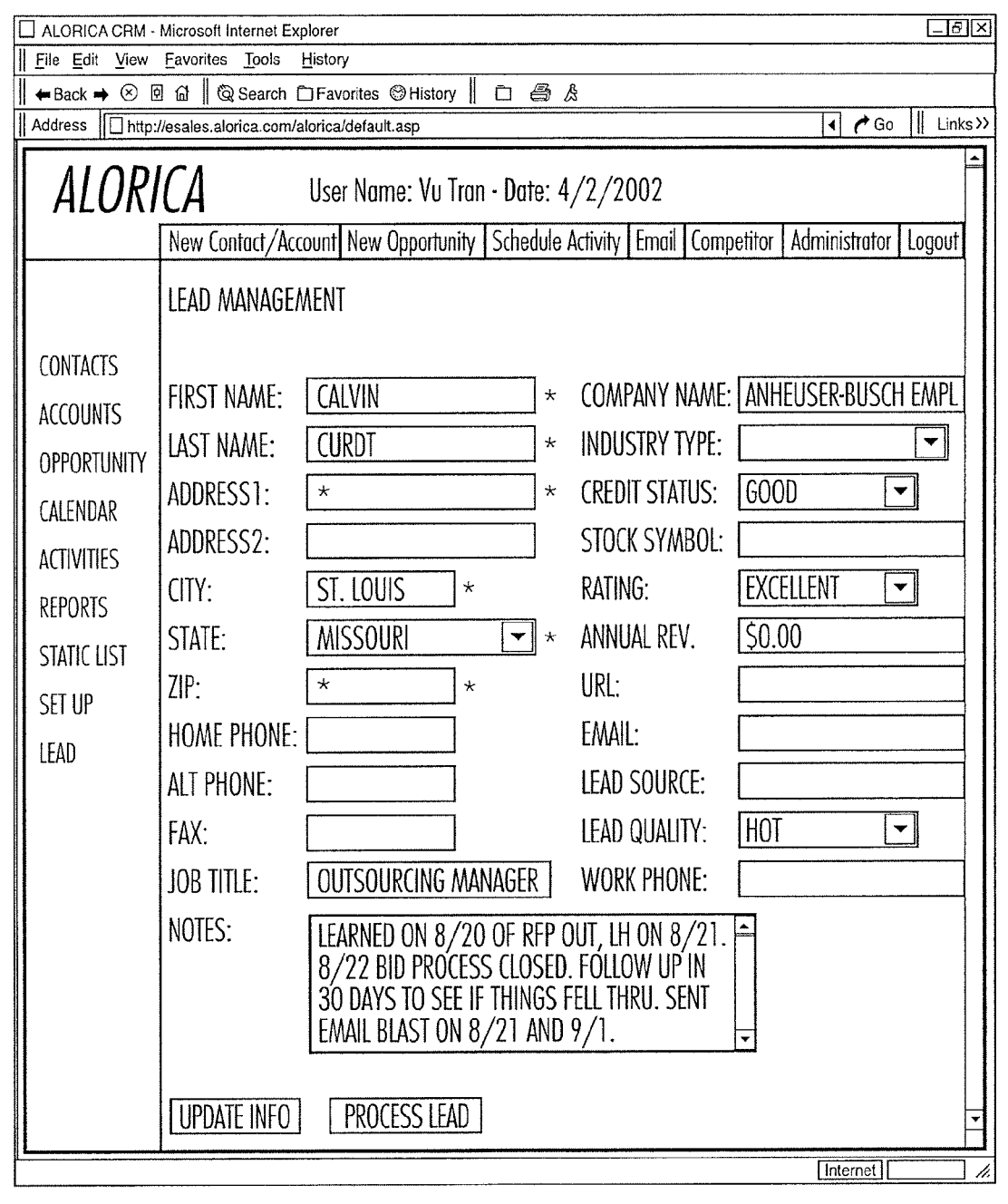

For example, a sales representative at a customer site engages in the sale of a product. Via his or her computer 35 or the customer's computer 15, the sales representative (SR), after logging in to the Sales Force Automation module 300 through the network 50 (step 1600), chooses a desired functional area (step 1602), such as Lead, Accounts, Contacts, Reports, Static List, and/or Setup. When choosing the Lead area at step 1604, the SR is able to validate account information in the database 60, as shown in FIG. 37, to qualify contacts (step 1616). If the SR chooses Accounts at step 1606, he or she can access the customer's record 62a, b, . . . n in the database 60 to add applicable opportunity, contact or activity (step 1618) (see FIG. 38 for example). Similar to a CSR as described in FIG. 5A above, the SR can manage the customer's account or create a new account if required.

Figure 39:
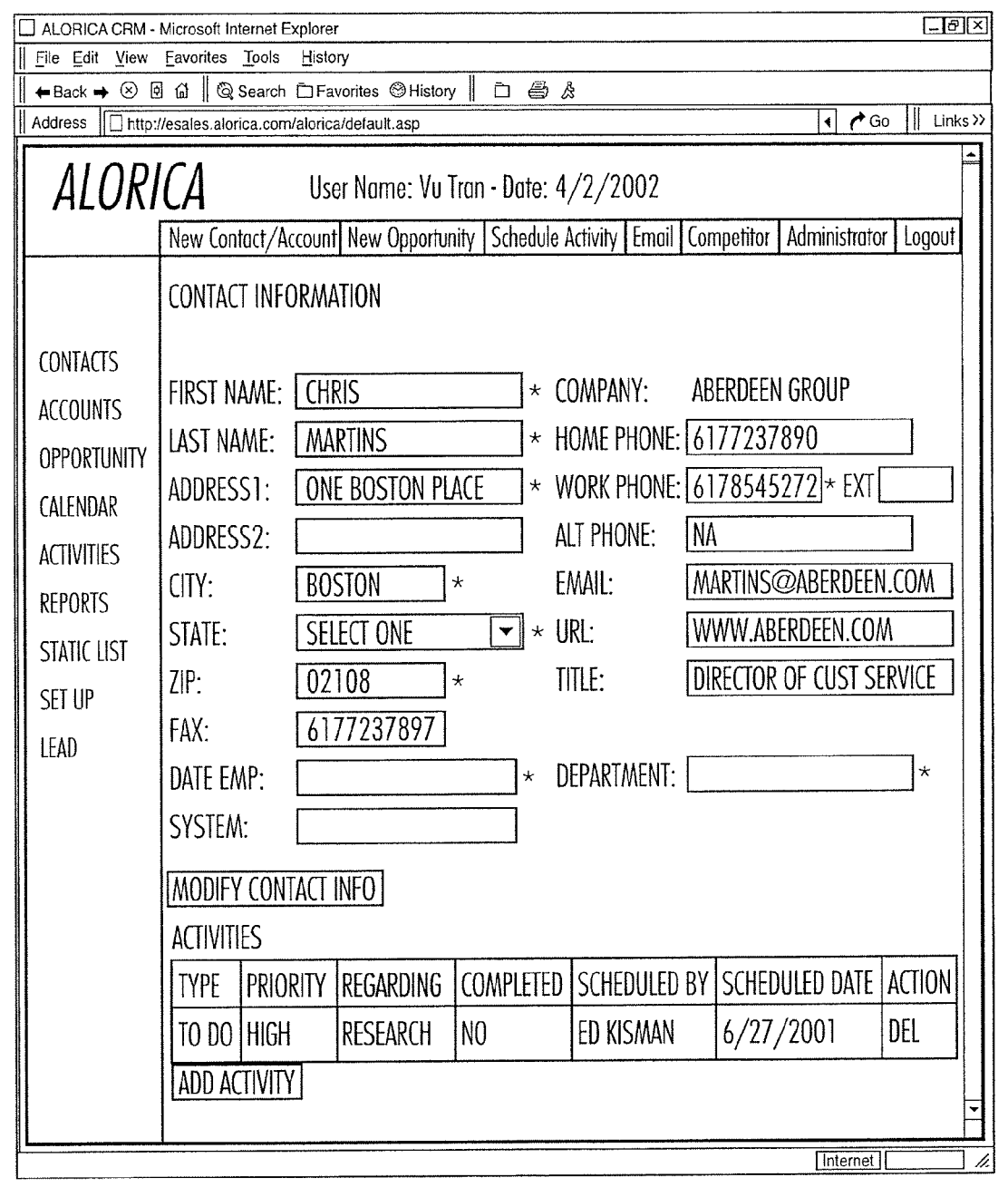

When the SR selects the contacts functional area (step 1608), the SR may search for desired contact opportunities or activities to manage, maintain or edit that may be stored as records or logs in the database 60 (step 1620), as shown in FIG. 39. Should the SR opt for the Reports functional area at step 1610, the SR, at step 1622, can view accounts and perform maintenance if required. The SR can then access the Reporting System module 280 to generate reports relevant to the accounts. Alternatively, the SR can also enter a static list area (step 1612) in order to group individual accounts to improve organization or to provide additional data to complement reports (step 1624). The final example shows how the Sales Force Automation module 300 allows a SR to, after selecting the setup functional area (step 1614), create custom fields to an account for example (step 1626). All information accessed, added or manipulated by the SR is stored in the database 60 as well as any transactional history concerning the SR's actions. Consequently, the Sales Force Automation module 300 allows a SR to have access to real-time information concerning a customer's account via the Internet, further ensuring customer satisfaction at any stage of the customer's purchase lifecycle.

Those skilled in the art will appreciate that alternative embodiments exists from the description of the preferred embodiments without departing from the spirit and scope of the invention. The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments of the configuration discovery tool are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The described implementations utilized a web-based environment utilizing the Hypertext Transfer Protocol (HTTP) for transmitting documents between computers within a network. However, those skilled in the art will appreciate that the preferred embodiments may apply to any communication protocol for allowing a terminal to request and access files in a network environment.

In addition, preferred embodiments described the customer, user, and product information being implemented as database records in a database table. However, the customer, user, or product information may be implemented in any format for maintaining object information, including spreadsheet, non-database table, etc. Thus, as used herein, the terms database record, database table, and database refer to any data structure known in the art for maintaining information on data objects, such as relational databases, non-relational databases, spreadsheets, ASCII text files, etc.

In the described implementations, the pages were described as utilizing the Hypertext Markup Language (HTML) file format However, alternative file formats for building web-Me pages may be used, such as Dynamic Hypertext Mark-Up Language (DHTML), the Extensible Markup Language (XML), Cascading Style Sheets, any other Standard Generalized Markup Language (SGML), or any other language known in the art for creating interchangeable, structured documents. Further, any version of HTML may be used, including version 2.0, 3.2, 4.0, etc. In yet further implementations, the requested file may be in any other file format, i.e., other than an SGML type format, capable of being displayed or otherwise executed by the requesting terminal.

Therefore, the foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for managing customer and product information over a network using a multi-functional management tool, comprising:

using a computer which is programmed for generating a customer database including customer records, wherein each customer record tracks a customer and is programmed for generating a product database including product records, wherein each product record tracks a product and is programmed for updating the customer database from information received from the customer to add or modify a specific customer record indicating customer contact and product purchase information about the customer;

using the computer for updating the product database from information received from a client to add or modify a specific product record indicating product and inventory information about the product;

said generating and updating comprising generating and updating in a storage unit;

said computer providing product and customer record information in the database to a requesting client representative;

said computer receiving product information and trouble information, including symptoms of a trouble from the requesting client representative, where the trouble information represents a problem with the product;

based on said product information and trouble information, reading from the storage unit, and providing to the customer service representative, a troubleshooting sequence for the specific product and the specific problem, where said troubleshooting sequence includes possible solutions that are associated with symptoms that are entered, and where one option during at least one part of said troubleshooting sequence includes at least one part sale option, where the customer service representative provides information to the user about purchasing a part, and where that part is responsive to at least one result of said troubleshooting sequence, and where at least one part of the troubleshooting sequence includes an offer of sale of an upsell product or service, where said upsell product or service is not based on said symptoms, and where said part of the troubleshooting sequence also includes a routine for accepting payment information from the customer responsive to said upsell product or service.

2. A method as in claim 1, wherein said upsell product or service comprises a sale of an extended warranty service for the product.

3. A method as in claim 1, further comprising executing an action on the computer that sells parts to the user based on the troubleshooting.

4. A method as in claim 3, further comprising providing information to the user that provides an alternative self-service way of obtaining the parts.

5. A method as in claim 2, wherein said upsell product or service comprises a sale of other products that may be used with the product received from the client.

6. A method as in claim 2, further comprising, in the computer, maintaining a list of contacts each time the customer is spoken to by the customer service representative.

7. A method as in claim 6, further comprising automatically producing a count of a number of times that the customer has called.

8. A method as in claim 2, wherein said information about problems and resolutions comprises a flowchart that has many different products and many different problems in the many different products, and troubleshooting information for the products and problems.

9. A method as in claim 2 wherein said computer method receives information from each of said customer database and product database and creates an HTML input page based on said information.

10. A system, comprising:

a computer system, having a database and a customer service tool, wherein said database includes a first set of records defining information about a customer, including at least information about multiple products owned by the customer, a second database including a second set of records defining a user database of information about a customer service representative who interacts with the customers, where the user database includes at least information about possible problems and resolutions associated with the products that are stored in said customer database, and a third set of records including product information, including information for each of a plurality of different products that can be supported by said customer service representatives on said computer system, wherein said customer service tool accepts login information from a customer service representative, and responsive to said login information, provides information to the customer service representative, where the customer service tool provides information for the customer service representative about steps to gather information about a current communication with a customer including a customer and a product and a problem with the product, and based on said data indicative of the customer and the product and the problem, creates a troubleshooting sequence for the specific product and problem, where the computer creates a troubleshooting sequence for the specific product that includes possible solutions that are associated with symptoms that are entered, and where said troubleshooting sequence includes at least one option that controls selling at least one part to sale to a user, said at least one part related to said problem and said troubleshooting sequence, and said troubleshooting sequence also provides at least one upsale routine for the customer service representative to offer to said customer, where the upsale routine offers at least one product or service that is not based on said problem and is not suggested by said troubleshooting sequence information, and said upsale routine also accepting payment information from the customer responsive to said up sale information.

11. A system as in claim 10, wherein said upsale routine comprises an offer of a sale of an extended warranty service for the product.

12. A system as in claim 10, wherein said upsale routine comprises a sale of products other products that may be used with the product.

13. A system as in claim 10, wherein said at least one option that controls selling at least one part to sale to a user further comprising selling parts to the user based on the troubleshooting.

14. A system as in claim 13, further comprising providing information to the user that provides customer with an alternative self-service way of obtaining the parts.

15. A system as in claim 10, wherein said computer system updates the first set of records to keep a list of each time talking to the customer.

16. A system as in claim 10, wherein said information about problems and resolutions comprises a flowchart that has many different products and many different problems in the many different products, and troubleshooting information for the products and problems.

17. A system as in claim 10 wherein said computer system receives information from each of said first set of records, said second set of records and said third set of records, and creates an HTML input page based on said information.

18. A computer readable storage medium storing processor executable instructions that when by a processor cause the processor to manage customer and product information over a network using a multiple functional management tool, comprising:
    accessing a storage unit that stores customer database that includes a plurality of customer records, wherein each customer record in said customer database tracks a customer, where at least a plurality of different customers include unique records within said customer database;
    accessing a product database stored in said storage unit that includes a plurality of product records and wherein each product record tracks a product and wherein said product database has corresponding warranty information for at least plural of said products, where at least a plurality of different products include unique records within said product database;
    accessing a user database stored in said storage unit that includes a plurality of user records, wherein each user record tracks a user of said products, where at least a plurality of different users include unique records within said user database;
    receiving information from a customer, and based on said information, determining if a record exists for said customer, and creating a customer record in said storage unit associated with said customer if said determining determines that said customer record for said customer does not exist, and update said customer record based on said information received from the customer to modify said customer record based on said information, where said customer record includes customer information and product information associated with said customer and where said customer record is updated based on said receiving;
    updating said product database based on information received from said customer to add or modify at least a product record; receive product information and trouble information from the requesting client representative, where the trouble information represents a problem with the product;
    reading from the storage unit, and providing to the customer service representative, based on said product information and trouble information, a troubleshooting sequence for the specific product and the specific problem,
    wherein the trouble information includes entering symptoms for the trouble, and the troubleshooting sequence for the specific product includes possible solutions that are associated with the symptoms that are entered, wherein one option during at least one part of said troubleshooting sequence includes at least one part sale option, wherein the customer service representative provides information to the user about purchasing a part, and where that part is responsive to at least one result of said troubleshooting sequence, wherein at least one part of the troubleshooting sequence includes an offer of an upsell product or service, wherein said upsell product or service is different than any of the options that are presented relative to said symptoms, and wherein said part of the troubleshooting sequence also includes a routine for accepting payment information from the customer responsive to said upsell product or service; and
    responsive to a report request, accessing all of said customer database as updated with said customer information, said user database as updated based on said interaction with said customer, and product database as updated based on interaction with said client, to acquire said requested information to create an electronically-accessible report containing said requested information from all of said customer database, said user database, and said product database and to provide said electronically-accessible report.

19. The computer readable storage medium of claim 18, further comprising executable instructions for causing a computing system to: obtain a template for a requested report, said template in an HTML form, and populate said template with information from said databases, to create a report formed of multiple linked HTML web pages.

20. The computer readable storage medium of claim 19, further comprising executable instructions for causing a computing system to: populate different fields in the report from different databases, to form said report, where at least a first field in the report is populated from said customer database, a second field in the report is populated from said product database as updated based on interaction with said customer, and a third field in the report is populated from said user database as updated based on interaction with said customer.

* * * * *